(12) United States Patent
Svingen et al.

(10) Patent No.: US 6,587,852 B1
(45) Date of Patent: Jul. 1, 2003

(54) PROCESSING CIRCUIT AND A SEARCH PROCESSOR CIRCUIT

(75) Inventors: Børge Svingen, Hommelvik (NO); Arne Halaas, Trondheim (NO); Olaf Birkeland, Oslo (NO)

(73) Assignee: Fast Search & Transfer ASA, Oslo (NO)

( * ) Notice: Subject to any disclaimer, the term of this patent is extended or adjusted under 35 U.S.C. 154(b) by 0 days.

(21) Appl. No.: 09/600,256

(22) PCT Filed: Nov. 12, 1999

(86) PCT No.: PCT/NO99/00344

§ 371 (c)(1),
(2), (4) Date: Sep. 5, 2000

(87) PCT Pub. No.: WO00/29981

PCT Pub. Date: May 25, 2000

(30) Foreign Application Priority Data

Nov. 13, 1998 (NO) .......................................... 19985315

(51) Int. Cl.[7] ............................................... G06F 17/30
(52) U.S. Cl. .......................................................... 707/6
(58) Field of Search ................... 707/3, 5, 6; 340/146.2; 712/11

(56) References Cited

U.S. PATENT DOCUMENTS

| | | | |
|---|---|---|---|
| 4,860,201 A | 8/1989 | Stolfo et al. .................. | 712/11 |
| 5,051,947 A | 9/1991 | Messenger et al. ............ | 707/3 |
| 5,060,143 A | * 10/1991 | Lee .......................... | 340/146.2 |
| 5,329,405 A | 7/1994 | Hou et al. .................... | 707/6 |
| 5,497,488 A | * 3/1996 | Akizawa et al. ............... | 707/6 |
| 5,706,497 A | * 1/1998 | Takahashi et al. .............. | 707/5 |
| 5,758,148 A | * 5/1998 | Lipovski ...................... | 707/6 |

FOREIGN PATENT DOCUMENTS

| WO | A1222940 | 10/1985 |
|---|---|---|
| WO | A1-9409443 | 4/1994 |

* cited by examiner

*Primary Examiner*—Diane D. Mizrahi
*Assistant Examiner*—Apu Mofiz
(74) *Attorney, Agent, or Firm*—Birch, Stewart, Kolasch & Birch, LLP

(57) ABSTRACT

A non-numeric coprocessor for fuzzy information retrieval and pattern recognition has means for information processing and is connectable to a host computer and a data source. A plurality of internal processing elements are organized in a number of simultaneously operable window modules (W0, W1, . . . ) a arranged for inspecting data streams from said source. The processing elements compare data stream bytes with predetermined upper and lower bounds, to decide whether a byte is within said bounds, and, if so, to produce a hit signal. Each window module has a window match logic for correlating hit signals from its different processing elements, and to produce a window match signal, by the occurrence of a predefined match. By structuring the coprocessor in this manner, a parallel processing potential is attained, which can be utilized by data routing means (12) to allow for separate data streams to be routed to individual or chained window modules selectably configured as groups of windows or super-windows according to application needs.

22 Claims, 27 Drawing Sheets

(a)

(b)

(c)

(d)

PROCESSING CIRCUIT AND A SEARCH PROCESSOR CIRCUIT

This application is the national phase under 35 U.S.C. §371 of PCT International Application No. PCT/NO99/00344 which has an International filing date of Nov. 12, 1999, which designated the United States of America.

FIELD OF THE INVENTION

The present invention concerns a processing circuit for recognition and comparison of complex patterns in high-speed data streams, particularly for use in search engines for search and retrieval of data stored in structured or unstructured databases, and wherein the processing circuit forms a node in a network of such processing circuits: and a search processor circuit comprising a multiprocessor unit $P_n$ with tree structure for recognition and comparison of complex patterns in high speed data streams, particularly for use in search engines for search and retrieval of data stored in structured or unstructured databases, wherein the multiprocessor unit $P_n$ comprises processing circuits $P_1$ according to claim 1, and wherein the multiprocessor unit $P_n$ forms a circuit realized as a binary or superbinary tree with n+1 levels $S_{0, S1} \ldots S_n$ and decree $k=2^m$, wherein m is a positive integer larger or equal to 1, and a superbinary tree defined by k>2.

The present invention realizes a search processor circuit on the basis of a multiprocessor unit with a plurality of processing circuits. In a search operation a stream of data is carried in steps through the processing circuits of the search processor circuit and for each ster the data which currently are in the chip, are compared with some pattern or other which may be coded as a bit string and beforehand input to the processing circuits.

DESCRIPTION OF RELATED ART

For searching information in large data streams, something which for instance will be typical for search engines for data communication networks of a type such as Internet or Intranet, for monitoring the content of data streams and for retrieval of data in large structured and unstructured databases, there have in recent years been developed dedicated processors. The reason is that recognition and retrieval of information in the above-mentioned fields are critical operations which do not lend themselyes to an effective realization with the use of common data processors. Basically search and retrieval of patterns in large data volumes are suited to massively parallel solutions using a large number of processing elements which simultaneously search in the same or different data segments. By use of a massive parallelism it will be possible to handle a large number of queries or searches simultaneously. For the search it has been proposed to use special search languages which have sufficient power of expression to describe features of the information searched.

In the art there are known processors which use a comparison of strings of data or symbols. As an example of prior art in that connection there may be referred to international patent application No. PCT/NO92/00173 with the title "Non-numeric coprocessor". Further has the company Paracel Inc. developed a data processing unit called Fast Data Finder (FDF) which is particularly adapted for analysing similarities between data. FDF uses a pattern matching technology which can detect an exact match, but may also be able to find distant similarities, something which may be useful in gene research and text searching.

Further there are from U.S. Pat. No. 5,553,272 (Ranganathan & al.) known a linear systolic array processor for computing the edit distance between two strings over a given alphabet. This computation is based on a coding scheme which reduces the number of bits which are necessary to represent a state in the computation. The systolic array processor has been given an architecture which does not constrain the length of the strings which can be compared and uses simple basic cells which only need to communicate with the nearest cell neighbour, such that it is ver well suited for VLSI implementation.

A disadvantage with the known dedicated search processors is that they do not offer a sufficiently advanced functionality to handle very complex search queries. Another disadvantage is that they to a greater extent are based on a circuit architecture which only with difficulty can offer a functionality of this kind without being unnecessarily complicated.

An attempt to solve this problem is known from U.S. Pat. No. 4,860,201 (Stolfo & al.) which discloses a parallel processing device structured as a binary tree, where a large number of processors, each with its own I/O unit, are used. Generally Stolfo & al. discloses a computer with a large number of processors connected in a binary tree structure such that each processor apart from those which form respectively the root and the leaves of the tree, has a single parent processor and two child processors. The processors work typically synchronously with data which are transmitted to them from a parent processor and communicate the results further to the nearest following processors. At the same time the child processors of a parent processor can also communicate with each other. According to Stolfo & al. each node forms a processing element which comprises a processor in a real sense, a read/write memory or a random access memory and an I/O means. The I/O means provides interfaces between each processing element and its parent and child processing elements such that a substantial improvement is obtained in the speed whereby data are transmitted through the binary tree structure. As the binary tree structure has a processing element in every node, the processing device generally will comprise $2^n-1$ processing elements, i.e. 1023 processing elements if the binary tree is realized with n=10 levels. In a preferred embodiment this prior art parallel processing device has a clock frequency of 12 MHz which in case a tree with 1023 processors is used, each processor having an average instruction cycle time of 1,8 µs, offers a processing performance of about 570 million instructions per second.

A binary parallel processor of this kind can be well suited for handling partitionable data processing problems, for instance searching in large information volumes. A partitionable search problem can be defined as a problem where a query about relation between an object x and and object set corresponds to a repeated use of a commutative and associative a binary operator b which has an identity, and a primitive search query q which is applied between a new object x and each element f in the set F. One has then a partitionable search problem when the logic function OR is combined with the primitive query is "x equal to f" applied between the object x an each element f in F. As stated in Stolfo & al., a problem which consists of answering a query about a set F, can be answered by combining the queries applied to arbitrary subsets of F. The problem is in other words partitionable and well-suited for rapid execution by parallel processing. The set F is partitioned in a number of arbitrary subsets equal to the number of available processors. The primitive query q is then applied in parallel on each processor between the unknown x which is communicated to all processors and the locally stored element f in the set F. The result is then arbitrarily combined in parallel by $\log_2 N$ repetitions of the operators b, a number of computations on N/2 adjoining pairs of processors first being performed and then a corresponding number of computations on N/4 pairs of processors with the results from the first computations. The operations are thus moving during the processing to overing levels in the binary tree, in other words from child processors to the parent processor etc. and are repeated in parallel on each level.

SUMMARY OF THE INVENTION

From international patent application PCT/NO99/00308 which belongs to the present applicant, there is known a digital processing device which is suited for processing digital data signal structures, where the data signal structures comprise repetitive sequences and/or nested patterns. This processing device is generally configured as a regular tree with n+1 levels $S_0, S_1 \ldots S_n$, and of degree k. This architecture provides a number of advantages compared with that which is disclosed in the above-mentioned U.S. Pat. No. 4,860,201 and may in one embodiment be used for realizing a multiprocessor architecture based on a regular binary tree of degree 2 or a superbinary tree for degree $2^m$, where m is a positive integer greater than 2, such that a superbinary tree for instance will have the degree 4, 8, 16 ... etc. A binary or superbinary architecture of this kind will similarny to the that proposed in U.S. Pat. No. 4,860,201 be able to handle partitionable search problems in an effective manner.

The main object of the present invention is thus to provide a search processor circuit which with basis in the general multiprocessor architecture as disclosed in the applicant's above-mentioned international patent application can be realized with a multiprocessor architecture which avoids the above-mentioned disadvantages with dedicated search processors, but which simultaneously also will be able to provide a far better processing and device economy than that which is the case with the parallel processor as disclosed in U.S. Pat. No. 4,860,201.

Further it is an object of the invention to provide a processing circuit which can be used for realizing a multiprocessor unit in a search processor circuit and effectively perform search by comparison of patterns.

Finally it is also an object of the invention to provide a search processor circuit whose architecture not only allows it to handle binary partitionable search problems with appropriate functionality, but also lends itself to implementation with varying degree of integration by means of available circuit solutions known in the field of microelectronics. Particularly it is in that connection the object that it can be realized in the form of a microelectronic component implemented as a so-called field programmable gate array (FPGA) or an application-specific integrated circuit (ASIC).

The above-mentioned objects and other features and advantages are achieved according to the present invention with a processing circuit which is characterized in that it comprises an interface with inputs and outputs for data which respectively are configuring and operational parameters for the processing circuit, the configuring parameters being supplied to the processing circuit via unspecified or dedicated inputs in the interface once and for all for a giving processing task and the operational data which are processed by execution of the given processing task being continuously input to or output from the processing circuit via specified respective inputs and outputs of the interace, at least one kernel processor in the form of a comparator unit, the comparator unit, being adapted for comparing two data words, and a logic unit connected with the comparator unit, the logic unit comprising a multiplexer connected with the following inputs in the interface a sequential data input, a sequential document input, a sequential flip-flop input, a sequential result input from a preceding processing circuit, a sequential result input from a succeeding processing circuit, a parallel data input, a parallel document input, a parallel flip-flop input, a parallel result input on a preceding processing circuit and a parallel result input on a succeeding processing circuit; and with the following outputs in the interface; an output for a selected data vaiue an output for a sejected document value, an output for a seiected flip-flop value, an output for a selected result to a preceding processin circuit and an output for selected document value, an output for selected flip-flop value, an output for a selected result to a preceding processing circuit, and an output for selected result to a succeeding processing circuit; a first D flip-flop; a latency unit which is adapted to delay a positive binary value with a given number of time units; a second D flip-flop; a sequence control unit which is adapted to monitor and control a comparison operation in the comparator unit, and a result selector which is adapted to combine two result values from other processing circuits or other result selectors; that the comparator unit is connected with an output for a selected data value on a multiplexer and with a data output in the interface and further has a result output connected with a first AND gate and an equaiity unit connected with a second AND gate, that the first D flip-flop is connected with an output for a selected document value on the multiplexer and has a reset output which via a reset line is connected respectively with an input on the first AND gate, an input on the second AND gate, and an input on the latency unit as well as with a document input in the interface, that the second AND gate has an equality output in the interface, that the latency unit is connected with the output on the first AND date and with a result input on the sequence control unit, that the second D flip-flop is connected with the reset output on the first D flip-flop and respectively a flip-flop output and flip-flop input on the sequence control unit as well as with a flip-flop output in the interface, that the sequence control unit is connected with the output for a selected flip-flop value and the output for a selected result from a preceding processing circuit on the multiplexer and with a result input on a preceding processing circuit and result output in the interface, and that the result selector is connected with respectively a first result input, a first document input, a first equality input, a second result input, a second document input, and a second equaiity input in the interface and respectively with a result output, a document output and an equality output in the interface.

In an advantageous embodiment of the processing circuit according to the invention the comparator unit COM comprises a first register which in each case contains input data in the form of a data word x and respectively is connected with a data input and a data output, a second register which contains a data word a which the data word x in the first register is to be compared with, as well as one or more logic gates and a multiplexer connected with the registers for executing a comparison operation, an output on the multiplexer comprising the result output of the comparator unit.

In an advantageous embodiment of the processing circuit according to the invention the latency unit comprises a counter which respectively via a first input is connected with the output of the second AND gate and via a second input with the reset line, the counter being connected with a latency, register which contains a configuring latency parameter, and having an output which is the result output of the latency unit.

In an advantageous embodiment of the processing circuit according to the invention the sequence control unit comprises a first AND cate connected with a result input on a preceding processing circuit and a result output on the latency unit, a first OR gate connected respectivey wvith an output of the first AND gate and an output on the second D flip-flop, a second AND gate connected with the result output of the latency unit and the result input on a succeeding processing circuit, a second OR gate connected with the result input on a succeeding processing circuit and the output on the second D flip-flop, a third AND gate connected with the result output on the latency unit and with an output on the OR gate, and a multiplexer connected respectively with the result output of the latency unit, an output on each of the AND gates and the first OR gate, the result input on a preceeding processing circuit and the flip-fiop output on a succeeding processing circuit, an output of the sequence control unit forming the result output of the processing circuit.

In an advantageous embodiment of the processing circuit according to the invention the result selector comprises a first AND gate connected with the first equality input and the second equality input, a second AND gate connected with the first result input and the second result input, a third AND gate connected with the first result input and the second equality input, a NOT gate connected with the second equality input, a fourth AND gate connected with the second result input and the output on the NOT gate, a first OR gate connected respectively with the first and the second equality input, a second OR gate connected respectively with the first and the second equality input, a third OR gate connected respectiveely with the output of the third and the forth AND gate, a multiplexer connected respectively with the first result input, the second result input, the first equality input, the second equality input, the output from respectively the first and second AND gate, and with the output from respectively the first, the second and third OR gate, a fifth AND gate connected respectively with the first and second document input and with the document output in the interface, a sixth AND gate connected respectively with the output of the fifth AND gate, a first output on the multiplexer and the result output in the interface, and a seventh AND gate connected with respectively the fifth AND gate and a second output on the multiplexer as well as the equality output in the interface.

The above-mentioned objects and other features and advantages are also achieved according to the present invention with a search processor circuit which is characterized in that the multiprocessor unit is provided on the level $S_n$ and forms a root node in the tree and comprises an interface $I_{P_n}$ and a logic unit E, that the nearest underlying level $S_{n-1}$ comprises $2^m$ circuits $P_{n-1}$ which are provided nested in the multiprocessor unit $P_n$, and form the child nodes thereof, each of the circuits $P_{n-1}$ havino identical interfaces $I_{P_{n-1}}$ and comprising a correspondinc logic unit E, that the multiprocessor unit $P_n$ on an underlying level $S_{n-q}$, $q \in \{1,2,\ldots n-1\}$, generally comprises $2^{mq}$ circuits $P_{n+q}$, each with interface $I_{P_{n-q}}$, and corresponding logic units and provided nested in the $2^{m(q-1)}$ circuits $P_{n-q+1}$ on the overlving level $S_{n-q+1}$, each circuit $P_{n-q+1}$ on this level comprising $2^m$ circuits $P_{n-q}$, that a zeroth level for $n-q=S_0$ defined for the multiprocessor unit $P_n$ for $q=n=S_0$ comprises from $2^{m(n-1)}$ to $2^{mn}$ kernel processors $P_0$ which form comparator units in the $2^{m(n-1)}$ processing circuits $P_1$ on the level $S_1$, that each of processing circuits $P_1$ comprises from one to $2^m$ comparator units and each has interfaces $I_{P_1}$ and corresponding logic units, that generally all circuits $P_1, P_2 \ldots P_n$ on the levels $S_1, S_2, \ldots S_n$ have identical interfaces I such that $I_{P_1}=I_{P_2}=\ldots I_{P_n}=I$, and that each logic unit comprises a result selector or a look-up-table unit for collecting the results of a search operation or a comparison operation executed by the processing circuits $P_1$ on the level $S_1$.

In an advantageous embodiment of the search processor circuit according to the invention each processing circuit on the level comprises $2^m$ comparator units, such that the multiprocessor unit $P_n$ forms an unreduced binary or superbinary tree, that a processing circuit $P_1$ maps a circuit $P_2$ on the overlying level with a factor $r=2^m$, and that generally a circuit $P_{n-q}$ on the level $S_{n-q}$ for $q \in \{1,2,\ldots n-1\}$ maps a circuit $P_{n-q+1}$ on the overlying level $S_{n-q+1}$ recursively with the factor $r=2^m$, such that the binary or superbinary tree which configures the circuit $P_n$ in each case comprises a from the level $S_1$ on recursively generated binary or superbinary tree.

In an advantageous embodiment of the search processing circuit according to the invention wherein the logic unit comprises a latency unit and a sequence control unit as well as a look-up-table unit, the logic unit additionallv comprises a first AND date, a first multiplexer, a second AND gate and a second multiplexer, that look-up-table unit is connected with a result output on each processing circuit $P_{n+1}$ in the immediately underlyingy level, the first AND gate with a document output on each of the said circuits $P_{n-1}$, the second AND gtate with the output of the first AND gate and the output of the look-up-table, the first multiplexer with the output on the second AND gate and a second result output on a last one of said circuits $P_{n-1}$, the latency unit with the output on the first AND gate, the sequence control unit with an output on the latency unit, a result output and a flip-flop output on a first one of said circuits $P_{n-1}$, a result input on the logic unit E and a flip-flop output on the last one of said circuits $P_{n-1}$, and the second multiplexer with a flip-flop output on the sequence control unit and respectively with a first and a second flip-flop input on the logic unit and further via respectively first and second flip-flop outputs with the first of one said circuits $P_{n-1}$.

A preferred embodiment of the search processor circuit according to the invention comprises a document management unit, which via a data output is connected with respectively the sequential and the parallel data input on the multiprocessor unit $P_n$, and via a document output is connected with the sequential document input on the multiprocessor unit $P_n$.

Preferably the search processor circuit according to the invention also comprises $\frac{1}{2}k=2^{m-i}$ hit management units provided connected with respective result outputs and document outputs in circuits $P_{n-1}$, each hit management unit via a result input being connected with respective result outputs in the interface of the multiprocessor unit $P_n$.

Additionai features and advantaoes are evident from the remaining appended dependent claims.

BRIEF DESCRIPTION OF THE DRAWINGS

The invention shall now be explained in greater detailes in connection with exemplary embodiments for the separate units of the processing circuits according to the invention, and examples of embodiments thereof and a search processor circuit with a multiprocessor unit based on processing circuits of this kind, and with reference to the drawings, wherein

FIGS. 4, 4(a)–4(d) the principle for how a second character pattern is compared in the present invention.

DETAILED DESCRIPTION

For further explanation of the separate units and circuits these are disclosed by their Verilog codes, which are given in respective tables A1–A13 in a separate appendix of the description. As will be known to persons skilled in the art Verilog is defined in IEEE standard 1364-1995 ("Standard Description Language Based on the Verilog Hardware Description Language").

Figure 1:
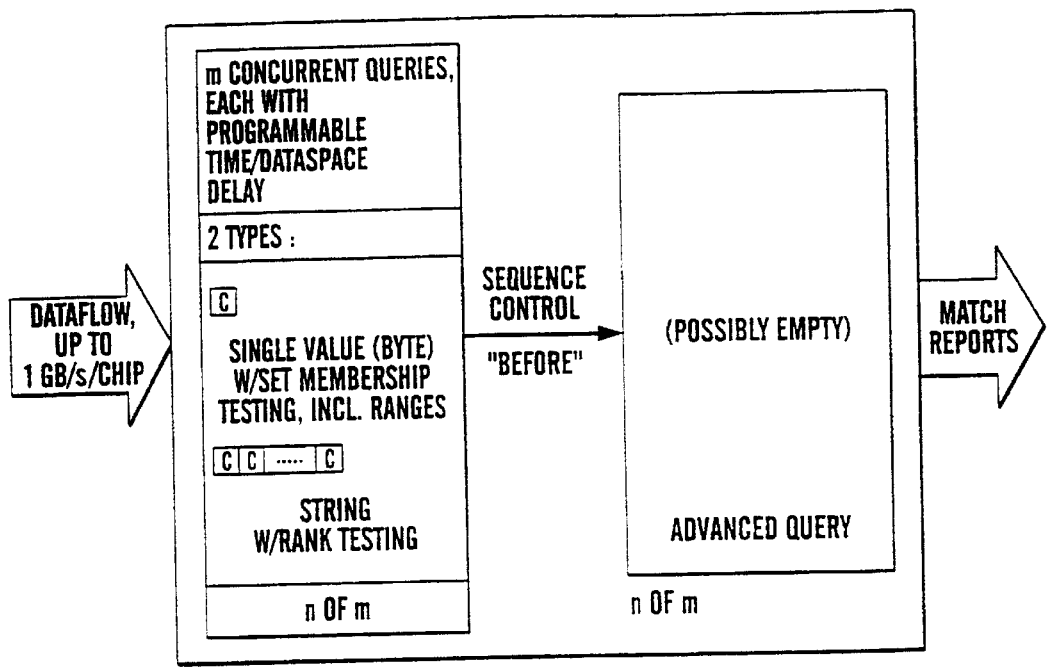
FIG. 1 shows the principle of the search processor circuit according to the invention.

There shall now be given a detailed discussion of the search processor circuit according to the invention. Operationally the search processor circuit as a whole is rendered as shown in FIG. 1. A stream of data is shifted through the circuit and in each step the data which currently are in the circuits, are compared with some pattern of other. This pattern is coded as a bit string which is written to the circuit. The fundamental unit in the search processor circuit shall be assumed to be one byte and this byte will usually represent a character. This is, however, not of essential importance on this level and can easily be chanced.

Figure 2:
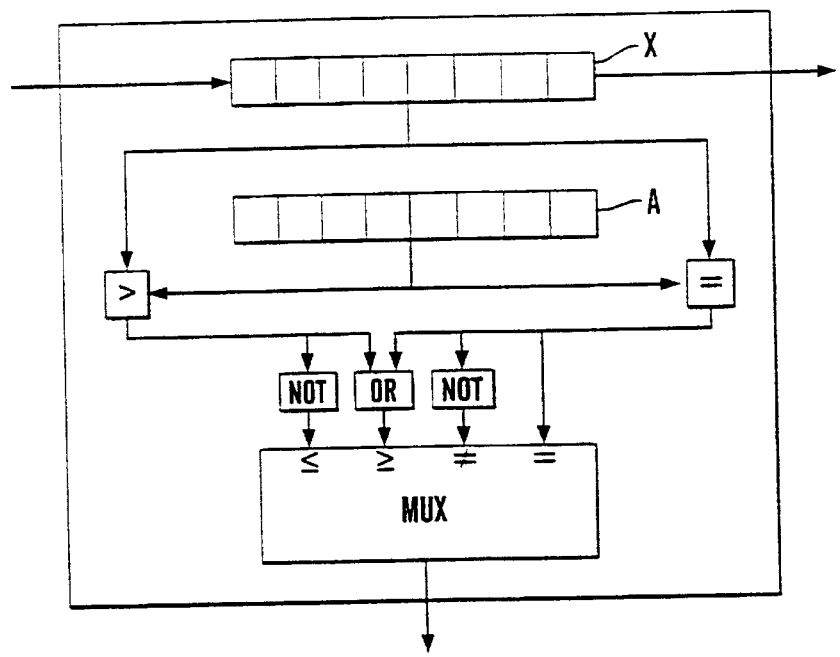
FIG. 2 a comparator unit as used in the present invention.
Figure 3:
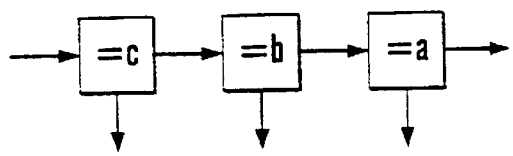
FIG. 3 the principle for how a character pattern is compared in the present invention.

A search processor circuit according to the invention is built with a large number of kernel processors in the form of comparator units. Basic comparator units are shown in FIG. 2. The register X here only contains the byte x which currently is shifted to the comparator and the register A contains the byte a which x shall be compared to. As evident from FIG. 2 four comparisons can take place simultaneously, viz. $x=a$, $x \geq a$, $x \neq a$, $x \leq a$ and the result is obtained on the output of the comparator unit. With an interconnection of kernel processors, i.e, comparator units as shown in FIG. 2, it will be possible to compare or match simple character patterns. For instance will units connected as shown in FIG. 3 match the string "abc", i.e, an "a", directly followed by a "b" which again is followed directly by a "c"? It will, however, also be of interest to compare a pattern consisting of an "a" followed by a "b", directly followed by a "c". This shall in the following be written as the pattern "ab+c". The comparator units in FIG. 3 can be changed such that this can be performed by providing a single-bit memory, the bit therein being assigned to the element which matches "b" and indicates if a "b" was found before the last shift. Furthermore it is necessary to employ some sort of sequence control such that the comparator unit will only indicate a match if the next or succeeding comparator unit also has a match. This implies that a final result is obtained from the last comparator unit. In that connection it shall be understood that the comparator unit, i.e, the kernel processor unit is provided such that the unit whereto a character first are shifter is denoted as "the first", this meaning that this unit contains the last character in the pattern, while "the last" unit contains the first character in the pattern.

How a matching of a repetitive pattern takes place, can be described by the example below, with reference to FIGS. 4a–e.

Figure 4:
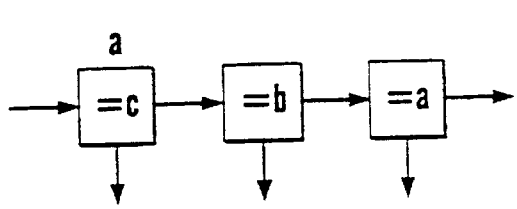
Figure 4:
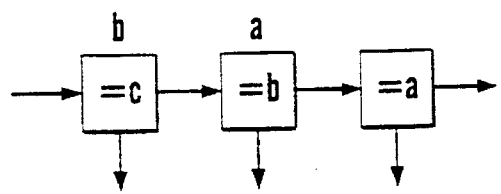
Figure 4:
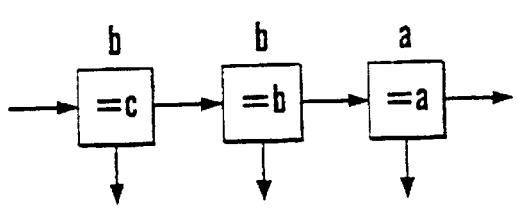
Figure 4:
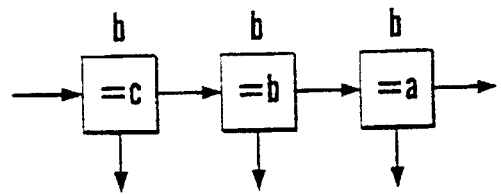
Figure 4:
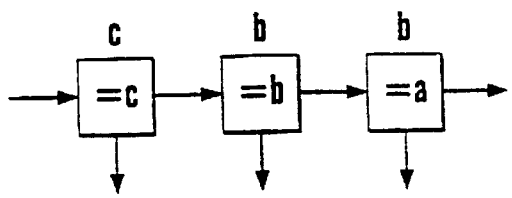

FIG. 4a—an "a" is shifted into the first comparator unit. None of the comparators show a match.

FIG. 4b—a "b" is shifted in and still there is no match.

FIG. 4c—another "b" is shifted in and the two last units have a match, while the first unit does not. As the two last units had a match, this now requires that the units shall remember that this match must be maintained as long as the middle unit has a match, even though the last unit does not have one.

FIG. 4d—several "b"s are shifted in and the match is maintained as described for FIG. 4c. If another character besides "b" was shifted into the middle unit, the matches would both have been cleared.

FIG. 4e—a "c" is shifted into the first unit and all three units are now set to indicated a match. A pattern of the form "ab+c" has now been found.

If this method shall be used to repeat patterns consisting of more than a single character, the memory must be connected with a group of comparator units matching the pattern. This shall be described below.

Figure 5:
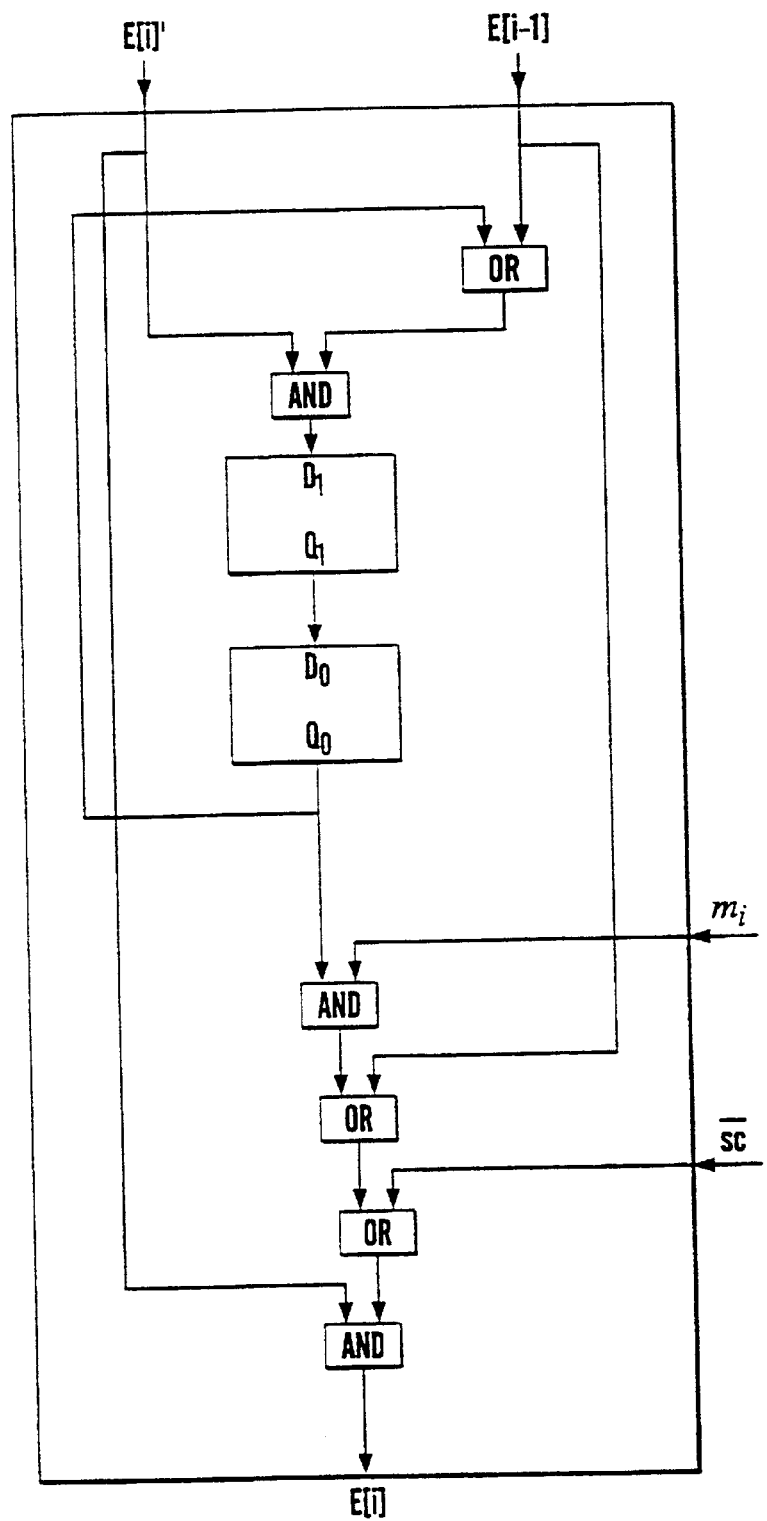
FIG. 5 the principle for how a pattern of two characters is compared in the present invention.

In order that a method as described above shall allow the matching of repeated occurrences of patterns which are longer than a sinole byte, for instance of the length n it is necessary to keep track whether a match is found of each of the n possible starting points. This can be achieved by connecting n flip-flops and letting the memory bits be shifted thereto as new bytes are shifted into the units. The output from the last flip-flip will then indicate whether or not a match occurred n positions earlier. An example where patterns of two characters are matched is shown in FIG. 5. Here E[i] is the actual, result from the comparisons. E[i] is the result from the next comparator unit used for implementing a sequence control, while E[i] is the new result where repeated matching is allowed if the signal m, is set. The signal sc indicates whether the sequence control should have been used at all. If sc is not set, the matching of multiple patterns will not take place. If it should be possible to vary the length of the patterns which shall be repeated, a scheme like the one shown in FIG. 6 can be used. Here a multiplexer is used for selecting the output after the ith flip-flop, where i is the length of the pattern to match. The use of this method will, however, not be necessary, such his will be described below.

Figure 7:
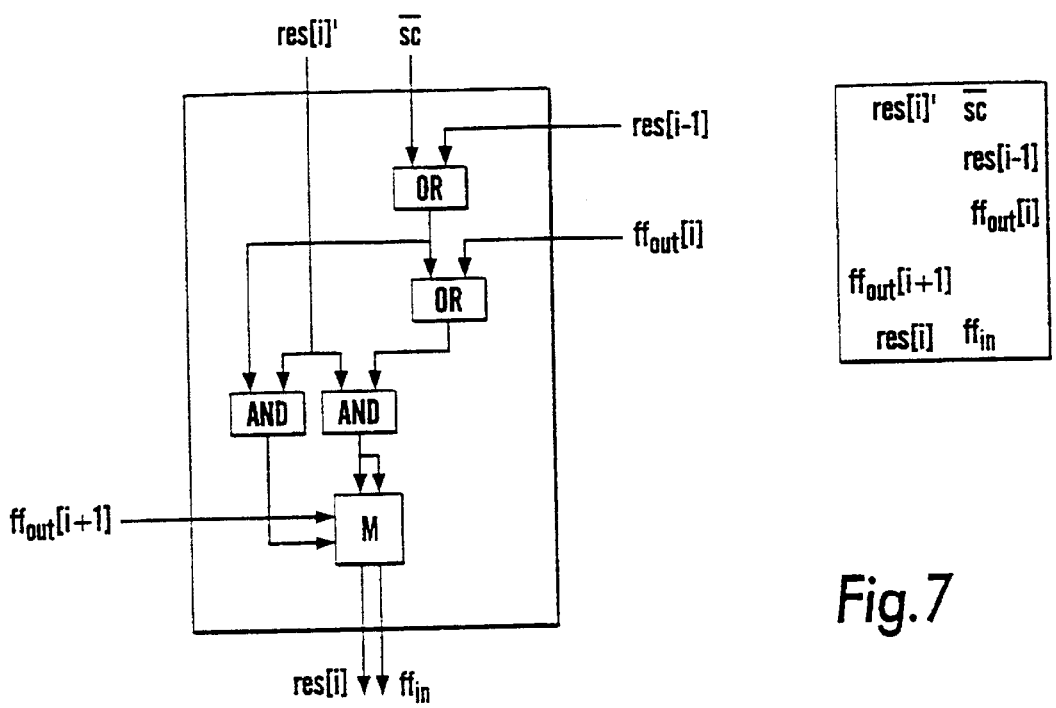
FIG. 7 a sequence control unit as used with comparison of repetitive occurrences of character patterns in the present invention.

A unit which implements the sequence control necessary to achieve matching of repetitive occurrences or patterns is shown in FIG. 7. This unit can be supposed to be placed together with a set of comrarator units and the necessary number of D flip-flops. The multiplexer is used to decide whether multiple occurrences of patterns are allowed. The inputs and the outputs can be described as follows:

| | |
|---|---|
| res[i]': | The res[i]' signal is a result from the comparison with the repeatable pattern. |
| sc: | The sc signal specifies whether the sequence control shall be used as described in a preceding section. If sc is set. the unit will only give a positive result if also the next unit also has a positive result. If it is not set. the result from this unit will be independent from the others and repetitive matching will not be allowed. |
| res[i − 1]: | The signal res[i − 1] takes the result from the next unit and is used to implement sequence control. |
| $ff_{out}$[i]: | The signal $ff_{out}$[i] takes the output from the last flip-flop through which the memory bits pass. |
| $ff_{in}$: | The signal $ff_{in}$ is to be given as the input to the first flip-flop through which the memory bits pass. |
| res[i]: | res[i] gives the new result from this unit. If the sequence control is not used and sc is not set. then this will be equal to res[i]'. otherwise. it will be set if res[i − 1] is true. and res[i]' is true. or if repetitive patterns are allowed. if $ff_{out}$[i] is set. |
| $ff_{out}$[i + 1]: | The $ff_{out}$[i + 1] input gives the output from the flip-flops of the preceding element. This makes it possible to connect comparator units for matching repetitive patterns with varying lengths. |

Figure 8:
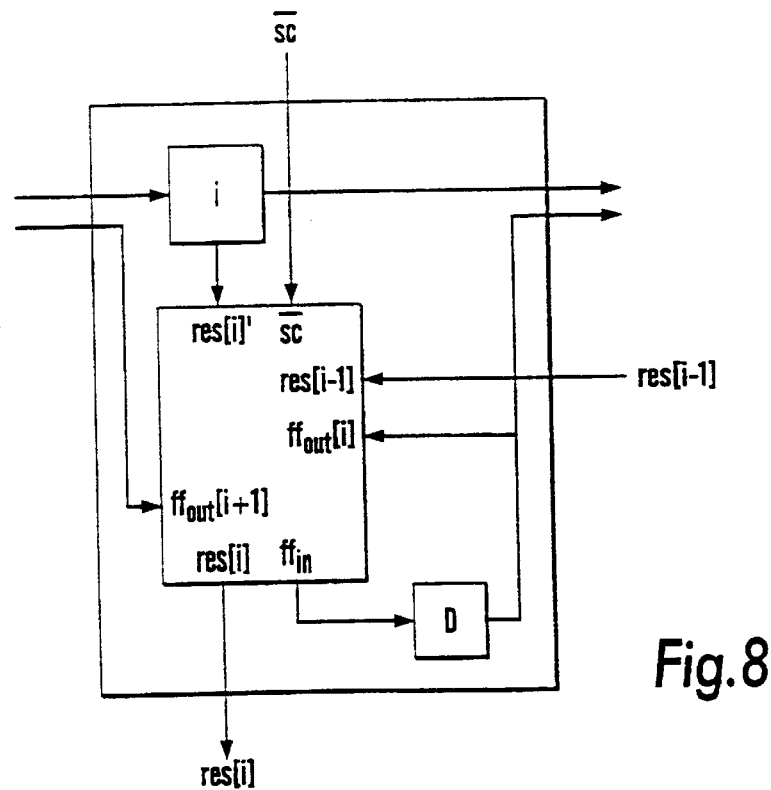
FIG. 8 the sequence control unit in FIG. 7 connected together with the comparator unit in FIG. 2.

In FIG. 8 the sequence control unit is shown together with the comparator unit in FIG. 2 and allows repetition of the character matched by the comparator unit. Here a single D flip-flop is used to represent the memor and this D flip-flop is hence set if the following conditions are true:

Repetitive occurrences of patterns matched by these units shall be allowed.

There is a simultaneous match for this unit and the following.

All bytes shifted into this unit after the previous conditions becoming true, have been matches.

For this to work, the output from the unit which allows multiple occurrences of the matching pattern, must be used to indicate the results for both this unit and the preceding one. In order to generalize the function sequence control is always used together with multiple pattern matching, as was described above. The unit will in other words only give a positive result if the preceding one also does.

In addition to the matching or repetitive patterns as described in the preceding sections, it can also be of interest to match strings where parts of the pattern is optional. This would take place in an analog manner and can be described by the following example with reference to FIGS. 9a–c.

Figure 9A:
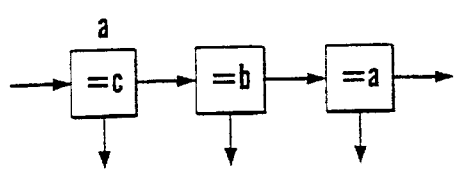
FIG. 9(a)–(c) the principle for how character strings where the pattern is arbitrary are compared in the present invention.
Figure 9B:
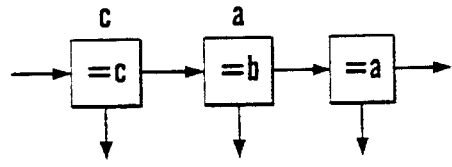
Figure 9C:
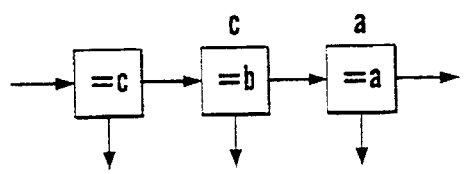

FIG. 9a An "a" is shifted into the first unit. None of the units have a match.
FIG. 9b A "c" is shifted in and there is now a match on the first unit. The middle unit shall now remember this.
FIG. 9c The characters are shifted to the right and there is now a match on the last unit. Since there also was same match on the middle unit one character ago. the units have now matched the sting "ac".

In order for this to take place the sequence control must function in opposite direction than which was the case when repeated patterns were matched.

Figure 10:
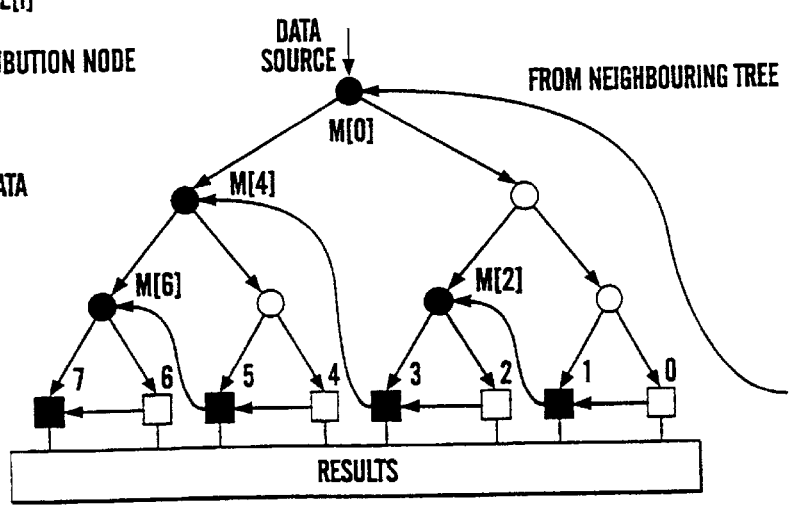
FIG. 10 a first embodiment of a binary data distribution tree for search processor circuit according to the present invention.
Figure 11:
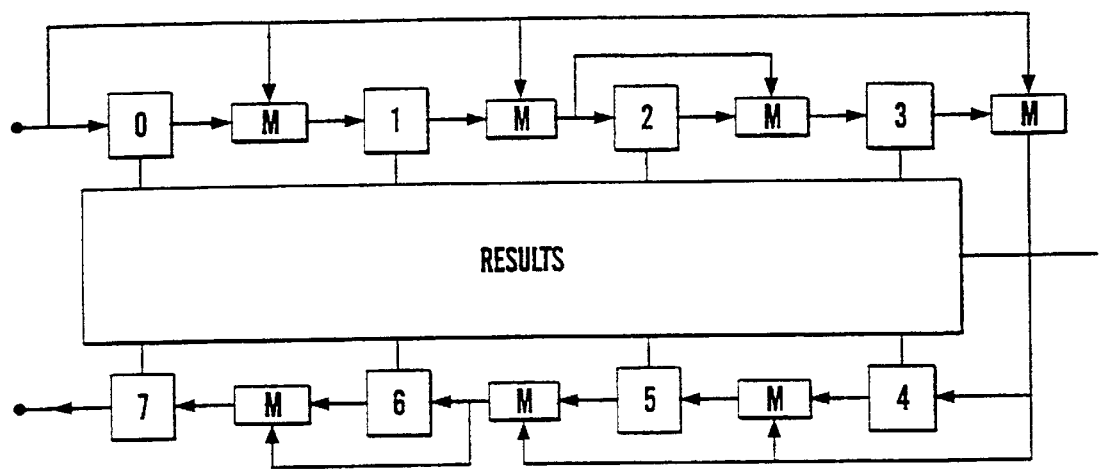
FIG. 11 the implementation of the binary data distribution tree in FIG. 10 and with use of the connection shown in FIG. 8.

There shall now be described a tree structure for distributing data to the comparator units. As a data distribution tree a complete balanced binary tree as shown in FIG. 10 is used. On each internal node in the tree 3 a multiplexer decides whether two subtrees shall receive the same data elements in parallel or whether they shall receive the elements sequentially. A simple implementation of the binary data distribution tree in FIG. 10 is shown in FIG. 11.

It is now possible to take another look at the matching of occurring repetitive and skipped patterns, as described above. The processing circuit shown in FIG. 8 is used for generating the tree structure in FIG. 11, and repeated and skipped patterns shall now be matched on several levels. In order to simplify this, it will be assumed that this only will be allowed for individual characters or for the whole tree which consists of eight processing circuits.

There are now basically six different modes of operation for this tree:

No sequence control is emnioved—the results of each from eight processing circuits are independent.

Plain sequence control is used—only the result from the processing circuit 0 will be used and this will be positive only if all eight comparator units have matches.

Repetitive matches are allowed for one or several of the comparator units.

Skipped matches are allowed for one or several of the comparator units.

Repetitive matches are allowed for the whole tree.

Skipped matches are allowed for the whole tree.

Figure 6:
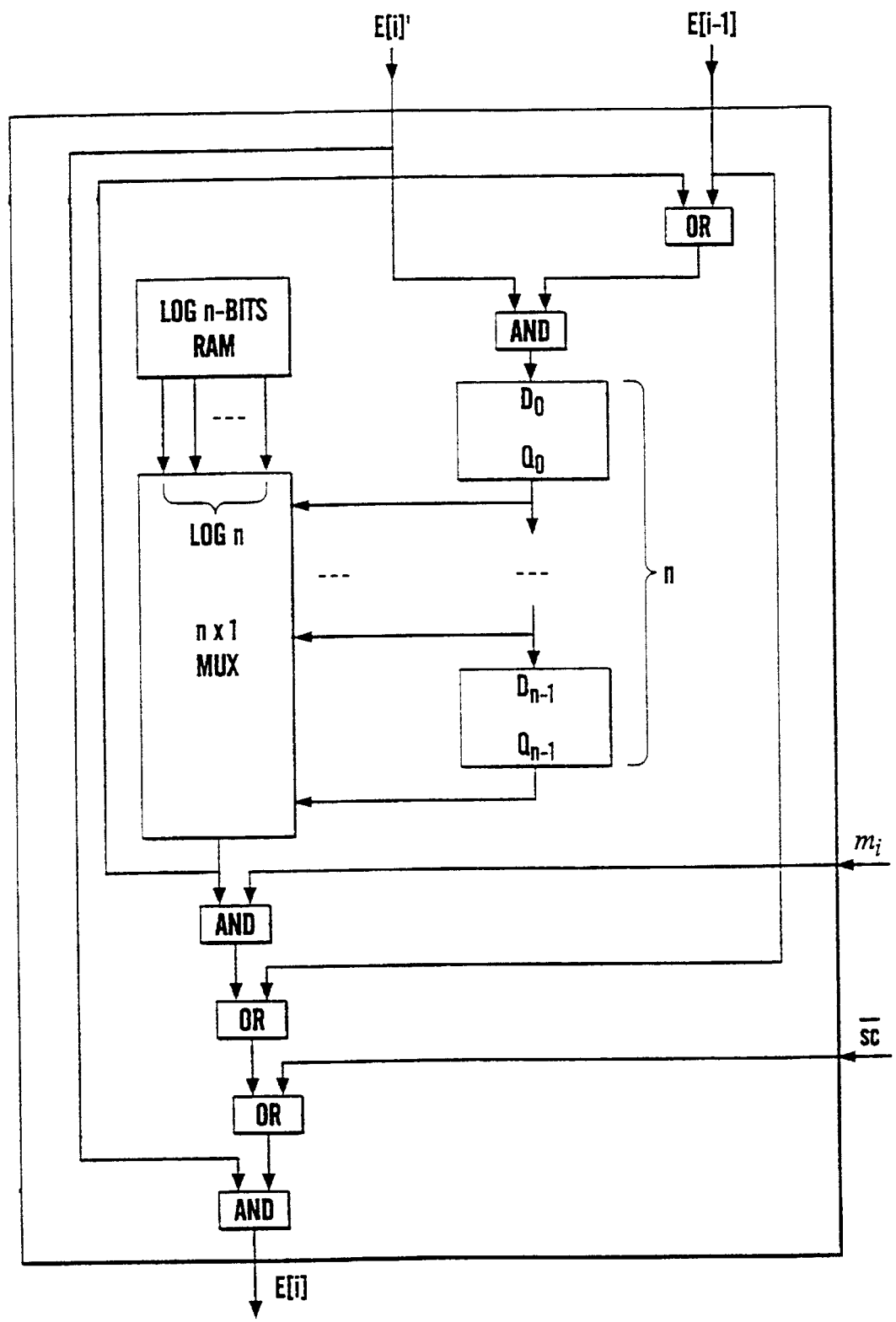
FIG. 6 the principle for how repetitive patterns of varying lengths are compared in the present invention.
Figure 12:
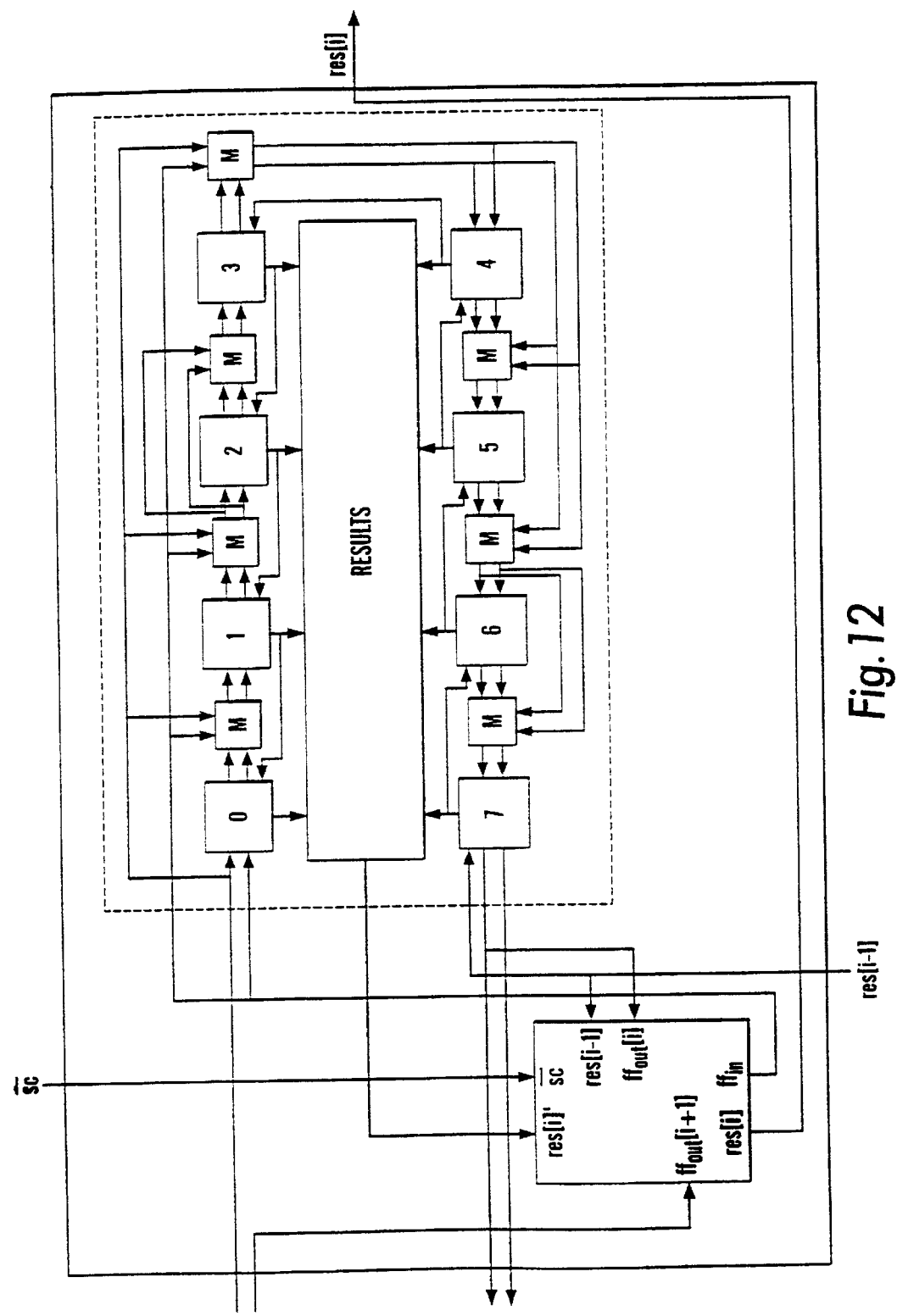
FIG. 12 a second embodiment of a binary data distribution tree for the search processor circuit according to the present invention.

The first of the above-mentioned points are handled by the processing circuit as shown in FIG. 8, the fourth by an analog element for skipping patterns. The last two, however requires that another sequence control unit, as shown in FIG. 7, is used for the whole tree. As can be seen in this figure, the correct number of flip-flops must be available for this unit. The number of flip-flops which shall be used must be equal to the number of characters in the pattern which shall be repeated, but this may vary from one to eight depending on the configuration of the multiplexers which defines the tree. A solution similar to the one in FIG. 6 is evident, but this will make the programming of the circuit more complicated and more error prone, as the number of characters which is to be repeated essentially is set twice, once in the definition of the tree and once in the multiplexer which selects the result from the correct flip-flop. Fortunately a more elegant solution can be obtained by using the fip-flops which already are present in the processing circuits in the tree. As the number of characters in the tree at any given time is given by the data flow, the multiplexers that are used for data distribution, can also be used for routing the memory bits through the correct number of flip-flops. An implementation of this is shown in FIG. 12, and as the same flip-flops are used for repetitions on two possible levels, the pattern can be repeated on one of the levels at a time. It should be remarked that repetitive patterns on several levels simultaneously will not be possible by using this method in any case, as the length of the repeatable string will vary. Another complication is that each processing circuit requires results from the preceding comparator unit in order to implement the sequence control, but this will be described below.

Figure 13:
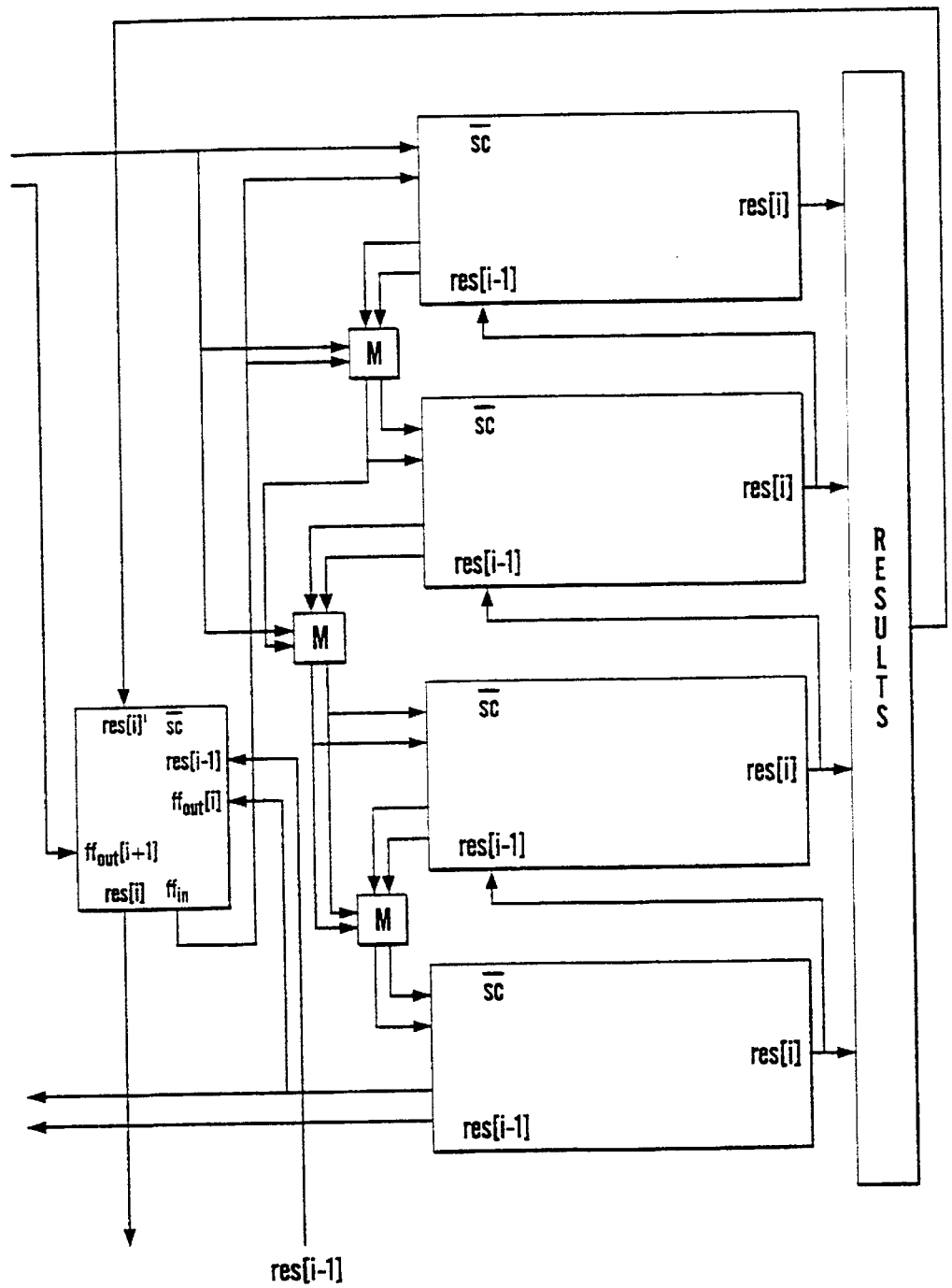
FIG. 13 a third embodiment of a binary, data distribution tree for the search processor circuit according to the present invention.

It is now possible to extend the tree structure. As shown in FIG. 13 a total number of 32 kernel processors or comparator units is used and allows repetitions on a single processing circuit, on a group of eight processing circuits, or on the whole tree. The same reasoning also applies to the skipping of patterns.

Basicaly it is two practical ways of collecting the results from a data gathering tree and as described in the preceding section. The most natural is to use another binary tree where the results are combined at each internal node. This, however, has a number of disadvantages, as it makes it impossible to perform certain operations such as requiring that a definite number of processing circuits shall have matches. If the number of processing circuits is relatively small, it will be possible to use a look-up-table LUT. This will, however, be problematic when repeated matches are allowed, as matching is not defined for a part of the tree. These two methods shall be described in the sections below, followed by a discussion of their advantages and disadvantages. First shall be described how results are gathered with the use of a binary tree.

Figure 14:
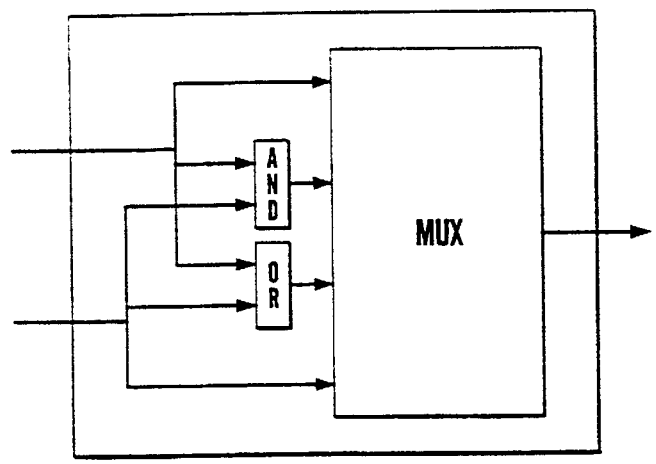
FIG. 14 the principle for the result selector as used in the present invention.
Figure 15:
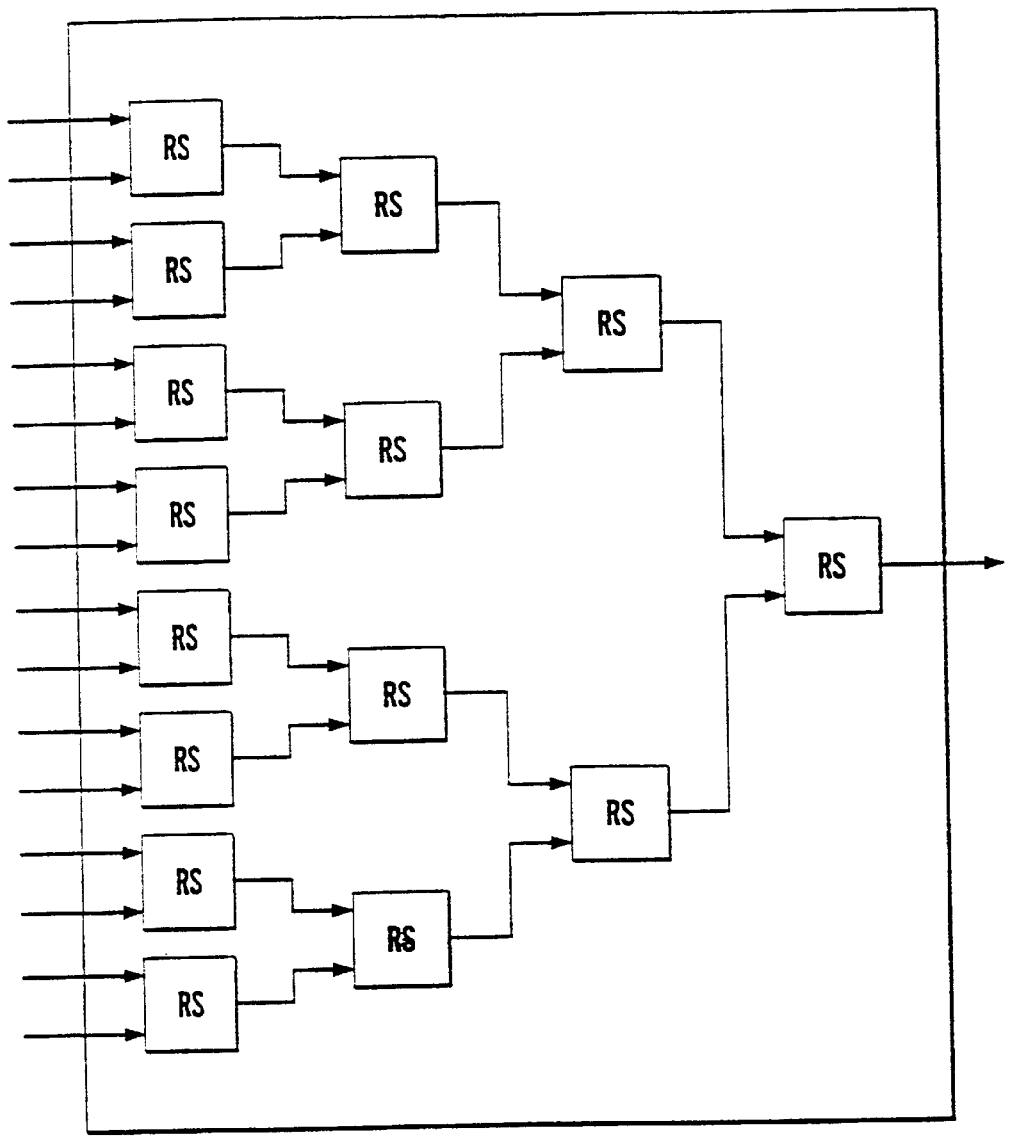
FIG. 15 the principle for gathering results from the processing circuits by using result selectors as emploved in the present invention.

Given the results from two processing circuits it is a natural way of combining them to perform one of the logic operations AND and OR. It may also be advantageous to be able to select only one of the results and ignore the other. A unit which performs this operation is shown in FIG. 14 and shall in the following be denoted as a selector. Such units can now be combined in a binary tree and provide a single result from a group of processing circuits, as shown in FIG. 15. It will also be possible to use a binary tree for comparing strings alphabetically or numerically, something which will be described in the following. The problem which is mentioned above, namely obtaining the result of the comparison of the character before and after the one being processed by the current processing circuit, can now be dealt with. Firstly, only the preceding or the following results will be necessary at any given time, as the matching of both repeated and skipped patterns cannot be performed simultaneously. This implies, due to the sequence control used, that the result-gathering tree can be configured such that it either selects the right or left results for arbitrary processing circuits which looks at different characters. The result for any subtree of n units can be found n levels up in the result gathering tree. If several units look at the same character, will secondly their preceding and following results also be the same. These results can be found by using the same multiplexers for controlling the data flow, such that a result only is passed on to any neighboring units which look at the same character.

Figure 16:
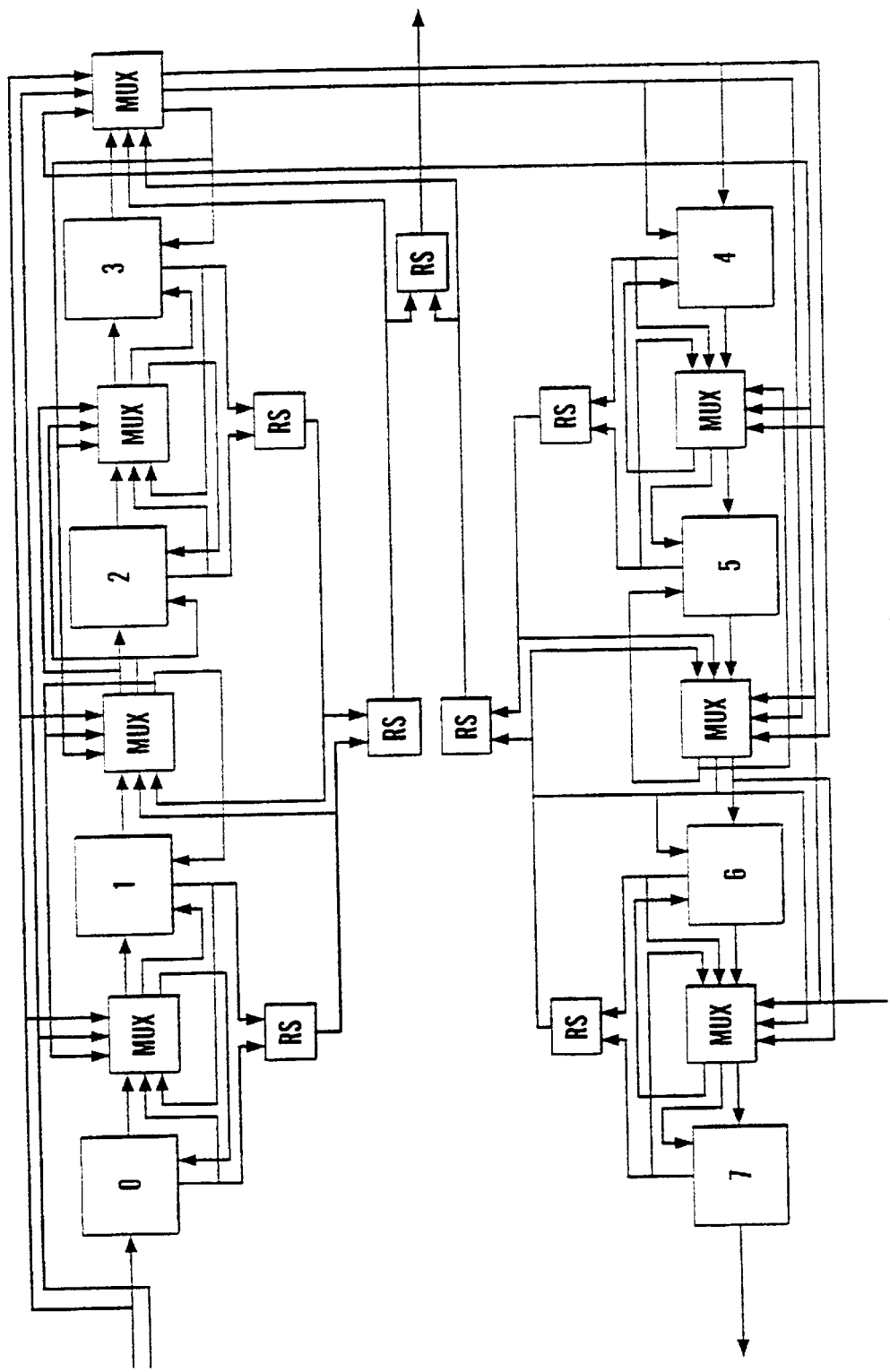
FIG. 16 a fourth embodiment of the binary data distribution tree for the search processor according to the present invention.

FIG. 16 shows how the embodiment can be completed with the use of this method. It is important to note that the same set of multiplexes are now used for three different purposes viz, distributing the data, routine the memory bits through the right number of flip-flops and for providing the results from comparisons of the preceding and following characters.

Figure 17:
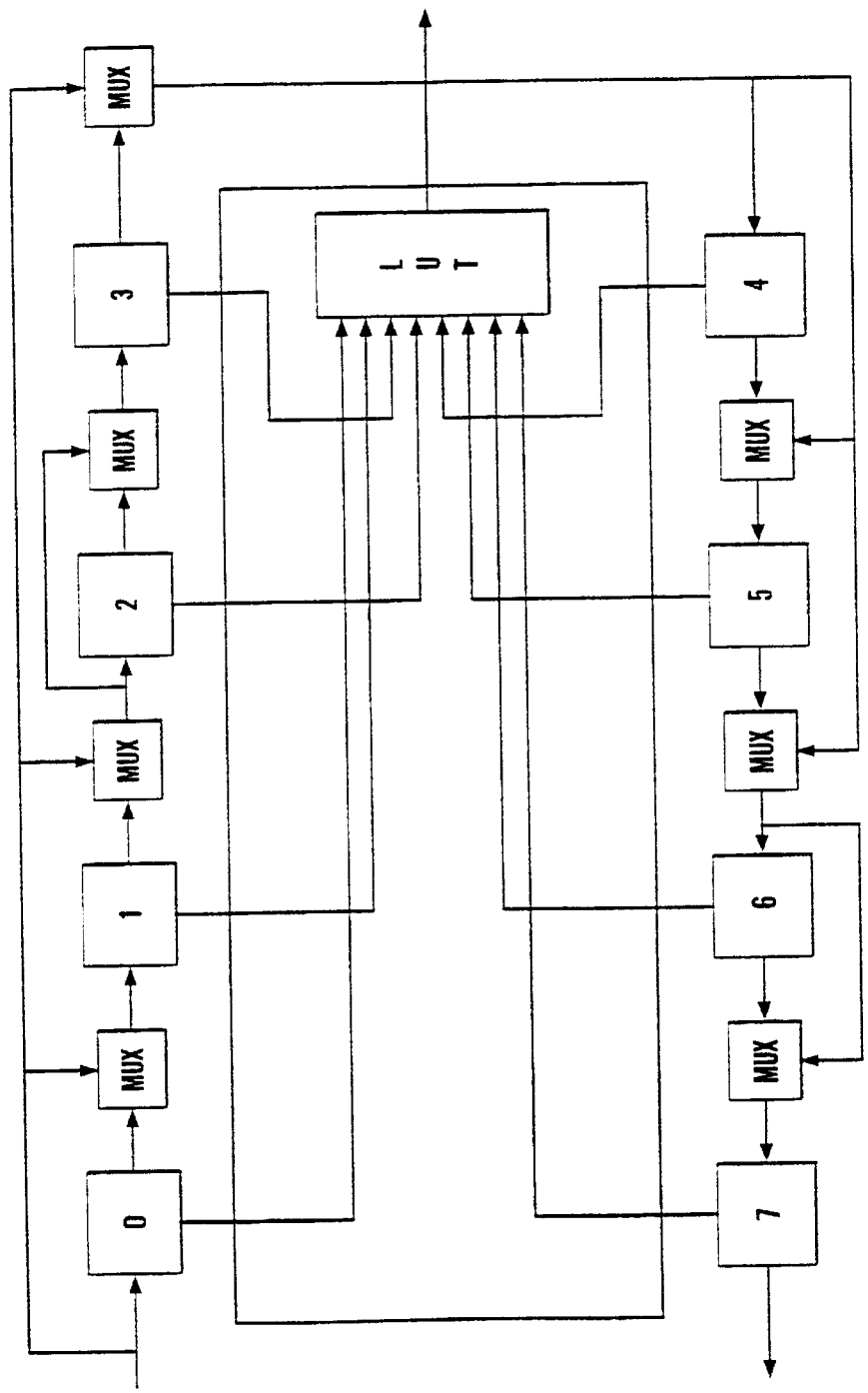
FIG. 17 a fifth embodiment of the data distribution tree in the search processor circuit according to the present invention.

A simple way of combining a result from the different processing circuits is the use of a look-up table (LUT). It is then possible to specify any requirements to the different processing circuits, including counting the number of matches, and as long a reasonable small tree is used, the size of the look-up table LUT shall not be too large. With eight comparator units it is necessary to set $2^8=256$ bits and this will be manageable. A possible implementation of the data distribution tree with LUT is given in FIG. 17. The main disadvantage by using, this method is that repetitive occurrences of patterns cannot be matched unless this takes place on the level of a single processing circuit or for the whole tree. This is due to the fact that with a LUT there will not be defined any combined results for a character which is examined by 2n units, but this is necessary in order that the sequence control shall work.

Figure 18:
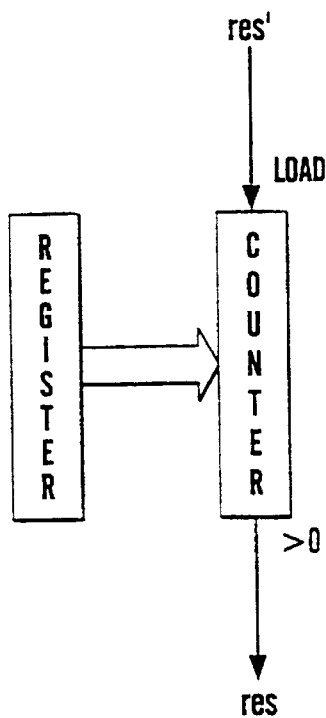
FIG. 18 the principle for how a positive result of a comparison is maintained for a certain number of characters, after the comparison in the present invention has taken place.

In certain situations it can be desirable to maintain hits for a longer time period, i.e, when a match has been found, the positive result will be maintained for a certain number of characters after the actual match. This can be used to perform searches where matches for several patterns shall be found within certain distances of each other. A simple implementation of this is shown in FIG. 18. Here some numerical value n is stored in a resister and when a match is found, this value is shifted into the counter. The final result is thus maintained at a positive value until the counter reaches 0 and any match will thus have a latency of n characters. This latently is called the hit latency.

Based on the above, it is evident that the use of trees and LUTs in order to gather results both have advantages and disadvantages. The tree method makes matching of repetitive patterns ease, but allows only specific logic functions while the LUT method allows all possible functions, but makes matching of repetitive patterns more cumbersome.

The obvious solution is hence to use both methods as this gives the user the possibility to choose the best method in each case, but this leads to additional overhead. Another possibility is to use different methods in different parts of the tree. For instance the tree method can be used of low levels. Where repeated patterns are most desirable, and a LUT on higher levels, where counting the number of hits for different patterns can be desirable, or alternatively both methods at low levels and only LUTs at high levels.

Figure 19:
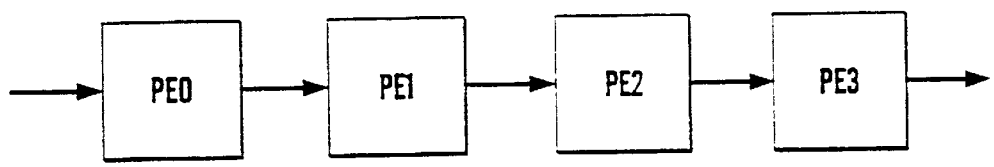
FIG. 19 the basic operating principle for how patterns are compared according to the present invention.
Figure 20:
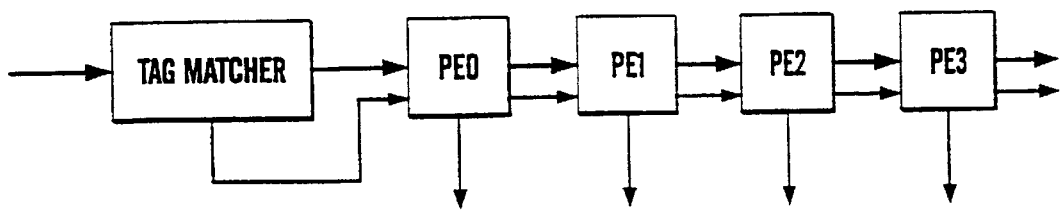
FIG. 20 the principle for how different documents with the use of tags for each document are managed in the present invention.

Textual data are often divided into a set of non-overlapping documents and when searches are performed on such documents, it is usually undesirable to retrieve matches that span several documents. It is hence necessary with some method or other to avoid this. Ignoring the data distribution tree FIG. 19 illustrates the basic operation of a search processor circuit for matching of patterns (Pattern Matching Chip (PMC)). Each processing circuit is here supposed to work with only a single character in the text. The document separation can now be handled with use of the setup shown in FIG. 20. Here a special pattern-matching unit placed at the beginning of the data path searches for a tag which indicates the beginning of a new document and a signal which indicates this, is passed alone together with the data to each processing circuit. Given this signal, the processing circuits can reset all latencies which may be set. This signal is also passed further onto the result selectors and the look-up tables LUTs which gather the results, such that positive result are accepted only when they occur within the same document.

Given the pattern matching capabilities which are described in the above, there are still two problems that must be solved.

The number of hits shall be sufficiently limited for the receiving system to handle.

It must be possible to handle different queries simultaneously in different part of the data distribution tree.

These two issues are related and will be discussed in the following.

Limiting the number of hits shall first be described. As facilities for returning hits from the pattern matching chip to a host processor probably shall have a limited capacity and the hits often arise in groups, it is necessary with some method or other to limit the number of hits. There are two obvious solutions to this problem:

Report only one hit for some number of adjacent characters.

Report only one hit for each document.

Figure 21:
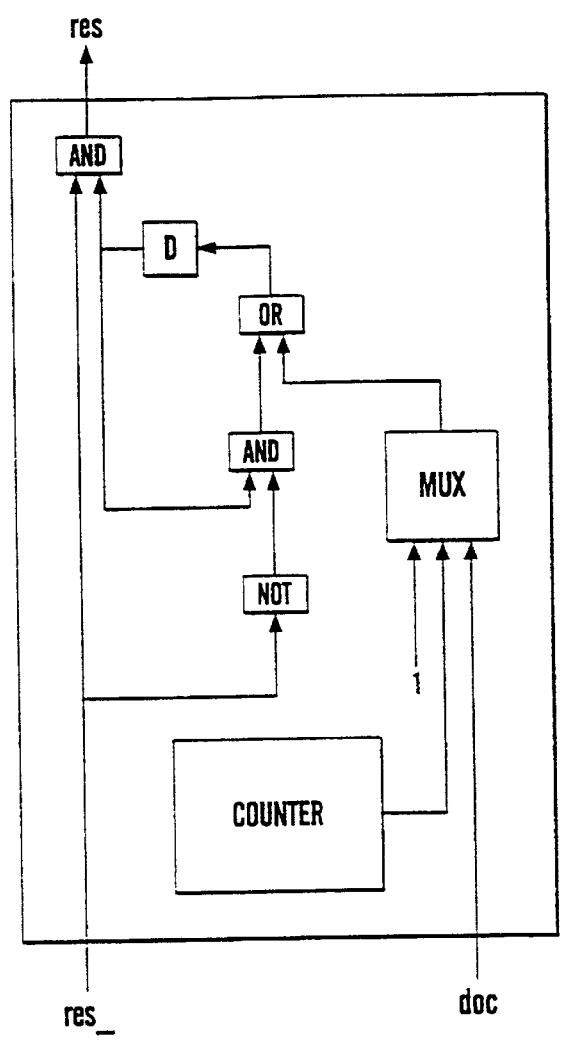
FIG. 21 the principle for how the number of hits in a match is limited in the present invention.

The natural choice is to use both these methods. FIG. 21 shows how this can be done. The flip-flop D keeps track of whether hits are reported within the current hit range, and the first input on the multiplexer MUX is chosen if all hits shall be reported, in addition, a counter could be used to count the number of hits, such that this number is returned instead if the actual hits. If only one hit per document is reported, then this count will be the number of documents with hits.

Figure 22:
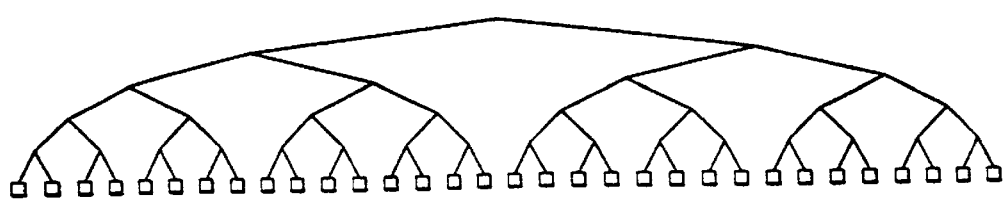
FIG. 22 schematically a data distribution tree for handling several queries simultaneously and wherein the leaf nodes comprise a plurality of processing circuits.
Figure 23:
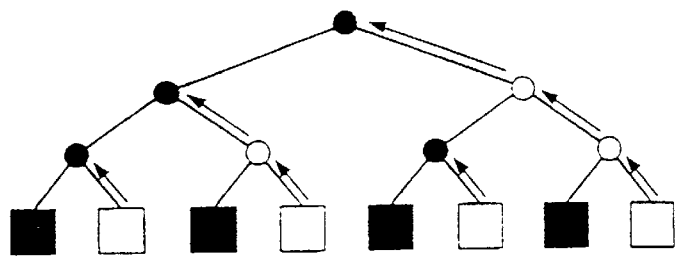
FIG. 23 the principle for how a reduction in the number of hits can be implemented on a data distribution tree in the search processor circuit according to the present invention.

Now shall the management of multiple queries be discussed. It can be a great advantage if the pattern matching chip (the search processor circuit) is able to handle several simultaneous queries. As the number of processing circuits which is necessary for single queries likely will vary greatly, it should be possible to configure this individually. One practical way of doing this is to let a part of the data distribution tree set up an individual query. The problem with this is that a very large number of results, $2n-1$ for n processing circuits, must be returned to the receiving system, i.e, for 512 processing circuits the number of possible results will be $2 \cdot 512-1=1023$, something which usually is regarded as too large. The most natural way of limiting this number is to set a lower limit for the number of processing circuits, which shall be used for a single query. A reasonable choice is here 16 and with 512 circuits this gives $2 \cdot 512/16-1=63$ possible results, which is an acceptable number. FIG. 22 shows schematically these possible results, as the boxes on the lower level of the tree consist of 16 processing circuits (or comparator units). When this is combined with the method described in the preceding section, a hit limitation unit could be included for each possible result. As it, however, never will be more than $^{63}/_{16}$ simultaneous queries, this number of circuits will be sufficient. For this to work, it is necessary with several hit limitation units to take the results from the number of possible queries, as these queries must be chosen such that none can be active simultaneously. FIG. 23 shows how this can be done, as the possible query points in black here have their own hit limitation unit while only the white query points distribute their results as shown by the arrows. In addition it is necessary to set a bit for each of the possible queries in order to indicate whether the result in question actually represents an independent query.

Now a detailed description of a processing circuit according to the invention shall be given. The processing circuit can be regarded as a module of the search processors and hence be described as search module. The detailed description will refer to Verilog codes for the separate units, as these codes as mentioned are given in tables of an appendix appended to the description.

The processing circuit or the search processor circuit includes a clock and the Verilog code for this clock is shown in table A1 of the appendix and the clock signal CLK is in any case given to respectively the comparator unit and the D flip-flops in the processing circuit or to all comparator units and D flip-flop in the search processor circuit. This is trivial and the provision of the clock and the clock signal lines is hence not shown.

Figure 24:
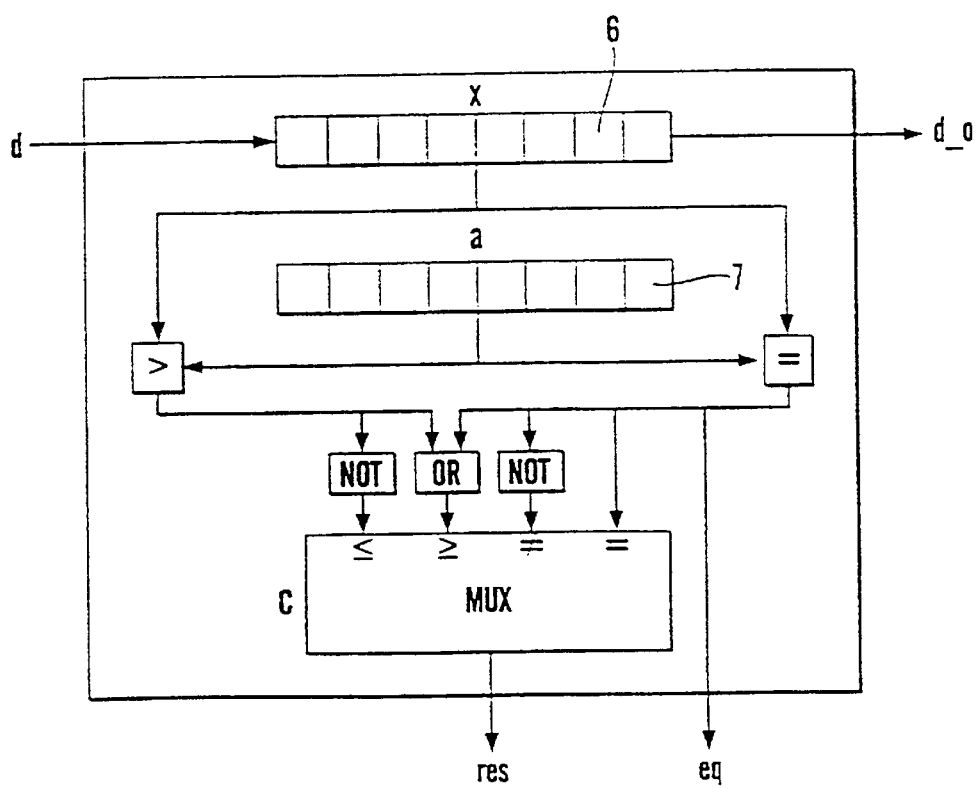
FIG. 24 the embodiment of a comparator unit in the processing circuit according to the present invention.

The kernel processor or the comparator unit is shown in FIG. 24. It, of course, corresponds to the kernel processor or comparator unit in FIG. 2. The register 6 contains as before the byte x which presently is shifted into the unit and the register 7 contains the byte a which x shall be compared with. As it can be seen from FIG. 25, four comparisons can be performed, viz. $x=a$, $x \geq a$, $x \neq a$, $x \leq a$. The result is given to the output as res. In addition the signal eq gives $x=a$, and this can be used to compare strings alphabetically and numerically, such this will be described in more detail below. The Verilog code which implements the kernel processor or the comparator unit is shown in table A2 of the appendix and an explanation of the interface of the comparator unit given by its inputs and outputs is evident from table 1.

TABLE 1

| Parameter | Parameter type | I/O | Width | Definition |
|---|---|---|---|---|
| d | Operational | In | 8 | Data input (data word x) |
| d_o | Operational | Out | 8 | Data output (data word x) |
| res | Operational | Out | 1 | Result output for comparison |
| eq | Operational | Out | 1 | Equality output |
| A | Configuring | In | 8 | Data input (data word a) |
| C | Configuring | In | 2 | Input for comparison operation; 0 means $\leq$, 1 means $\geq$, 2 means $\neq$, 3 means = |

Figure 25:
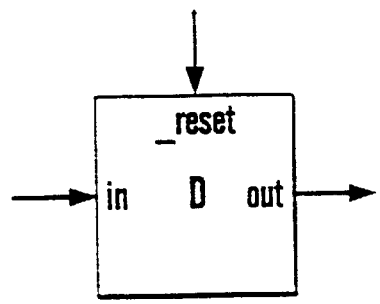
FIG. 25 the embodiment of a D flip-fiop in the processing circuit according to the present invention.

A D flip-flop is shown schematically in FIG. 25. The Verilog code which implements the D flip-flop is shown in table A3 of the appendix and an explanation of the interface given by its inputs and outputs is evident from table 2.

TABLE 2

| Parameter | Parameter type | I/O | Width | Definition |
|---|---|---|---|---|
| in | Operational | In | 1 | Data input |
| out | Operational | Out | 1 | Data output |
| _reset | Operational | In | 1 | Resets flip-flop when 0 |

Figure 26:
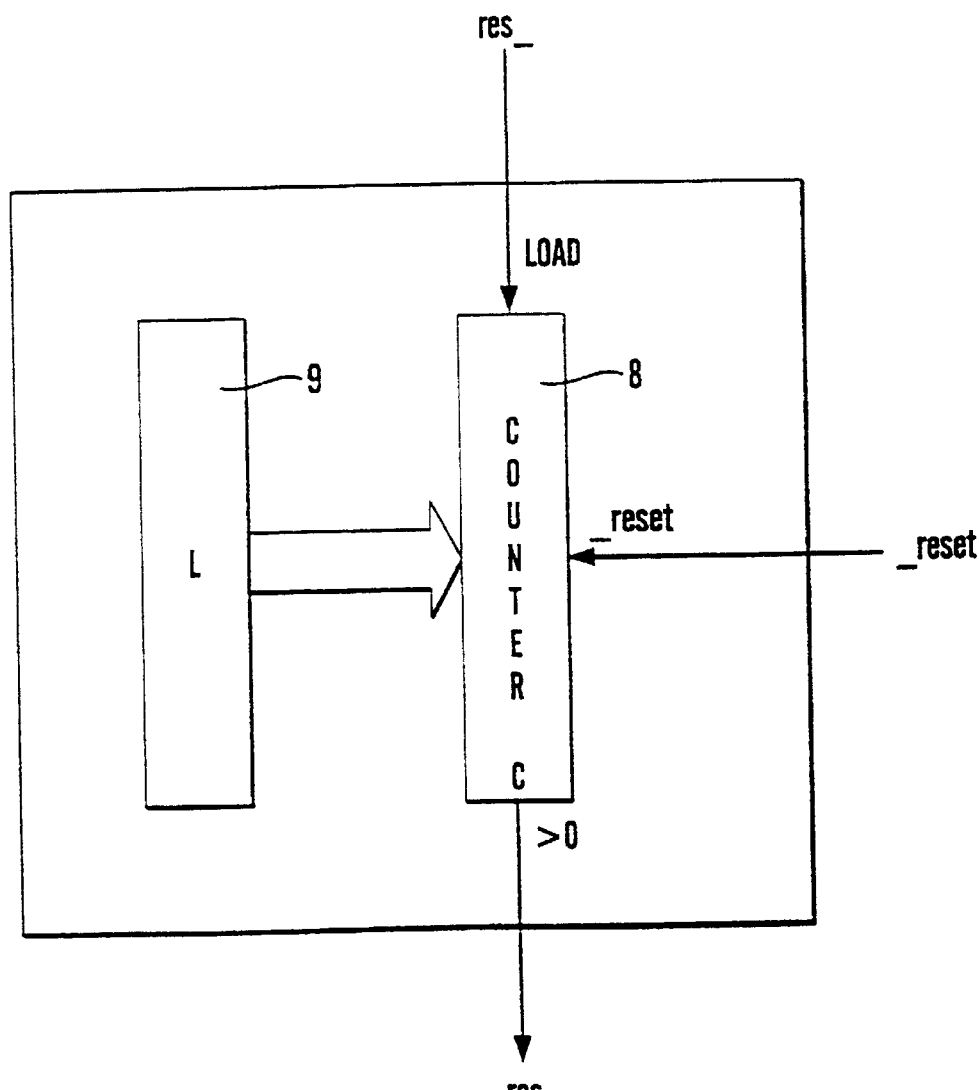
FIG. 26 the embodiment of a latency unit in the processing circuit according to the present invention.

The latency unit LAT is shown in FIG. 26 and is used for delaying a positive binary value res_ for a certain number of cycles. The register 9 contains the latency and the counter 8 is used for counting down from the time when a positive result is registered, res fives the modified result signal and the signal _reset resets the counter to 0. The Verilog code which implements the latency unit LAT is shown in table A4 of the appendix and an explanation of the interface given by its inputs and outputs is evident from table 3.

TABLE 3

| Parameter | Parameter type | I/O | Width | Definition |
|---|---|---|---|---|
| res_ | Operational | In | 1 | Data input (original) |
| res | Operational | Out | 1 | Data output (modified result) |
| _reset | Operational | In | 1 | Reset input, 0 gives reset |
| L | Configuring | In | W | Input for latency parameter: 0 means no latency. L = t means latency of t time units, L = t = $2^{W-1}$. means infinite latency |
| W | — | — | n/a | Latency width |

Figure 27:
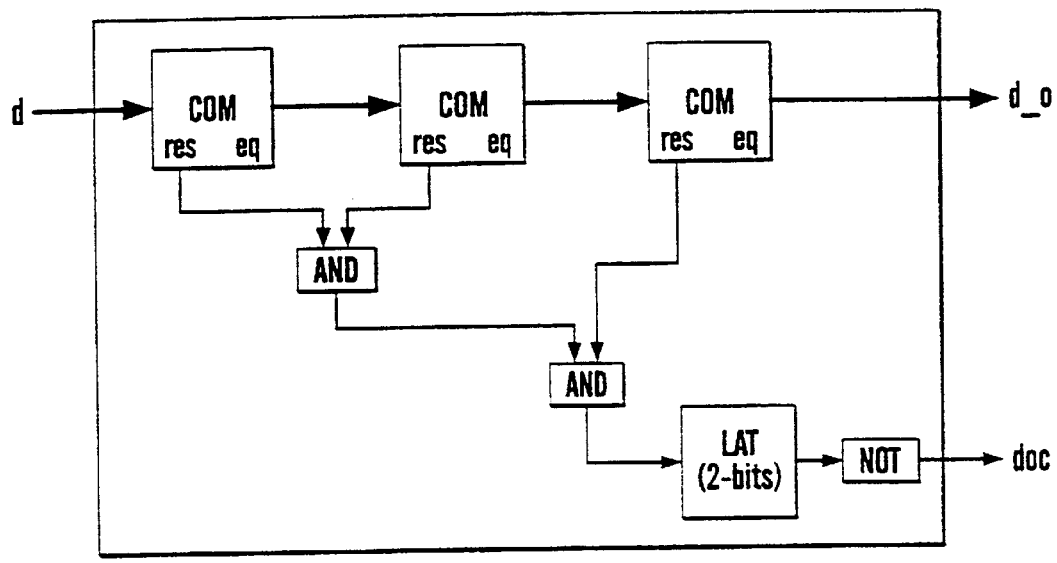
FIG. 27 the embodiment of a document management unit in the search processor circuit according to the present invention.

The document management unit DOC is shown in FIG. 27. It is used for letting the search processor circuit keeping track of various documents. The three comparator units or a suffix thereof are set to match a tag indicating a new document and the signal doc is set equal to 0 when this tag appears. The figure is slightly modified, as when less than three characters are used in a tag, the comparator unit or units farthest to the left shall not influence the result. The latency shall be set equal to the number of characters in the tag, viz 1 to 3. The Verilog code which implements this unit is given in table A5 of the appendix and an explanation of the interface given by its inputs and outputs is evident from table 4.

TABLE 4

| Parameter | Parameter type | I/O | Width | Explanation |
|---|---|---|---|---|
| d | Operational | In | 8 | Data input |
| d_o | Operational | Out | 8 | Data output |
| doc | Operational | Out | 1 | 0 when between documents |
| A1 | Configuring | In | 8 | Parameter of the first comparator unit |
| C1 | Configuring | In | 8 | Parameter of the first comparator unit |
| A2 | Configuring | In | 8 | Parameter of the second comparator unit |
| C2 | Configuring | In | 2 | Parameter of the second comparator unit |
| A3 | Configuring | In | 8 | Parameter of the third comparator unit |
| C3 | Configuring | In | 2 | Parameter of the third comparator unit |
| L | Configuring | In | 2 | Parameter of the latency unit, number of the tag bytes minus 1 |
| D | Configuring | In | 1 | Shall be set equal to 1 if DOC shall be used |

Figure 28:
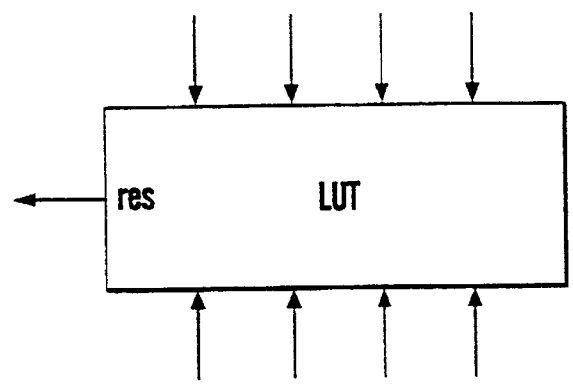
FIG. 28 schematically the embodiment of a look-up-table in the search processor circuit according to the present invention.

The look-up table unit LUT with 8 inputs is shown in FIG. 28 res gives the result. The Verilog code for the look-up table unit is given in table A6 of the appendix, while an explanation of the interface given by its inputs and outputs is evident from table 5.

TABLE 5

| Parameter | Parameter type | I/O | Width | Explanation |
|---|---|---|---|---|
| in | Operational | In | 8 | Input values |
| res | Operational | Out | 1 | Result |
| S | Configuring | In | 256 | Specifies which input values shall be accepted taking the first input value as the most significant bit |

The sequence control unit SC is used for realizing, the following three possibility:

Requiring that the preceding or a succeeding processing circuit or comparator unit reports a match before allowing the current to report a match.

Allowing matching of patterns where certain parts of the pattern may be missing.

Allowing matching of patterns where certain parts of the pattern may be repeated.

Figure 29:
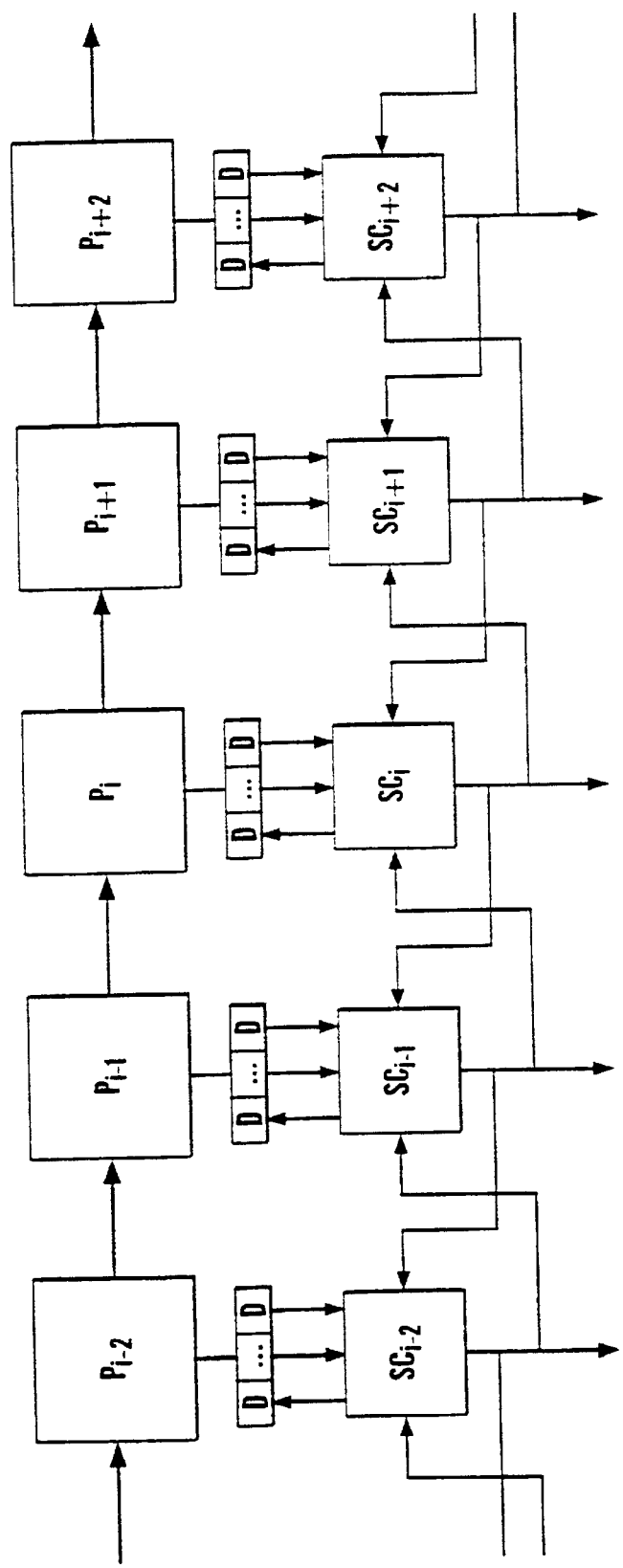
FIG. 29 the operating principle for how sequence control units are used together with processing circuits according to the present invention.
Figure 30:
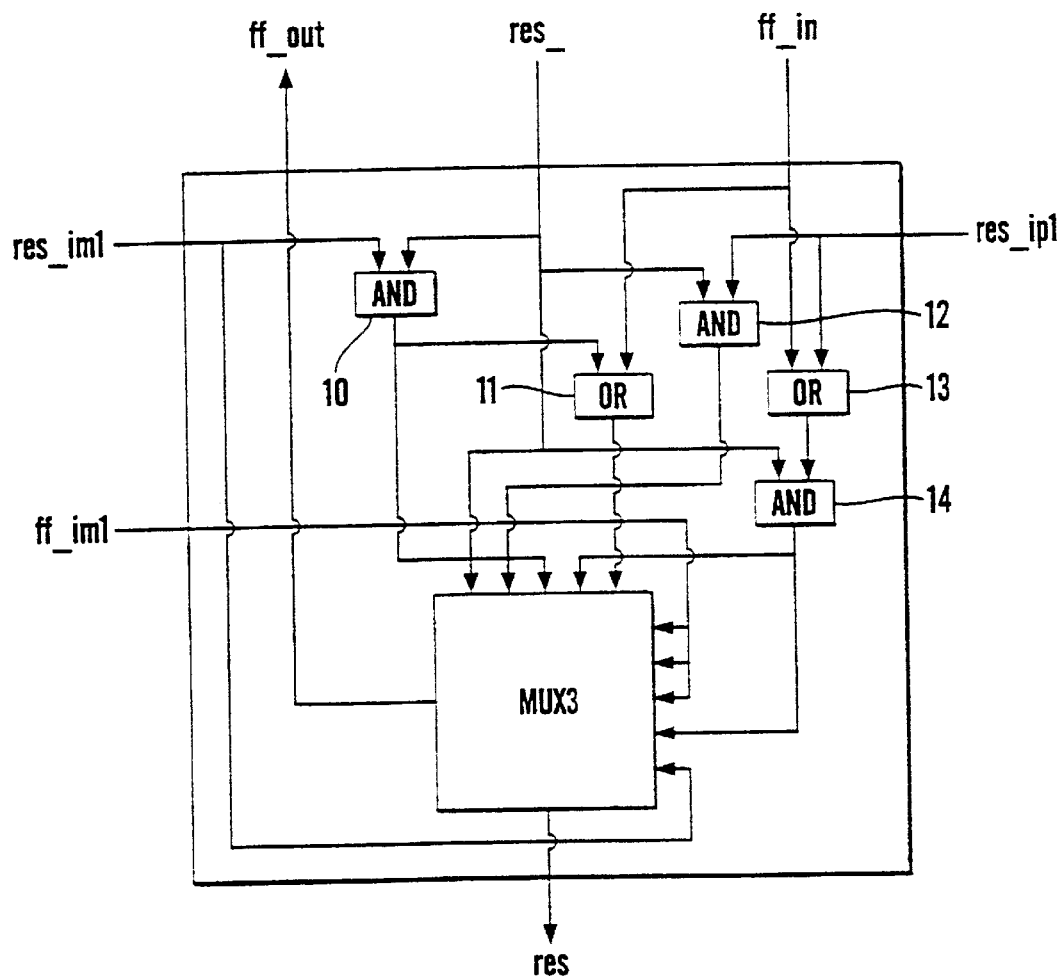
FIG. 30 the embodiment of a sequence control unit in the processing circuit according to the present invention.

The sequence control unit SC is placed together with a processing circuit which can be a single kernel processor or comparator unit or a group of processing circuits as well as a set of flip-flops. The number of flip-flops shall be equal the number of characters matched by the processing circuit. This is shown in FIG. 29. A sequence control unit SC can hence be implemented as shown in FIG. 30. Here three result values and values from the present and previous flip-flops are used as inputs and a new result value is output. It is now quite simply a matter of specifying the behavior of the sequence control unit SC which is purely combinatorial.

Truth tables for five cases, viz. no sequence control, forward sequence control, backward sequence control, matching of repeated patterns and matching of skipped patterns are respectively shown in the tables 6–10.

TABLE 6

No sequence control

| res__ | res_iml | res_ipl | ff_in | res | ff_out |
|---|---|---|---|---|---|
| 0 | X | X | X | 0 | X |
| 1 | X | X | X | 1 | X |

TABLE 7

Forward sequence control

| res__ | res_iml | res_ipl | ff_in | res | ff_out |
|---|---|---|---|---|---|
| 0 | X | X | X | 0 | X |
| 1 | X | 0 | X | 0 | X |
| 1 | X | 1 | X | 1 | X |

TABLE 8

Backward sequence control

| res__ | res_iml | res_ipl | ff_in | res | ff_out |
|---|---|---|---|---|---|
| 0 | X | X | X | 0 | X |
| 1 | 0 | X | X | 0 | X |
| 1 | 1 | X | X | 1 | X |

TABLE 9

Matching of repeated patterns

| res__ | res_iml | res_ipl | ff_in | res | ff_out |
|---|---|---|---|---|---|
| 0 | X | X | X | 0 | 0 |
| 1 | X | 0 | 0 | 0 | 0 |
| 1 | X | 0 | 1 | 1 | 1 |
| 1 | X | 1 | 0 | 1 | 1 |
| 1 | X | 1 | 1 | 1 | 1 |

TABLE 10

Skipping of patterns

| res__ | res_iml | res_ipl | ff_in | res | ff_out |
|---|---|---|---|---|---|
| X | 0 | X | 0 | 0 | 0 |
| X | 0 | X | 1 | 1 | 0 |
| 0 | 1 | X | 0 | 0 | 1 |
| 0 | 1 | 1 | 1 | 1 | 1 |
| 1 | 1 | X | X | 1 | 1 |

Even if it is not shown in the tables, the output ff_out in the first three cases shall be set equal to the output from the flip-flops in a previous processing circuit for allowing flip-flop values to flow through parts of the system. Based on the appended truth value tables, the symbolic forms shown in table 11 are easily derived. The resulting sequence control unit is shown in FIG. 30 and the multiplexer here chooses between operation modes, numbered from right to left and from top to bottom as shown in table 11.

TABLE 11

| | Symbolic expressions | |
|---|---|---|
| | res | ff_out |
| No sequence control | res__ | X |
| Forward sequence control | res__·res_ipl | X |
| Backward sequence control | res__·res_iml | X |
| Matching of repeated patterns | res__·(res_ipl + ff_in) | res__·(res_ipl + ff_in) |
| Skipping of patterns | res__·res_iml + ff_in | res_iml |

The Verilog code which implements the sequence control unit is shown in table A7 of the appendix and an explanation of the interface by its inputs and outputs is evident from table 12.

TABLE 12

| Parameter | Parameter type | I/O | Width | Definition |
|---|---|---|---|---|
| res | Operational | In | 1 | Result input (original result) |
| res_iml | Operational | In | 1 | Result input from preceding processor (processing unit) |
| res_ipl | Operational | In | 1 | Result input from succeeding processor (processing unit) |
| ff_in | Operational | In | 1 | Flip-flop input |
| ff_iml | Operational | In | 1 | Flip-flop input from a preceding processing unit |
| res | Operational | Out | 1 | Result output |
| ff_out | Operational | Out | 1 | Flip-flop output |
| S | Configuring | In | 1 | Parameter input for sequence control operation; 1 if sequence control should be used |
| D | Configuring | In | 1 | Parameter input for sequence control operation; 0 for forward sequence control. 1 for backward sequence control |
| MM | Configuring | In | 1 | Parameter input for sequence control operation; 1 if repeated/skipped patterns should be allowed |

The result selector RS is used for combining two result values from processing circuits or other results selectors. The following operations shall be supported:

Using only the first result.
Using only the second result.
Performing the boolean operation AND on two results.
Performing the boolean operation OR on two results.
Performing the operation $\leq$ over a set of processing circuits.
Performing the operation $\geq$ over a set of processing circuits.

Figure 31:
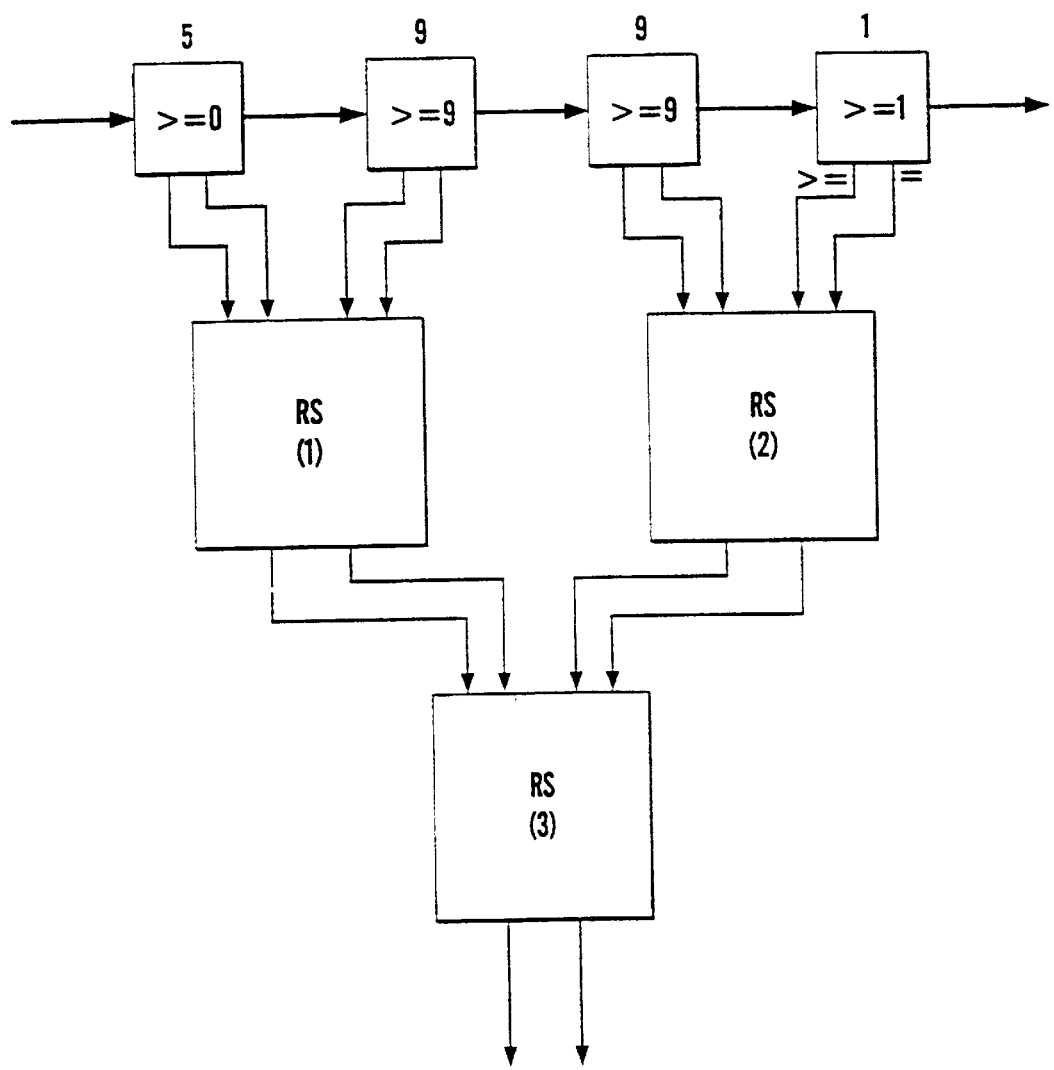
FIG. 31 the principle for how the character strings are compared with the use of result selectors in the search processor circuit according to the present invention.

The first four operations can be handled directly, the others are more complicated. FIG. 31 shows an example of how it is possible to match all strings alphabetically/numerically larger than 1990. To start with selector RS2; if the character which is matched by the rightmost processing unit and which is the leftmost digit in the number that is being matched, is larger than 1, this means that the whole number is larger and this will be the result. In this example they are equal and the other processing circuits decide. Selector RS2 thus returns equality. Selector RS1 once again follows the same principle. Here the second selector RS2 returns equality, while the first selector RS1 returns that the value is larger and this is the result from RS1. Selector RS3 does the same and returns that a number greater than 1990 has been found. For cases where alphabetical/numerical comparisons are made is res given as res=eq2res1±eq2res2.

Figure 32:
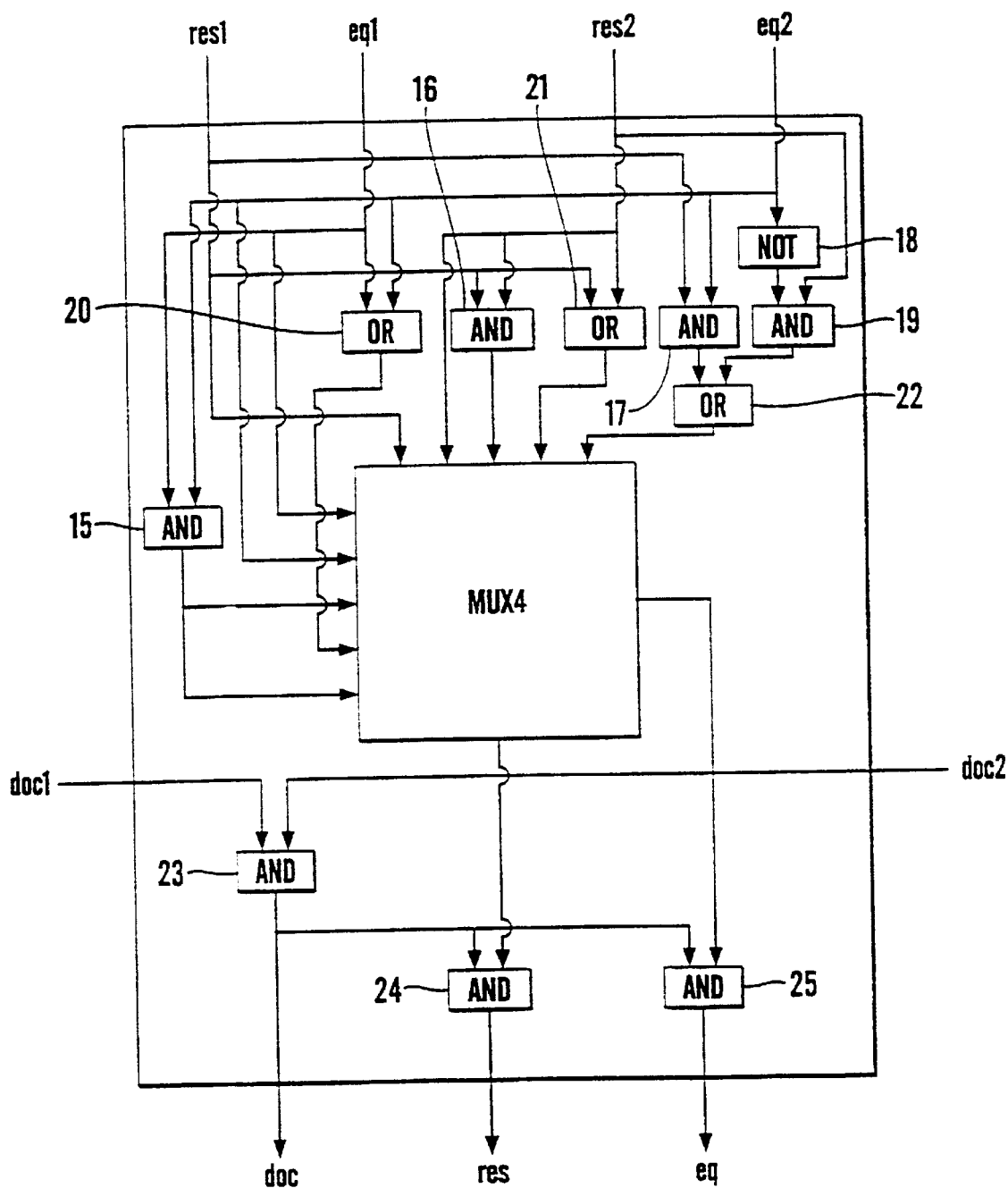
FIG. 32 the embodiment of a result selector in the processing circuit according to the present invention.

Based on the above features, the result selector implemented will look as shown in FIG. 32. The multiplexer MUX4 selects between the five operation modes, selects first result, selects the second result and performs the AND operation on results, performs the OR operation on results and performs string comparison.

The Verilog code which implements this unit is shown in table A8 of the appendix and an explanation of the interface given by its inputs and outputs are evident from table 13. The document signals are now used together with the document management unit to avoid acceptance of results which cross document borders.

TABLE 13

| Parameter | Parameter type | I/O | Width | Definition |
|---|---|---|---|---|
| doc1 | Operational | In | 1 | Document input for result selector |
| res1 | Operational | In | 1 | Result input 1 for result selector |
| eq1 | Operational | In | 1 | Equality input 1 for result selector |
| doc2 | Operational | In | 1 | Document input 2 for result selector |
| res2 | Operational | In | 1 | Result input 2 for result selector |
| eq2 | Operational | In | 1 | Equality input 2 for result selector |
| doc1 | Operational | Out | 1 | Document output from result selector |
| res | Operational | Out | 1 | Result output from result selector |
| eq | Operational | Out | 1 | Equality output from result selector |
| RM | Configuring | In | 3 | Parameter input for result selector |

Figure 33:
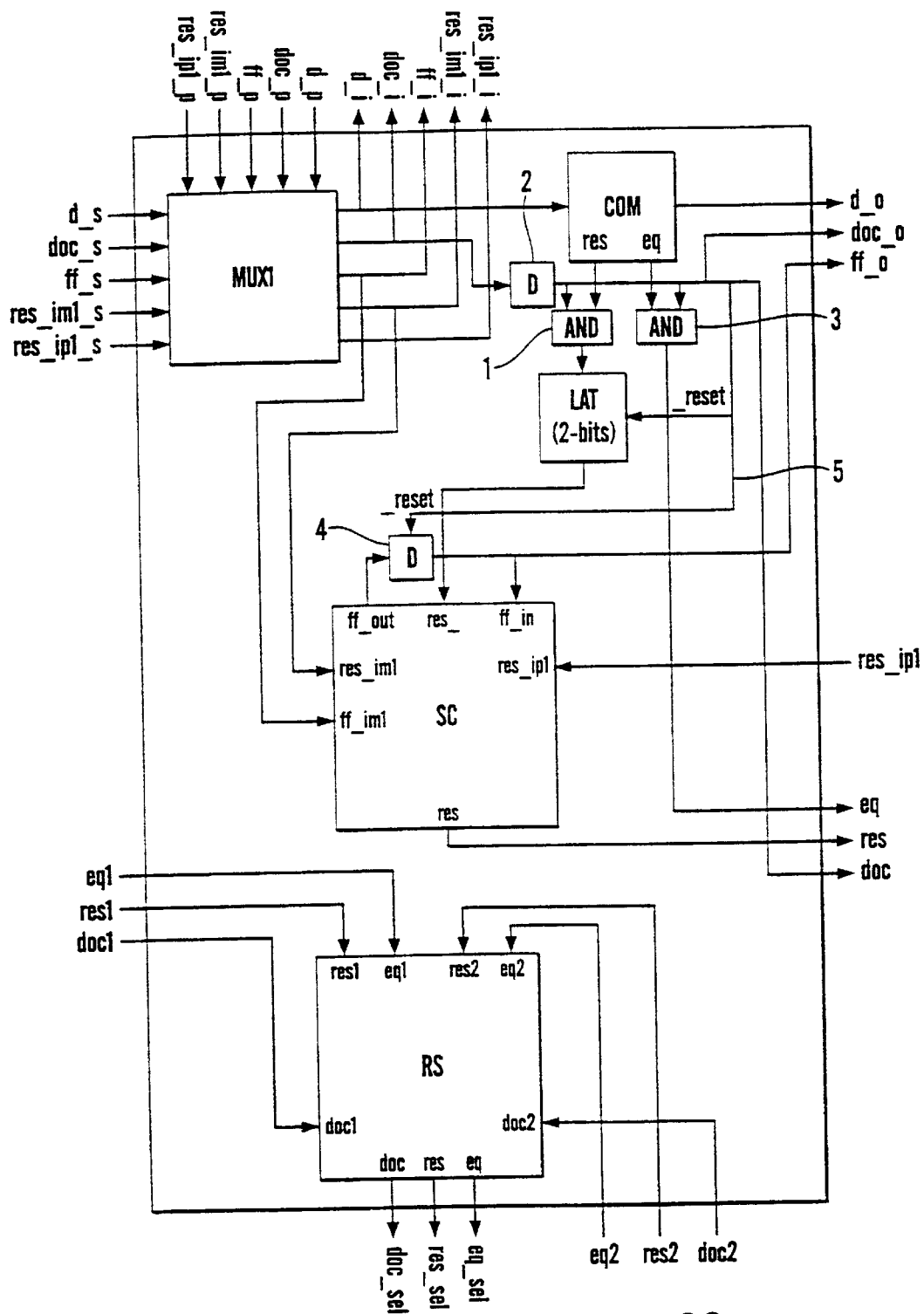
FIG. 33 an embodiment of the processing circuit according to the present invention.
Figure 34:
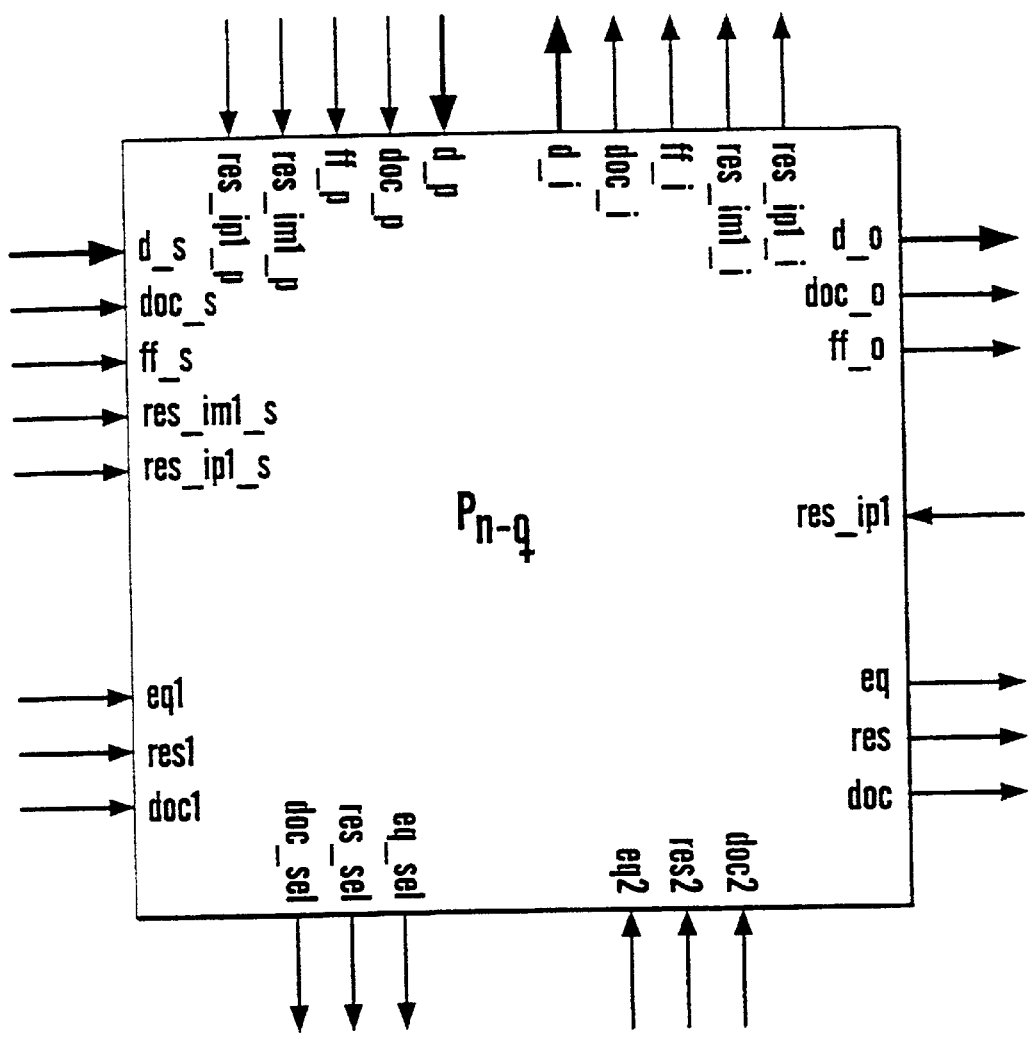
FIG. 34 a block diagram with inputs and outputs for the processing circuit in FIG. 33

The processing circuit according to the invention is shown in FIG. 34. It consists of at least one comparator unit COM, one latency unit LAT, D flip-flops 2,4, a sequence control unit SC and a result selector RS. A block version of the processing circuit with inputs and outputs is shown in FIG. 33. The Verilog code which implements the processing circuit is given in table A9 of the appendix, and an explanation of the interface given by its inputs and outputs is evident from table 14.

TABLE 14

| Parameter | Parameter type | I/O | Width | Definition |
|---|---|---|---|---|
| d_s | Operational | In | 8 | Sequential data input |
| doc_s | Operational | In | 1 | Sequential document input |
| ff_s | Operational | In | 1 | Sequential flip-flop input |
| d_p | Operational | In | 8 | Parallel data input |
| doc_p | Operational | In | 1 | Parallel document input |
| ff_p | Operational | In | 1 | Parallel flip-flop input |
| d_i | Operational | Out | 8 | Output for selected data value |
| doc_i | Operational | Out | 1 | Out for selected document value |
| ff_i | Operational | Out | 1 | Output for selected flip-flop value |
| d_o | Operational | Out | 8 | Data output |
| doc_o | Operational | Out | 1 | Document output |
| ff_o | Operational | Out | 1 | Flip-flop output |

TABLE 14-continued

| Parameter | Parameter type | I/O | Width | Definition |
|---|---|---|---|---|
| res_im1_s | Operational | In | 1 | Sequential input for result from a preceding processing circuit |
| res_im1_p | Operational | In | 1 | Parallel input for result from a preceding processing circuit |
| res_im1_i | Operational | Out | 1 | Output for selected result to a preceding processing circuit |
| res_ip1 | Operational | In | 1 | Input for result from a succeeding processing circuit |
| res_ip1_s | Operational | In | 1 | Sequential input for result from a succeeding processing circuit |
| res_ip1_p | Operational | In | 1 | Parallel input for result from a succeeding processing circuit |
| res_ip1_i | Operational | Out | 1 | Output for selected result to a succeeding processing circuit |
| doc | Operational | Out | 1 | Document output |
| res | Operational | Out | 1 | Result output |
| eq | Operational | Out | 1 | Equality output |
| doc1 | Operational | In | 1 | Document output 1 for result selector |
| res1 | Operational | In | 1 | Result input 1 for result selector |
| eq1 | Operational | In | 1 | Equality input 1 for result selector |
| doc2 | Operational | In | 1 | Document input 2 for result selector |
| res2 | Operational | In | 1 | Result input 2 for result selector |
| eq2 | Operational | In | 1 | Equality input 2 for result selector |
| doc_sel | Operational | Out | 1 | Document output from result selector |
| res_sel | Operational | Out | 1 | Result output from result selector |
| eq_sel | Operational | Out | 1 | Equality output from result selector |
| M | Configuring | In | 1 | Parameter input |
| A | Configuring | In | 8 | Parameter input for comparator unit |
| C | Configuring | In | 2 | Parameter input for comparator unit |
| L | Configuring | In | 2 | Parameter input for latency unit |
| S | Configuring | In | 1 | Parameter input for sequence control unit |
| D | Configuring | In | 1 | Parameter input for sequence control unit |
| MM | Configuring | In | 1 | Parameter input for sequence control unit |
| RM | Configuring | In | 3 | Parameter input for result selector |

Figure 35:
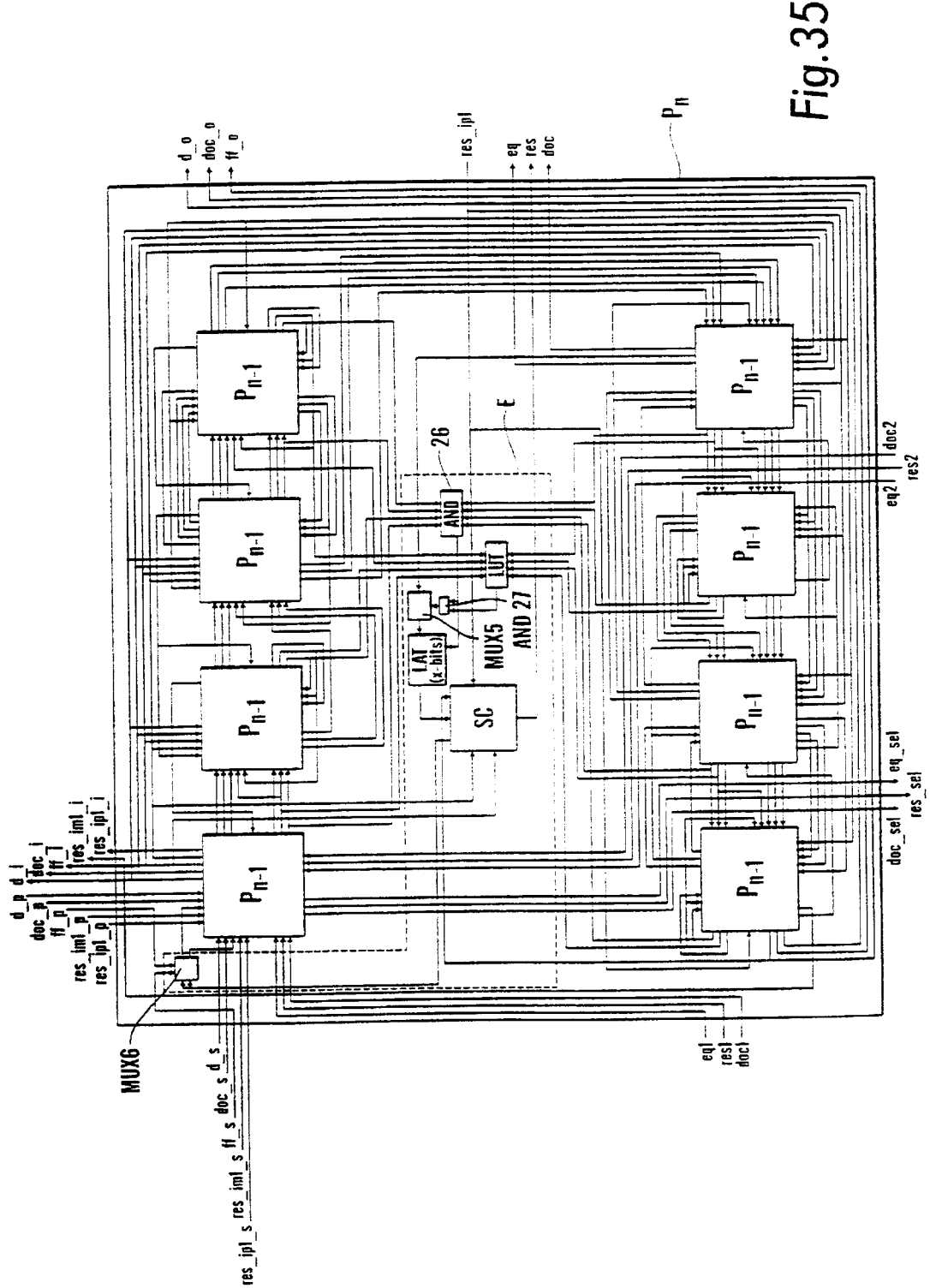
FIG. 35 an embodiment of the search processor circuit according to the present invention realized as a multiprocessor unit in the form of a data tree with eight processing circuits.

A data tree, i.e, a search processor circuit PMC according to the intention in the form of a multiprocessor unit $P_n$ is shown in FIG. 35. The multiprocessor unit is configured as a tree and consists herein of eight processing units $P_{n-1}$, a sequence control unit SC, a latency unit LAT and a LUT. The circuit $P_n$ or the data tree which may be denominated as "Tree8" has precisely the same interface as the processing circuits and this means that each processing circuit in the tree can be replaced by a tree of this kind, such that the tree can consist of any number of levels. This again implies that the data tree shall comprise a number of nested circuits $P_{n-q}$, such that each circuit on an underlying level $S_{n-q}$ is nested in a circuit on the overlying level $S_{n-q+1}$, if the data tree itself forms the highest level, namely the level $S_n$ and $q \in \{1,2,\ldots,n\}$. If the tree is a regular tree, e.g, a binary tree, the processing circuit $P_{n-q}$ on a level will map the processing circuit $P_{n-q+1}$ on the overlying level $S_{n-q+1}$ recursively and in case of a binary tree of course with a mapping factor of 2. As the general search problem, as mentioned in the introduction, can be regarded as a binary partitionable problem, it is of course nothing against managing a partitioning problem of this kind with for instance a tree where the degree is not 2, but 4, 8, 16 etc., a circumstance which here is called superbinary. Generally one has the degree $k=2^m$, where m for superbinary trees are an integer greater than 1, in other words k>2. In a recursive mapping the mapping factor is of course r=k. The tree in FIG. 35 may for instance be regarded as a processor with two levels $S_1$, $S_2$, as the first level comprises the eight processing circuits $P_1$ which then again for instance each corresponds to the processing circuit in FIG. 33, and consequently each comprises only one kernel processor or one comparator element COM. The kernel processors are thus the leaf nodes of the tree and forms the zeroth level $S_0$ in the tree, realized by the circuits $P_0$ on the zeroth level in the tree, while the processing circuit $P_1$ comprises a kernel processing unit $P_0$ and a logic element E, represented by the remaining components in the processing circuit in FIG. 33. On the level $S_2$ the circuit is identical with the search processor itself and this then in addition to the eight processing circuits $P_1$ on the level $S_1$ itself comprises a logic unit E substantially comprising the mentioned sequence control unit SC, a latency unit LAT and a LUT. Such described the multiprocessor unit $P_n$ in FIG. 35 becomes a symmetric and balanced reduced tree, as each processing circuit $P_1$ only comprises a single comparator unit. It is, however, nothing against that the search processor circuit or the tree8 is realized as a regular unreduced tree of degree 8 and then the eight processing circuits $P_1$, on the first level each would comprise eight kernel processors or comparator units $P_0$, such that it will be 64 in total. If the tree is extended with yet a level and regularity kept, the zeroth level.

$S_0$ would come out with 512 kernel processors or comparator units, the first level $S_1$ with 64 processing circuit $P_1$, the second level $S_2$ with 8 processing circuits $P_2$ and the search processor unit circuit would be made up of the circuit $P_3$ on the level $S_3$. The Verilog code which imminent the tree8 as shown in FIG. 35 is given in the table A10 of the appendix and an explanation of the interface of the search processing circuit as given by its inputs and output is evident from table 15.

TABLE 15

| Parameter | Parameter type | I/O | Width | Definition |
| --- | --- | --- | --- | --- |
| d_s | Operational | In | 8 | Sequential data input |
| doc_s | Operational | In | 1 | Sequential document input |
| ff_s | Operational | In | 1 | Sequential flip-flop input |
| d_p | Operational | In | 8 | Parallel data input |
| doc_p | Operational | In | 1 | Parallel document input |
| ff_p | Operational | In | 1 | Parallel flip-flop input |
| d_i | Operational | Out | 8 | Output for selected data value |
| doc_i | Operational | Out | 1 | Output for selected document input |
| ff_i | Operational | Out | 1 | Output for selected flip-flop value |
| d_o | Operational | Out | 8 | Data output |
| doc_o | Operational | Out | 1 | Document output |
| ff_o | Operational | Out | 1 | Flip-flop output |
| res_im1_s | Operational | In | 1 | Sequential input for result from a preceding processing unit |
| res_im1_p | Operational | In | 1 | Parallel input for result from a preceding processing unit |
| res_im1_i | Operational | Out | 1 | Output for selected result from a preceding processing unit |
| res_ip1 | Operational | In | 1 | Result input from a succeeding processing unit |
| res_ip1_s | Operational | In | 1 | Sequential input for the result from a succeeding processing unit |
| res_ip1_p | Operational | In | 1 | Parallel input for the result from a succeeding processing unit |
| res_ip1_i | Operational | Out | 1 | Output for selected result from a succeeding processing unit |
| doc | Operational | Out | 1 | Document output |
| res | Operational | Out | 1 | Result output |
| eq | Operational | Out | 1 | Equality output |
| doc1 | Operational | In | 1 | Document input 1 from result selector |
| res1 | Operational | In | 1 | Result input 1 for result selector |
| eq1 | Operational | In | 1 | Equality input 1 for result selector |
| doc2 | Operational | In | 1 | Document input 2 for result selector |
| res2 | Operational | In | 1 | Result input 2 for result selector |
| eq2 | Operational | In | 1 | Equality input 2 for result selector |
| doc_sel | Operational | Out | 1 | Document input from result selector |
| res_sel | Operational | Out | 1 | Result output from result selector |
| eq_sel | Operational | Out | 1 | Equality output from result selector |
| M | Configuring | In | — | Parameter input |
| A | Configuring | In | — | Parameter input for comparator unit |
| C | Configuring | In | — | Parameter input for comparator unit |
| L | Configuring | In | — | Parameter input for latency unit |
| S | Configuring | In | — | Parameter input for sequence control unit |
| D | Configuring | In | — | Parameter input for sequence control unit |
| MM | Configuring | In | — | Parameter input for sequence control unit |
| RM | Configuring | In | — | Parameter input for result selector |
| LM1 | Configuring | In | 1 | Signal control |
| LM2 | Configuring | In | 1 | Look-up-table control |
| LS | Configuring | In | 1 | Parameter input for sequence control unit |
| LD | Configuring | In | 1 | Parameter input for sequence control unit |
| LM | Configuring | In | 1 | Parameter input for sequence control unit |
| LL | Configuring | In | W | Latency for multiprocessor |
| LLS | Configuring | In | — | Parameter for look-up-table module |

If the search processor for instance is realized with respectively 64 or 512 kernel processors, the search processor can very well be realized as a nested circuit in the form of a regular tree with the mapping factor 8, but can also be realized directly as respectively a tree64 or a tree512. In any case the Verilog code for a search processor with 64 kernel processors shown in table A11 of the appendix, while the Verilog code for a search processor with 512 kernel processors is shown in table A12 of the appendix.

Figure 36:
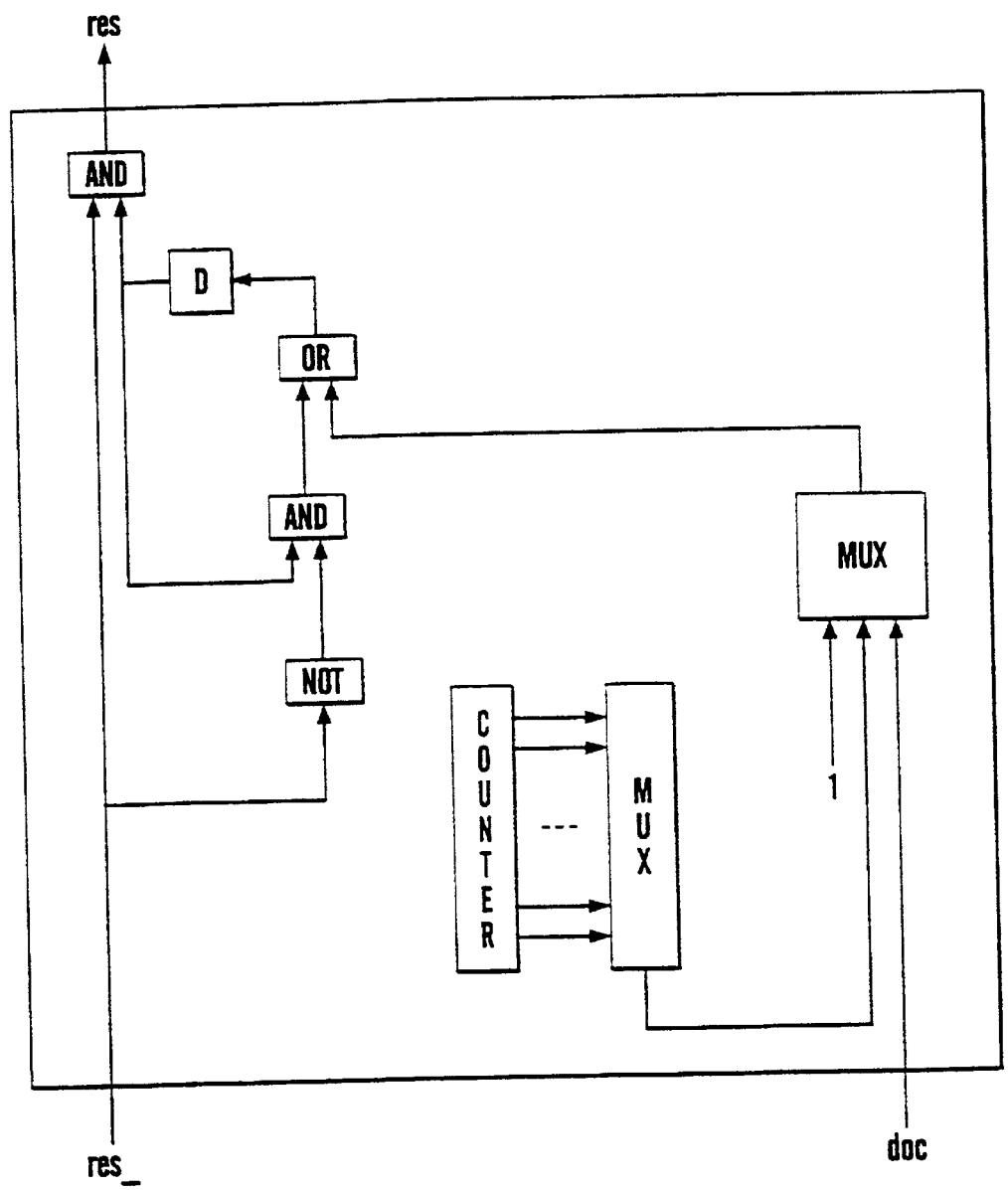
FIG. 36 a hit management unit as used in the search processor circuit according to the present invention.

The hit management unit HIT is shown in FIG. 36. The flip-flop is here used to keep track of whether the next unit shall be reported or not. The Verilog code which implements the hit management unit is shown in table A13 of the appendix and an explanation of the interface given by its inputs and outputs is evident in table 16.

TABLE 16

| Parameter | Parameter type | I/O | Width | Definition |
| --- | --- | --- | --- | --- |
| res__ | Operational | In | 1 | Original result |
| doc | Operational | In | 1 | Document signal |
| res | Operational | Out | 1 | Result |
| M | Configuring | In | 2 | Hit management method to be used - 0 means no hit management. 1 use counter. 2 use document signal |
| MM | Configuring | In | width | Counter bit to be selected |
| W | Configuring | Parameter | n/a | Width of counter is $2^w$ |

Figure 37:
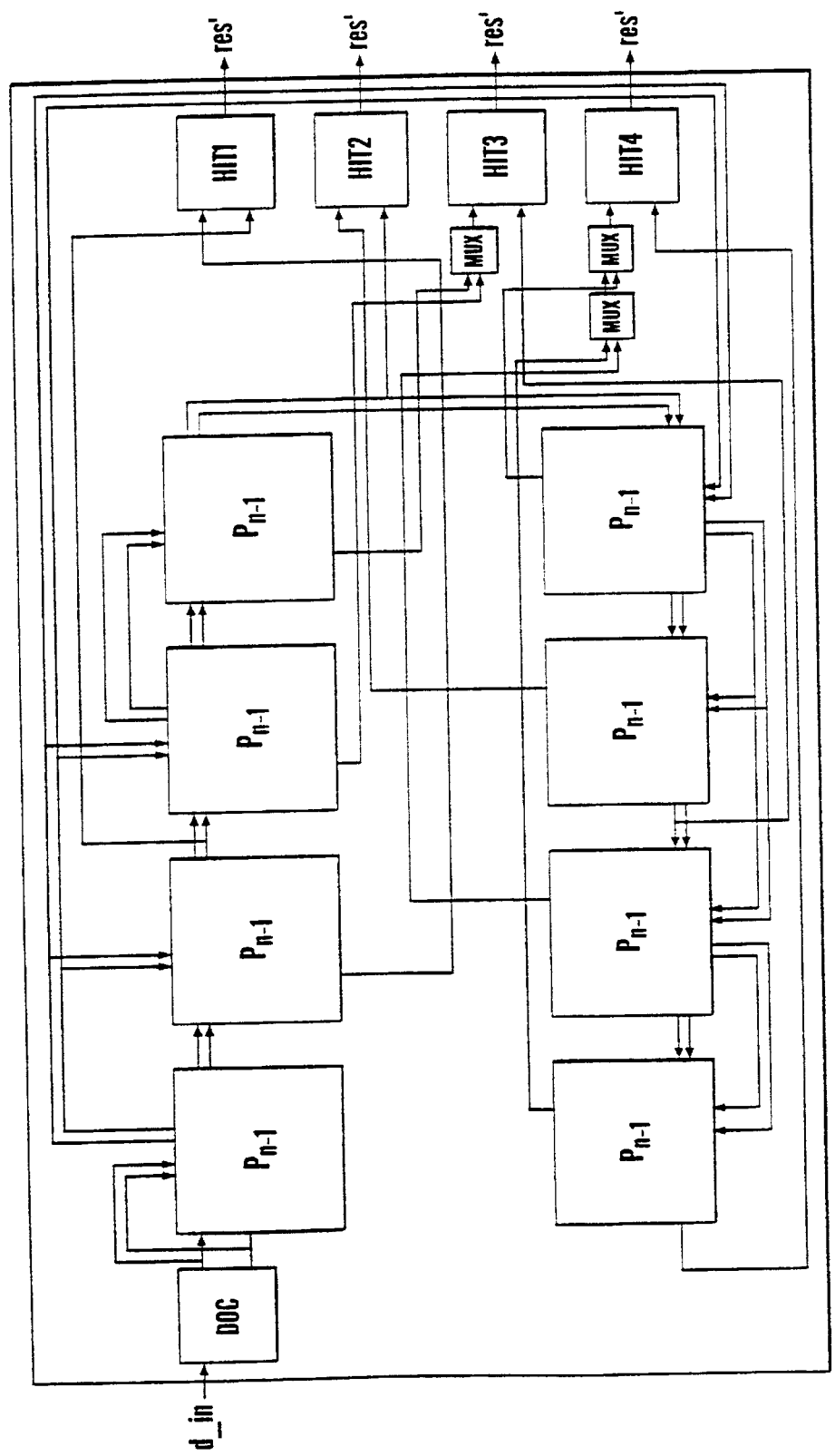
FIG. 37 the search processor circuit in FIG. 36 realized with the use of a document management unit as shown in FIG. 27 and hit management units as shown in FIG. 36, and FIG. 38 a kernel processor comprising a comparator unit and a sequence control unit.

How respectively the document management unit DOC and the hit management unit HIT is provided in a search processing circuit PMC in the form of a multiprocessor unit $P_n$ or a tree8 as shown in FIG. 35 is evident from the appended FIG. 37. For reasons of clarity it is only the connection between DOC and HIT and the multiprocessor unit shown in FIG. 37, while the remaining signal lines have been left out. It will there be seen that the search processor circuit PMC in addition to the multiprocessor unit $P_n$ here comprises a document management unit DOC which via a data output is connected with respectively the sequential and the parallel data input on the multiprocessor unit $P_n$ and via a document output with the sequential document input on the multiprocessor unit $P_n$. Further, the search processor circuit PMC also comprises $\frac{1}{2}k=2^{m-1}=2^{3-1}=4$ hit management units HIT1–4 connected with respectively result outputs and document outputs on the processing circuits $P_{n-1}$, each hit management unit HIT via a result output being connected with respective result outputs in the interface of the search processor circuit. A hit management unit is in addition schematically shown in FIG. 21 and discussed in connection therewith. Further, the provision of the hit management unit HIT in a search processor circuit PMC realized as a multiprocessor circuit with tree structure shown in FIG. 23, and there has in connection with this figure already been described how the hit management unit can be used for reporting results from multiple questions. It shall hence not be treated more closely here. It shall, however, be remarked that hit management units only are provided in the black nodes, while the white nodes in FIG. 23 distributes their results as shown with the arrows.

It is thus on the input of two of the hit management units as shown in FIG. 37 provided one respective two multiplexers.

In a practical implementation on a circuit chip thy search processor circuit PMC according to the intention preferably will be realized as a superbinary tree with k for instance equal to $2^3$, $2^6$ or $2^9$ and hence appear as a superbinary tree with a balanced reduction on the zeroth level. This again implies that the multiprocessor unit $P_n$ becomes equal to $P_2$ and forms respectively a tree8 with 8 processor units $P_1$, or a tree64 with 64 processing units $P_1$ or a tree512 with 512 processing units $P_1$ which in their turn each comprises a single comparator unit COM. On the zeroth level is hence the tree reduced. Then also the logic unit E in each processing circuit $P_1$ can be realized with only one single sequence control unit SC, apart from flip-flops, the multiplexer MUX1, the latency unit LAT and the result selector RS.

Finally it shall be remarked that the multiprocessor unit $P_n$ in the search processor circuit PMC according of the intention forms a special case of multiprocessor architectures based on tree networks of arbitrary degrees and with an arbitrate number of levels, such these are disclosed in the above-mentioned international patent application No. PCT/NO99/0308 (Halaas & al.) which belongs to the present applicant and which derives priority from NO patent application No. 19984746 of Oct. 9, 1998. A particular feature of a multiple processor architecture of this kind is that the single data processors only is provided on the zeroth levels in the tree structure or correspond to the processing circuits on the first level in the tree structure if the tree is a reduced tree. If the reduction is symmetric and balanced on the zeroth level $S_0$, the circuit is additionally generated recursively on overlying levels $S_2, \ldots S_n$ by than processing circuit $P_1$ on the level $S_1$. Such circuits can be implemented wvith particularly good economy to handle data processing problems with arbitrary degree of partitioning, the classical search problem of course, being a generally binary partitionable data processing problem.

Figure 38:
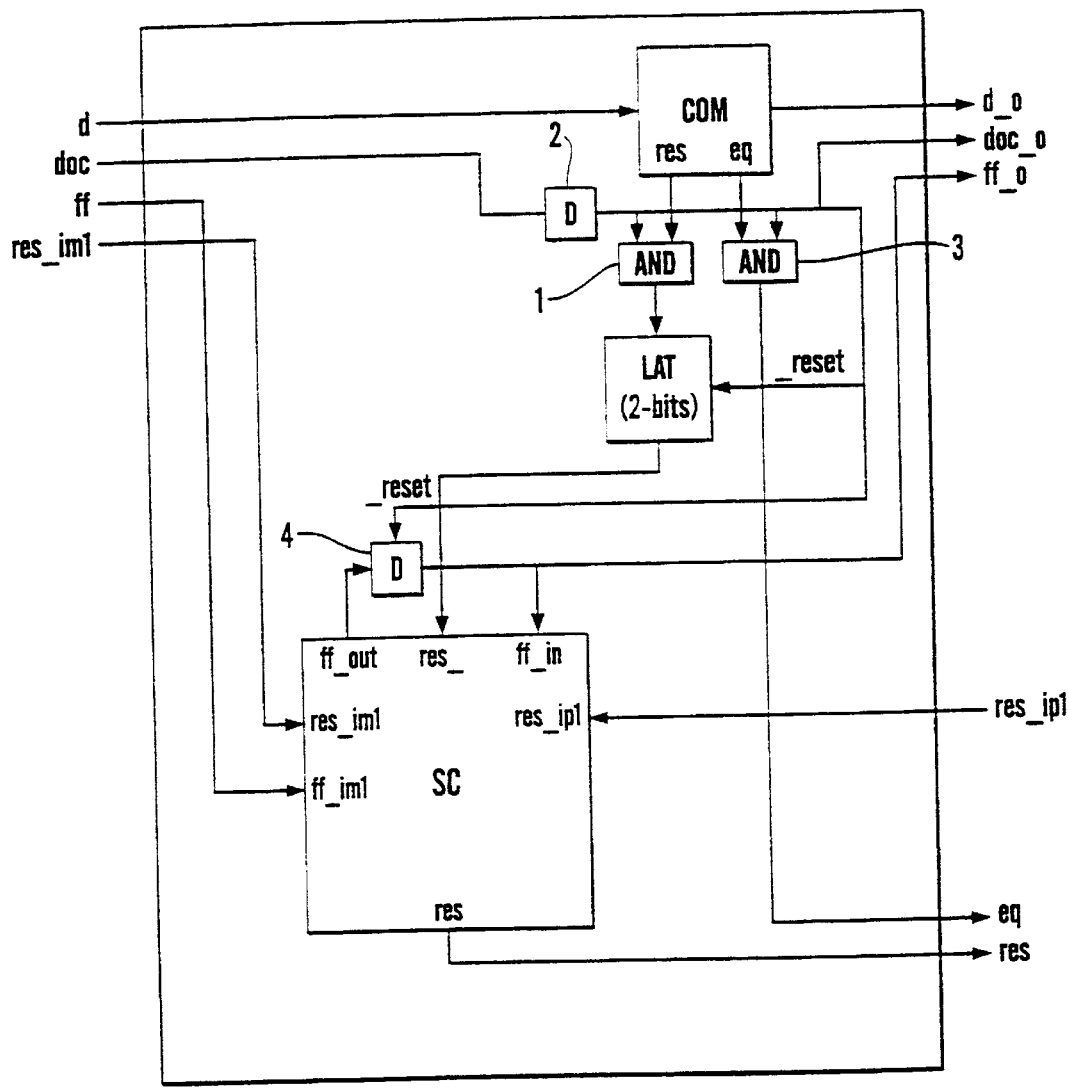

With basis in Halaas & al, a kernel processor $P_0$ hence formally will correspond to the connection in FIG. 8 and comprises in addition to the processor proper the comparator unit COM, a latency unit LAT, a sequence control SC, the necessary number of flip-flops 2, and logic gates 1, 3 as shown in FIG. 38. For each comparator unit COM it must, of course, be provided a sequence control unit SC, cf. FIG. 29. The processing circuit $P_1$ in FIG. 33 could thus in reality comprise two or possibly more comparator units with a logic unit E provided with the corresponding number of sequence control units SC. The interface of a circuit $P_0$ with a comparator unit COM which formally is the kernel processor proper 17 and a sequence control unit SC will then be given by the inputs and the outputs of the circuits such they are evident from table 17.

TABLE 17

| Parameter | Parameter type | I/O | Width | Definition |
| --- | --- | --- | --- | --- |
| d | Operational | In | 8 | Data input |
| doc | Operational | In | 1 | Data output |
| ff | Operational | In | 1 | Flip-flop input |
| d_o | Operational | Out | 8 | Data output |
| doc_o | Operational | Out | 1 | Document output |
| ff_o | Operational | Out | 1 | Flip-flop output |
| res_im1 | Operational | In | 1 | Result input from a preceding processor |
| res_ip1 | Operational | In | 1 | Result input from succeeding processor |
| res | Operational | Out | 1 | Result output |
| eq | Operational | Out | 1 | Equality output |
| A | Configuring | In | 8 | Parameter input for comparator unit |
| C | Configuring | In | 2 | Parameter input for comparator unit |
| L | Configuring | In | 2 | Parameter input for latency unit |
| S | Configuring | In | 1 | Parameter input for sequence control unit |
| D | Configuring | In | 1 | Parameter input for sequence control unit |
| MM | Configuring | In | 1 | Parameter input for sequence control unit |

In practice the search processor circuit PMC according to the present invention is implemented as an integrated circuit chip solution and preferably this is realized as a superbinary tree where the processing circuits $P_1$ on the level $S_1$ has only a single comparator COM. All actual processing (search and matching operations) then take place on this level. An implementation where the search processor circuit $P_n=P_2$, i.e, formally with 3 levels, forms a superbinary tree with for instance 512 processing circuits $P_1$, further provides an extremely good degree of exploitation of the circuit chip.

TABLE A1

Clock

```
module Clock(CLK);
    output CLK;
    reg      c;
    initial c = 0;
    always #1 c = ~c;
    assign CLK = c;
endmodule // Clock
```

TABLE A2

Comparator unit

```
module CompEl(d, d_o, res, eq, A, C, CLK);
    input [7:0] d;
    output [7:0] d_o;
    output res;
    output eq;
    input [7:0] A;
    input [1:0] C;
    input       CLK;
    reg [7:0] X;
    wire la;
    wire lse;
    wire lae;
    wire neq;
    always @ (posedge CLK) X = d;
    assign la = (X > A);
    assign eq = (X === A);
    assign lse = ~la;
    assign lae = la | eq;
    assign neq = ~eq;
    assign res = (C === 0) ? lse :
        ((C === 1) ? lae : ((C === 2) ? neq : eq));
    assign d_o = x;
endmodule // CompEl
```

TABLE A3

D flip-flop

```
module Dff(in, out, _reset, CLK);
    input  in;
    output out;
    input  _reset;
    input  CLK;
    reg    ff;
    assign out = ff;
    always @ (posedge CLK) ff = (_reset == 0) ? 0 : in;
    initial begin
        ff = 0;
    end
endmodule // Dff
```

TABLE A4

Latency unit

```
module Latency (res_, res, _reset, L, CLK);
    parameter       width = 2;
    input           res_;
    output          res;
```

TABLE A4-continued

Latency unit

```
    input                _reset;
    input [width - 1:0] L;
    input                CLK;
    reg [width - 1:0] c;
    initial c = 0;
    always @ (posedge CLK) c = (_reset) ?
                              ((res_) ?
                              ((~(&L)) ? L + 1 : L) :
                              (((c > 0) && (~(&L))) ?
                              c - 1 :
                              c)) :
                              0;
    always @ (posedge res_) c = (~(&L)) ? L + 1 : L;
    always @ (negedge res_) c = ((c > 0) & & (~(&L))) ?
                              c - 1 :
                              c;
    assign res = (c > 0);
endmodule // Latency
```

TABLE A5

Document management unit

```
module DocMan(d, d_o, doc, A1, C1, A2, C2, A3, C3, L, D, CLK);
    input  [7:0]  d;
    output [7:0]  d_o;
    output [7:0]  doc;
    input  [7:0]  A1;
    input  [1:0]  C1;
    input  [7:0]  A2;
    input  [1:0]  C2;
    input  [7:0]  A3;
    input  [1:0]  C3;
    input  [1:0]  L;
    input         D;
    input         CLK;
    wire   [7:0]  md1;
    wire   [7:0]  md2;
    wire          m1;
    wire          m2;
    wire          m3;
    wire          m4;
    wire          res1;
    wire          res2;
    wire          res3;
    wire          dummy1;
    wire          dummy2;
    wire          dummy3;
    CompEl c1(d, md1, res1, dummy1, A1, C1, CLK);
    CompEl c2(d, md2, res2, dummy2, A2, C2, CLK);
    CompEl c3(d, md3, res3, dummy3, A3, C3, CLK);
    assign m1 = (L < 2) ? res2 : (res1 & res2);
    assign m2 = (L < 1) ? res3 : (m1 & res3);
    Latency = (2) lat(m2, m3, 1 'b1, L, CLK);
    assign dot = (D == 1) ? !m3 : 1;
endmodule // DocMan
```

TABLE A6

Look-up table unit

```
module LUT8 (in, res, S);
    input [7:0] in;
    output res;
    input [0:255] S;
    assign res = S [in];
endmodule // LUT8
```

TABLE A7

Sequence control unit

```
module SC(res_, res_iml, res_ipl, ff_in, ff_out, ff_iml, res, S, D, M);
    input       res_;
    input       res_iml;
    input       res_ipl;
    input       ff_in;
    output      ff_out;
    input       ff_iml;
    output      res;
    input       S;
    input       D;
    input       M;
    wire        m1;
    wire        m2;
    wire        m3;
    wire        m4;
    wire        m5;
    assign      m1 = res_iml & res_;
    assign      m2 = res_ & res_ipl;
    assign      m3 = m1 | ff_in;
    assign      m4 = ff_in | res_ipl;
    assign      m5 = res_ & m4;
    assign      res = (S == 0) ? res_ :
                      ((D == 0) ? ((M == 0) ? m2 : m5) :
                      ((M ==0) ? m1 : m3));
    assign      ff_out = ((S == 1) && (M == 1)) ?
                         ((D == 0) ? m5 : res_iml) :
                         ff_iml;
endmodule // SC
```

TABLE A8

Result selector

```
module ResSel (doc1, res1, eq1, doc2, res2, eq2, doc, res, eq, M);
    input       doc1;
    input       res1;
    input       eq1;
    input       doc2;
    input       res2;
    input       eq2;
    output      doc;
    output      res;
    output      eq;
    input  [2:0] M;
    wire        m1;
    wire        m2;
    wire        m3;
    wire        m4;
    wire        m5;
    wire        m6;
    wire        m7;
    wire        m8;
    wire        m9;
    wire        m10;
    wire        m11;
    assign      m1 = !eq2;
    assign      m2 = eq1 | eq2;
    assign      m3 = res1 & res2;
    assign      m4 = res1 | res2;
    assign      m5 = res1 & eq2;
    assign      m6 = m1 & res2;
    assign      m7 = m5 | m6;
    assign      m8 = eq1 & eq2;
    assign      m9 = (M ==3'd0) ? res1 :
                     ((M == 3'd1) ? res 2 :
                     ((M == 3'd2) ? m3 :
                     ((M == 3'd3) ? m4 : m7)));
    assign      m10 = (M == 3'd0) ? eq1 :
                      ((M == 3'd1) ? eq2 :
                      ((M == 3'd2) ? m8 :
                      ((M == 3'd3) ? m2 : m8)));
    wire        mdoc1;
    wire        mdoc2;
```

TABLE A8-continued

Result selector

```
    assign      mdoc1 = (M == 3'd1) ? 1 : doc1;
    assign      mdoc2 = (M == 3'd0) ? 1 : doc2;
    assign      m11 = mdoc1 & mdoc2;
    assign      doc = m11;
    assign      res = m11 & m9;
    assign      eq = m11 & m10;
endmodule // ResSel
```

TABLE A9

Processing circuits

```
module  PE (d_s, doc_s, ff_s, d_p, doc_p, ff_p, d_i, doc_i, ff_i,
            d_o, doc_o, ff_o, res_iml_s, res_iml_p, res_iml_i,
            res_ipl, res_ipl_s, res_ipl_p, res_ipl_i, doc, res, eq,
            doc1, res1, eq1, doc2, res2, eq2, doc_sel, res_sel,
            eq_sel, M, A, C, L, S, D, MM, RM, CLK);
    input  [7:0] c_s;
    input       doc_s;
    input       ff_s;
    input  [7:0] d_p;
    input       doc_p;
    input       ff_p;
    output [7:0] d_i;
    output      doc_i;
    output      ff_i;
    output [7:0] d_o;
    output      doc_c;
    output      ff_c;
    input       res_iml_s;
    input       res_iml_p;
    output      res_iml_i;
    input       res_ipl;
    input       res_ipl_s;
    input       res_ipl_p;
    output      res_ipl_i;
    output      doc;
    output      res;
    output      eq;
    input       doc1;
    input       res1;
    input       eq1;
    input       doc2;
    input       res2;
    input       eq2;
    output      doc_sel;
    output      res_sel;
    output      eq_sel;
    input       M;
    input  [7:0] A;
    input  [1:0] C;
    input  ]1:0] L;
    input       S;
    input       D;
    input       MM;
    input  [2:0] RM;
    input       CLK;
    wire   [7:0] md;
    wire        mdoc;
    wire        mff;
    wire        mres_iml;
    wire        mres_ipl;
    assign      md = (M == 0) ? d_s : d_p;
    assign      mdoc = (M == 0) ? doc_s : doc_p;
    assign      mff = (M == 0) ? ff_s : ff_p;
    assign      mres_iml = (M == 0) ? res_iml_s : res_iml_p;
    assign      mres_ipl = (M == 0) ? res_ipl_s : res_ipl_p;
    assign      d_i = md;
    assign      doc_i = mdoc;
    assign      ff_i = mff;
    assign      res_iml_i = mres_iml;
    assign      res_ipl_i = mres_ipl;
    wire        mres;
    wire        meq;
    wire        mdoc2;
```

TABLE A9-continued

Processing circuits

```
    wire              mres2;
    CompEl  c (md, d_c, mres, meq, A, C, CLK);
    Dff ff1 (mdoc, mdoc2, 1'b1, CLK);
    assign            mres2 = mres & mdoc2;
    wire              mres3;
    wire              ffm1;
    wire              ffm2;
    reg       [5:0]   mmm;
    initial   mmm = 0;
    Latency #(2) lat (mres2, mres3, mdoc2, L, CLK);
    Dff ff2 (ffm1, ffm2, mdoc2, CLK);
    SC sc (mres3, mres_iml, res_ipl, ffm2, ffm1, mff, res, S, D, MM);
    ResSel    sel (doc1, res1, eq1, doc2, res2, eq2, doc_sel,
                   res_sel, eq_sel, RM);
    assign            doc_o = mdoc2;
    assign            ff_o = ffm2;
    assign            doc = mdoc2;
    assign            eq = mdoc2 & meq;
endmodule // PE
```

TABLE A10

Search processor circuit (tree 8)

```
module  Tree8 (d_s, doc_s, ff_s, d_p, doc_p, ff_p, d_i, doc_i,
               ff_i, d_o, doc_o, ff_o, res_iml_s, res_iml_p,
               res_iml_i, res_ipl, res_ipl_s, res_ipl_p,
               res_ipl_i, doc, res, eq, doc1, res1, eq1, doc2,
               res2, eq2, doc_sel, res_sel, eq_sel, M, A, C, L,
               S, D, MM, RM, LM1, LM2, LS, LD, LM, LL, LLS, CLK);
parameter lat_width = 8;
    input     [7:0]   d_s;
    input             doc_s;
    input             ff_s;
    input     [7:0]   d_p;
    input             doc_p;
    input             ff_p;
    output    [7:0]   d_i;
    output            doc_i;
    output            ff_i;
    output    [7:0]   d_o;
    output            doc_o;
    output            ff_o;
    input             res_iml_s;
    input             res_iml_p;
    output            res_iml_i;
    input             res_ipl;
    input             res_ipl_s;
    input             res_ipl_p;
    output            res_ipl_i;
    output            doc;
    output            res;
    output            eq;
    input             doc1;
    input             res1;
    input             eq1;
    input             doc2;
    input             res2;
    input             eq2;
    output            doc_sel;
    output            res_sel;
    output            eq_sel;
    input     [7:0]   M;
    input     [63:0]  A;
    input     [15:0]  C;
    input     [15:0]  L;
    input     [7:0]   S;
    input     [7:0]   D;
    input     [7:0]   MM;
    input     [23:0]  RM;
    input             LM1;
    input             LM2;
    input             LS;
    input             LD;
```

TABLE A10-continued

Search processor circuit (tree 8)

```
    input             LM;
    input     [lat_width - 1:0] LL;
    input     [0:255] LLS;
    input             CLK;
    wire      [63:0]  md_s;
    wire      [7:0]   mdoc_s;
    wire      [7:0]   mff_s;
    wire      [63:0]  md_p;
    wire      [7:0]   mdoc_p;
    wire      [7:0]   mff_p;
    wire      [63:0]  md_i;
    wire      [7:0]   mdoc_i;
    wire      [7:0]   mff_i;
    wire      [63:0]  md_o;
    wire      [7:0]   mdoc_o;
    wire      [7:0]   mff_o;
    wire      [7:0]   mres_iml_s;
    wire      [7:0]   mres_iml_p;
    wire      [7:0]   mres_iml_i;
    wire      [7:0]   mres_ipl;
    wire      [7:0]   mres_ipl_s;
    wire      [7:0]   mres_ipl_p;
    wire      [7:0]   mres_ipl_i;
    wire      [7:0]   mdoc;
    wire      [7:0]   mres;
    wire      [7:0]   meq;
    wire      [7:0]   mdoc1;
    wire      [7:0]   mres1;
    wire      [7:0]   meq1;
    wire      [7:0]   mdoc2;
    wire      [7:0]   mres2;
    wire      [7:0]   meq2;
    wire      [7:0]   mdoc_sel;
    wire      [7:0]   mres_sel;
    wire      [7:0]   meq_sel;
    wire              mux1_1;
    wire              mux1_2;
    wire              mux2;
    wire              mux2_in2;
    wire              lat_res;
    wire              mff_out;
    wire              lut_out;
    wire              and_out;
    assign    md_s = {d_s, md_o [63:56], md_o [55:48], md_o
                      [47:40], md_o [39:32], md_o [31:24], md_o [23:16],
                      md_o [15:8]};
    assign    mdoc_s = {doc_s, mdoc_o [7], mdoc_o [6],
                        mdoc_o [5], mdoc_o [4],
                        mdoc_o ]3], mdoc_o [2], mdoc_o [1]};
    assign    mff_s = {mux1_2, mff_o [7], mff_o [6], mff_o [5],
                       mff_o [4], mff_o [3],
                       mff_o [2], mff_o [1]};
    assign    md_p = {d_p, md_i [63:56], md_i [63:56],
                      md_i [47:40], md_i [63:56],
                      md_i [31:24], md_i [31:24], md_i [15:8]};
    assign    mdoc_p = {doc_p, mdoc_i [7], mdoc_i [7],
                        mdoc_i [5], mdoc_i [7], mdoc_i [3],
                        mdoc_i [3], mdoc_i [1]};
    assign    mff_p = {mux1_1, mff_i [7], mff_i [7], mff_i [5],
                       mff_i [7], mff_i [3],
                       mff_i [3], mff_i [1]};
    assign    mres_iml_s = {res_iml_s, mres[7], mres_sel [6],
                            mres [5], mres_sel [5],
                            mres [3], mres_sel [2], mres [1]};
    assign    mres_iml_p = {res_iml_p, mres_iml_i [7],
                            mres_iml_i [7],
                            mres_iml_i [5], mres_iml_i [7], mres_iml_i [3],
                            mres_iml_i [3], mres_iml_i [1]};
    assign    mres_ipl = {mres_ipl_i [6], mres_ipl_i [5],
                          mres_ipl_i [4],
                          mres_ipl_i [3], mres_ipl_i [2], mres_ipl_i [1],
                          mres_ipl_i [0], res_ipl};
    assign    mres_ipl_s = {res_ipl_s, mres [6], mres_sel [4],
                            mres [4], mres_sel [1],
                            mres [2], mres_sel [0], mres [0]};
```

TABLE A10-continued

Search processor circuit (tree 8)

| | |
|---|---|
| assign | mres_ipl_p = {res_ipl_p, mres_ipl_i [5], mres_ipl_i [3], mres_ipl_i [3], res_ipl, mres_ipl_i [1], res_ipl, res_ipl}; |
| assign | mdoc1 = {doc1, mdoc [7], mdoc_sel [6], mdoc [5], mdoc_sel [5], mdoc [3], mdoc_sel [2], mdoc [1]}; |
| assign | mres1 = {res1, mres [7], mres_sel [6], mres [5], mres_sel [5], mres [3], mres_sel [2], mres [1]}; |
| assign | meq1 = {eq1, meq [7], meq_sel [6], meq [5], meq_sel [5], meq [3], meq_sel [2], meq [1]}; |
| assign | mdoc2 = {doc2, mdoc [6], mdoc_sel [4], mdoc [4], mdoc_sel [1], mdoc [2], mdoc_sel [0], mdoc [0]}; |
| assign | mres2 = {res2, mres [6], mres_sel [4], mres [4], mres_sel [1], mres [2], mres_sel [0], mres [0]}; |
| assign | meq2 = {eq2, meq [6], meq_sel [4], meq [4], meq_sel [1], meq [2], meq_sel [0], meq [0]}; |
| assign | mux1_1 = (LM1 == 0) ? mff_out : ff_p; |
| assign | mux1_2 = (LM1 == 0) ? mff_out : ff_s; |
| assign | mux2 = (LM2 = 0) ? mres_sel [3] : mux2_in2; |
| assign | mux2_in2 = lut_out & and_out; |
| assign | and_out = &mdoc; |
| SC | sc (lat_res, mres_iml_i [7], res_ipl, mff_o [0], mff_out, mff_i [7], res, LS, LD, LM); |
| Latency | # (lat_width) lat (mux2, lat_res, and_out, LL, CLK); |
| LUT8 | lut (mres, lut_out, LLS); |
| assign | d_i = md_i [63:56]; |
| assign | doc_i = mdoc_i [7]; |
| assign | ff_i = mff_i [7]; |
| assign | d_o = md_o [7:0]; |
| assign | doc_o = mdoc_o [0]; |
| assign | ff_o = mff_o [0]; |
| assign | doc = mdoc_sel [3]; |
| assign | eq = meq_sel [3]; |
| assign | doc_sel = mdoc_sel [7]; |
| assign | res_sel = mres_sel [7]; |
| assign | eq_sel = meq_sel [7]; |
| assign | res_iml_i = mres_iml_i [0]; |
| assign | res_ipl_i = mres_ipl_i [7]; |
| PE | pe [0:7] (md_s, mdoc_s, mff_s, md_p, mdoc_p, mff_p, md_i, mdoc_i, mff_i, md_o, mdoc_o, mff_o, mres_iml_s, mres_iml_p, mres_iml_i, mres_ipl, mres_ipl_s, mres_ipl_p, mres_ipl_i, mdoc, mres, meq, mdoc1, mres1, meq1, mdoc2, mres2, meq2, mdoc_sel, mres_sel, meq_sel, M, A, C, L, S, D, MM, RM, CLK); |
| endmodule // Tree8 | |

TABLE A11

Search processor circuit (tree 64)

| | | |
|---|---|---|
| module | Tree64 | (d_s, doc_s, ff_s, d_p, doc_p, ff_p, d_i, doc_i, ff_i, d_o, doc_o, ff_o, res_iml_s, res_iml_p, res_iml_i, res_ipl, res_ipl_s, res_ipl_p, res_ipl_i, doc, res, eq, doc1, res1, eq1, doc2, res2, eq2, doc_sel, res_sel, eq_sel, hits, M, A, C, L, S, D, MM, RM, LM1, LM2, LS, LD, LM, LL, LLS, LLM1, LLM2, LLS2, LLD, LLM, LLL, LLLS, CLK); |
| parameter lat_width = 16; | | |
| input | [7:0] | d_s; |
| input | | doc_s; |
| input | | ff_s; |
| input | [7:0] | d_p; |
| input | | doc_p; |

TABLE A11-continued

Search processor circuit (tree 64)

| | | |
|---|---|---|
| input | | ff_p; |
| output | [7:0] | d_i; |
| output | | doc_i; |
| output | | ff_i; |
| output | [7:0] | d_o; |
| output | | doc_o; |
| output | | ff_o; |
| input | | res_iml_s; |
| input | | res_iml_p; |
| output | | res_iml_i; |
| input | | res_ipl; |
| input | | res_ipl_s; |
| input | | res_ipl_p; |
| output | | res_ipl_i; |
| output | | doc; |
| output | | res; |
| output | | eq; |
| input | | doc1; |
| input | | res1; |
| input | | eq1; |
| input | | doc2; |
| input | | res2; |
| input | | eq2; |
| output | | doc_sel; |
| output | | res_sel; |
| output | | eq_sel; |
| output | [6:0] | hits; |
| input | [63:0] | M; |
| input | [511:0] | A; |
| input | [127:0] | C; |
| input | [127:0] | L; |
| input | [63:0] | S; |
| input | [63:0] | D; |
| input | [63:0] | MM; |
| input | [191:0] | RM; |
| input | [7:0] | LM1; |
| input | [7:0] | LM2; |
| input | [7:0] | LS; |
| input | [7:0] | LD; |
| input | [7:0] | LM; |
| input | [63:0] | LL; |
| input | [0:2047] | LLS; |
| input | | LLM1; |
| input | | LLM2; |
| input | | LLS2; |
| input | | LLD; |
| input | | LLM; |
| input | [lat_width − 1:0] | LLL; |
| input | [0:255] | LLLS; |
| input | | CLK; |
| wire | [63:0] | md_s; |
| wire | [7:0] | mdoc_s; |
| wire | [7:0] | mff_s; |
| wire | [63:0] | md_p; |
| wire | [7:0] | mdoc_p; |
| wire | [7:0] | mff_p; |
| wire | [63:0] | md_i; |
| wire | [7:0] | mdoc_i; |
| wire | [7:0] | mff_i; |
| wire | [63:0] | md_o; |
| wire | [7:0] | mdoc_o; |
| wire | [7:0] | mff_o; |
| wire | [7:0] | mres_iml_s; |
| wire | [7:0] | mres_iml_p; |
| wire | [7:0] | mres_iml_i; |
| wire | [7:0] | mres_ipl; |
| wire | [7:0] | mres_ipl_s; |
| wire | [7:0] | mres_ipl_p; |
| wire | [7:0] | mres_ipl_i; |
| wire | [7:0] | mdoc; |
| wire | [7:0] | mres; |
| wire | [7:0] | meq; |
| wire | [7:0] | mdoc1; |
| wire | [7:0] | mres1; |
| wire | [7:0] | meq1; |
| wire | [7:0] | mdoc2; |
| wire | [7:0] | mres2; |

TABLE A11-continued

Search processor circuit (tree 64)

| | | |
|---|---|---|
| wire | [7:0] | meq2; |
| wire | [7:0] | mdoc_sel; |
| wire | [7:0] | mres_sel; |
| wire | [7:0] | meq_sel; |
| wire | | mux1_1; |
| wire | | mux1_2; |
| wire | | mux2; |
| wire | | mux2_in2; |
| wire | | lat_res; |
| wire | | mff_out; |
| wire | | lut_out; |
| wire | | and_out; |
| assign | md_s = {d_s, md_o [63:56], md_o [55:48], md_o [47:40], md_o [39:32], md_o [31:24], md_o [23:16], md_o [15:8]}; | |
| assign | mdoc_s = {doc_s, mdoc_o [7], mdoc_o [6], mdoc_o [5], mdoc_o [4], mdoc_o [3], mdoc_o [2], mdoc_o [1]}; | |
| assign | mff_s = {mux1_2, mff_o [7], mff_o [6], mff_o [5], mff_o [4], m_o [3], mff_o [2], mff_o [1]}; | |
| assign | md_p = {d_p, md_i [63:56], md_i [63:56], md_i [47:40], md_i [63:56], md_i [31:24], md_i [31:24], md_i [15:8]}; | |
| assign | mdoc_p = {doc_p, mdoc_i [7], mdoc_i [7], mdoc_i [5], mdoc_i [7], mdoc_i [3], mdoc_i [3], mdoc_i [1]}; | |
| assign | mff_p = {mux1_1, mff_i [7], mff_i [7], mff_i [5], mff_i [7], mff_i [3], mff_i [3], mff_i [1]}; | |
| assign | mres_iml_s = {res_iml_s, mres[7], mres_sel [6], mres [5], mres_sel [5], mres [3], mres_sel [2], mres [1]}; | |
| assign | mres_iml_p = {res_iml_p, mres_iml_i [7], mres_iml_i [7], mres_iml_i [5], mres_iml_i [7], mres_iml_i [3], mres_iml_i [3], mres_iml_i [1]}; | |
| assign | mres_ipl = {mres_ipl_i [6], mres_ipl_i [5], mres_ipl_i [4], mres_ipl_i [3], mres_ipl_i [2], mres_ipl_i [1], mres_ipl_i [0], res_ipl}; | |
| assign | mres_ipl_s = {res_ipl_s, mres [6], mres_sel [4], mres [4], mres_sel [1], mres [2], mres_sel [0], mres [0]}; | |
| assign | mres_ipl_p = {res_ipl_p, mres_ipl_i [5], mres_ipl_i [3], mres_ipl_i [3], res_ipl, mres_ipl_i [1], res_ipl, res_ipl}; | |
| assign | mdoc1 = {doc1, mdoc [7], mdoc_sel [6], mdoc [5], mdoc_sel [5], mdoc [3], mdoc_sel [2], mdoc [1]}; | |
| assign | mres1 = {res1, mres [7], mres_sel [6], mres [5], mres_sel [5], mres [3], mres_sel [2], mres [1]}; | |
| assign | meq1 = {eq1, meq [7], meq_sel [6], meq [5], meq_sel [5], meq [3], meq_sel [2], meq [1]}; | |
| assign | mdoc2 = {doc2, mdoc [6], mdoc_sel [4], mdoc [4], mdoc_sel [1], mdoc [2], mdoc_sel [0], mdoc [0]}; | |
| assign | mres2 = {res2, mres [6], mres_sel [4], mres [4], mres_sel [1], mres [2], mres_sel [0], mres [0]}; | |
| assign | meq2 = {eq2, meq [6], meq_sel [4], meq [4], meq_sel [1], meq [2], meq_sel [0], meq [0]}; | |
| assign | mux1_1 = (LLM1 == 0) ? mff_out : ff_p; | |
| assign | mux1_2 = (LLM1 == 0) ? mff_out : ff_s; | |
| assign | mux2 = (LLM2 = 0) ? mres_sel [3] : mux2_in2; | |
| assign | mux2_in2 = lut_out & and_out; | |
| assign | and_out = &mdoc; | |
| SC | sc (lat_res, mres_iml_i [7], res_ipl, mff_o [0], mff_out, mff_i [7], res, LLS2, LLD, LLM); | |
| Latency | # (lat_width) lat (mux2, lat_res, and_out, LLL, CLK); | |
| LUT8 | lut (mres, lut_out, LLLS); | |
| assign | d_i = md_i [63:56]; | |
| assign | doc_i = mdoc_i [7]; | |
| assign | ff_i = mff_i [7]; | |
| assign | d_o = md_o [7:0]; | |
| assign | doc_o = mdoc_o [0]; | |
| assign | ff_o = mff_o [0]; | |
| assign | doc = mdoc_sel [3]; | |
| assign | eq = meq_sel [3]; | |
| assign | doc_sel = mdoc_sel [7]; | |
| assign | res_sel = mres_sel [7]; | |
| assign | eq_sel = meq_sel [7]; | |
| assign | res_iml_i = mres_iml_i [0]; | |
| assign | res_ipl_i = mres_ipl_i [7]; | |
| assign | hits = mres_sel [6:0]; | |
| Tree8 | tree8 (md_s, mdoc_s, mff_s, md_p, mdoc_p, | |
| [0:7] | mff_p, md_i, mdoc_i, mff_i, md_o, mdoc_o, mff_o, mres_iml_s, mres_iml_p, mres_iml_i, mres_ipl, mres_ipl_s, mres_ipl_p, mres_ipl_i, mdoc, mres, meq, mdoc1, mres1, meq1, mdoc2, mres2, meq2, mdoc_sel, mres_sel, meq_sel, M, A, C, L, S, D, MM, RM, LM1, LM2, LS, LD, LM, LL, LLS, CLK); | |
| endmodule // Tree64 | | |

TABLE A12

Search processor circuit (tree 512)

| | | |
|---|---|---|
| module Tree512 (d_s, doc_s, ff_s, d_p, doc_p, ff_p, d_i, doc_i, ff_i, d_o, doc_o, ff_o, res_im1_s, res_im1_p, res_im1_i, res_ipl, res_ipl_s, res_ipl_p, res_ipl_i, doc, res, eq, doc1, res1, eq1, doc2, res2, eq2, doc_sel, res_sel, eq_sel, hits, M, A, C, L, S, D, MM, RM, LM1, LM2, LS, LD, LM, LL, LLS, LLM1, LLM2, LLLM2, LLS2, LLD, LLM, LLL, LLLS, LLLM1, LLLM2, LLLS2, LLLD, LLLM, LLLL, LLLLS, CLK); | | |
| parameter lat_width = 16; | | |
| input | [7:0] | d_s; |
| input | | doc_s; |
| input | | ff_s; |
| input | [7:0] | d_p; |
| input | | doc_p; |
| input | | ff_p; |
| output | [7:0] | d_i; |
| output | | doc_i; |
| output | | ff_i; |
| output | [7:0] | d_o; |
| output | | doc_c; |
| output | | ff_o; |
| input | | res_im1_s; |
| input | | res_im1_p; |
| output | | res_im1_i; |
| input | | res_ipl; |
| input | | res_ipl_s; |
| input | | res_ipl_p; |
| output | | res_ipl_i; |
| output | | doc; |
| output | | res; |
| output | | eq; |
| input | | doc1; |
| input | | res1; |
| input | | eq1; |
| input | | doc2; |

TABLE A12-continued

Search processor circuit (tree 512)

```
        input           res2;
        input           eq2;
        output          doc_sel;
        output          res_sel;
        output          eq_sel;
        output [62:0]   hits;
        input [511:0]   M;
        input [4095:0]  A;
        input [1023:0]  C;
        input [1023:0]  L;
        input [511:0]   S;
        input [511:0]   D;
        input [511:0]   MM;
        input [1535:0]  RM;
        input [63:0]    LM1;
        input [63:0]    LM2;
        input [63:0]    LS;
        input [63:0]    LD;
        input [63:0]    LM;
        input [511:0]   LLL;
        input [0:16383] LLS;
        input [7:0]     LLM1;
        input [7:0]     LLM2;
        input [7:0]     LLS2;
        input [7:0]     LLD;
        input [7:0]     LLM;
        input [127:0]   LLL;
        input [0:2047]  LLLS;
        input           LLLM1;
        input           LLLM2;
        input           LLLS2;
        input           LLLD;
        input           LLLM;
        input [lat_width - 1:0] LLLL;
        input [0:255]   LLLLS;
        input           CLK;
        wire [63:0]     md_s;
        wire [7:0]      mdoc_s;
        wire [7:0]      mff_s;
        wire [63:0]     md_p;
        wire [7:0]      mdoc_p;
        wire [7:0]      mff_p;
        wire [63:0]     md_i;
        wire [7:0]      mdoc_i;
        wire [7:0]      mff_i;
        wire [63:0]     md_o;
        wire [7:0]      mdoc_o;
        wire [7:0]      mff_o;
        wire [7:0]      mres_im1_s;
        wire [7:0]      mres_im1_p;
        wire [7:0]      mres_im1_i;
        wire [7:0]      mres_ip1;
        wire [7:0]      mres_ip1_s;
        wire [7:0]      mres_ip1_p;
        wire [7:0]      mres_ip1_i;
        wire [7:0]      mdoc;
        wire [7:0]      mres;
        wire [7:0]      meq;
        wire [7:0]      mdoc1;
        wire [7:0]      mres1;
        wire [7:0]      meq1;
        wire [7:0]      mdoc2;
        wire [7:0]      mres2;
wire [7:0] meq2;
wire [7:0] mdoc_sel;
wire [7:0] mres_sel;
wire [7:0] meq_sel;
wire [55:0] mhits;
        wire            mux1_1;
        wire            mux1_2;
        wire            mux2;
        wire            mux2_in2;
        wire            lat_res;
        wire            mff_out;
        wire            lut_out;
        wire            and_out;
assign md_s = {d_s, md_o[63:56],
md_o[55:48], md_o[47:40],
md_o[39:32], md_o[31:24],
md_o[23:16], md_o[15:8]};
assign mdoc_s = {doc_s, mdoc_o[7],
mdoc_o[6], mdoc_o[5],
mdoc_o[4], mdoc_o[3],
mdoc_o[2], mdoc_o[1]};
assign mff_s = {mux1_2, mff_o[7],
mff_o[6], mff_o[5], mff_o[4],
mff_o[3], mff_o[2], mff_o[1]};
assign md_p = {d_p, md_i[63:56],
md_i[63:56], md_i[47:40],
md_i[63:56], md_i[31:24],
md_i[31:24], md_i[15:8]};
assign mdoc_p = {doc_p, mdoc_i[7],
mdoc_i[7], mdoc_i[5],
mdoc_i[7], mdoc_i[3],
mdoc_i[3], mdoc_i[1]};
assign mff_p = {mux1_1, mff_i[7],
mff_i[7], mff_i[5], mff_i[7],
mff_i[3], mff_i[3], mff_i[1]};
assign mres_im1_s = {res_im1_s,
mres[7], mres_sel[6], mres[5],
mres_sel[5], mres[3],
mres_sel[2], mres[1]};
assign mres_im1_p = {res_im1_p,
mres_im1_i[7], mres_im1_i[7],
mres_im1_i[5],
mres_im1_i[7],
mres_im1_i[3],
mres_im1_i[3], mres_im1_i[1]};
assign mres_ip1 = {mres_ip1_i[6],
mres_ip1_i[5], mres_ip1_i[4],
mres_ip1_i[3], mres_ip1_i[2],
mres_ip1_i[1],
mres_ip1_i[0], res_ip1};
assign mres_ip1_s = {res_ip1_s,
mres[6], mres_sel[4], mres[4],
mres_sel[1], mres[2], mres_sel[0],
mres[0]};
assign mres_ip1_p = {res_ip1_p,
mres_ip1_i[5], mres_ip1_i[3],
mres_ip1_i[3], res_ip1,
mres ip1_i[1], mres_ip1, res_ip1};
assign mdoc1 = {doc1, mdoc[7], mdoc_sel[6], mdoc[5],
mdoc_sel[5], mdoc[3], mdoc_sel[2],
mdoc[1]};
assign mres1 = {res1, mres[7], mres_sel[6],
mres[5], mres_sel[5], mres[3],
mres_sel[2], mres[1]};
assign meq1 = {eq1, meq[7], meq_sel[6],
meq[5], meq_sel[5], meq[3],
meq_sel[2], meq[1]};
assign mdoc2 = {doc2, mdoc[6]; mdoc[4],
mdoc[4], mdoc_sel[1], mdoc[2],
mdoc_sel[0], mdoc[0]}
assign mres2 = (res2, mres [6], mres_sel[4],
mres[4], mres_sel[1], mres[2],
mres_sel[0], mres[0]};
assign meq2 = {eq2, meq[6], meq_sel[4],
meq[4], meq_sel[1], meq[2],
meq_sel[0], meq[0]};
assign mux1_1 = (LLLM1 == 0) ? mff_out : ff_p;
assign mux1_2 = (LLLM1 == 0) ? mff_out : ff_s;
assign mux2 = (LLLM2 == 0) ? mres_sel[3]: mux2_in2;
assign mux2_in2 = lut_out & and_out;
assign and_out = &mdoc;
SC sc (lat_res, mres_im1_i[7],
res_ip1, mff_o[0], mff_out,
mff_i[7], res, LLLS2, LLLD, LLLM);
Latency # (lat_width) lat(mux2, lat_res,
and_out, LLLL, CLK);
LUT8 lut (mres,lut_out, LLLLS);
assign d_i = md_i[63:56];
assign doc_i = mdoc_i[7];
assign ff_i = mff_i[7];
```

TABLE A12-continued

Search processor circuit (tree 512)

```
        assign d_o = md_o[7:0];
        assign doc_o = mdoc_o[0];
        assign ff_o = mff_o[0];
        assign doc = mdoc_sel[3];
        assign eq = meq_sel[3];
        assign doc_sel = mdoc_sel[7];
        assign res_sel = mres_sel[7];
        assign eq_sel = meq_sel[7];
        assign res_im1_i = mres_im1_i[0];
        assign res_ip1_i = mres_ip1_i[7];
        assign hits =
        {mhits[55:49], mres_sel[6], mhits[48:42], mres_sel[5],
        mhits[41:35], mres_sel[4], mhits[34:28],
        mres_sel[3], mhits[27:21], mres_sel[2],
        mhits[20:14], mres_sel[1], mhits[13:7],
        mres_sel[0], mhits[6:0]};
                Tree64 tree64[0:7](md_s, mdoc_s,
                        mff_s, md_p, mdoc_p,
                        mff_p, md_i, mdoc_i,
                        mff_i, md_o, mdoc_o,
                        mff_o, mres_im1_s,
                        mres_im1_p, mres_im1_i,
                        mres_ip1, mres_ip1_s,
                        mres_ip1_p, mres_ip1_i,
                        mdoc, mres, meq, mdoc1, mres1,
                        meq1, mdoc2, mres2, meq2,
                        mdoc_sel, mres_sel,
                        meq_sel, mhits, M, A, C, L, S, D,
                        MM, RM, LM1, LM2, LS, LD, LM, LL, LLS,
                        LLM1, LLM2, LLS2, LLD, LLM,
                        LLL, LLLS, CLK);
endmodule // Tree512
```

TABLE A13

Hit management unit

```
module HitMan(res_, doc, res, M, MM, CLK);
        parameter       width = 5;
        input           res_;
        input           doc;
        output          res;
        input [1:0]     M;
        input [width - 1:0]  MM;
        input           CLK;
        wire            dIn;
        wire            dOut;
        wire            m;
        wire            mm;
        reg [2^width - 1:0]  c;
        initial c = 0;
        always @ (posedge CLK) c = c + 1;
        Dff dff (dIn, dOut, 1 'b1, CLK);
        assign mm = c[MM];
        assign m = (M == 0) ? 1 : ((M == 1) ? mm : doc);
        assign dIn = (dOut & (~res_)) | m;
        assign res = res_ & dOut;
endmodule // HitMan
```

What is claimed is:

1. A processing circuit ($P_1$) for recognition and comparison of complex patterns in high-speed data streams, particularly for use in search engines for search and retrieval of data stored in structured or unstructured databases, and wherein the processing circuit ($P_1$) forms a node in a network of such processing circuits, characterized in that the processing circuit ($P_1$) comprises an interface with inputs and outputs for data which respectively are configuring and operational parameters for the processing circuit ($P_1$), the configuring parameters being supplied to the processing circuit ($P_1$) via unspecified or dedicated inputs in the interface once and for all for a giving processing task and the operational data which are processed by execution of the given processing task being continuously input to or output from the processing circuit ($P_1$) via specified respective inputs and outputs of the interface, at least one kernel processor ($P_0$) in the form of a comparator unit (COM), the comparator unit (COM) being adapted for comparing two data words, and a logic unit (E) connected with the comparator unit, the logic unit comprising a multiplexer (MUX1) connected with the following inputs in the interface: a sequential data input, a sequential document input, a sequential flip-flop input, a sequential result input from a preceding processing circuit, a sequential result input from a succeeding processing circuit, a parallel data input, a parallel document input, a parallel flip-flop input, a parallel result input on a preceding processing circuit and a parallel result input on a succeeding processing circuit; and with the following outputs in the interface: an output for a selected data value, an output for a selected document value, an output for a selected flip-flop value, an output for a selected result to a preceding processing circuit and an output for selected document value, an output for selected flip-flop value, an output for a selected result to a preceding processing circuit, and an output for selected result to a succeeding processing circuit; a first D flip-flop (2); a latency unit (LAT) which is adapted to delay a positive binary value with a given number of time units; a second D flip-flop (4); a sequence control unit (SC) which is adapted to monitor and control a comparison operation in the comparator unit (COM), and a result selector which is adapted to combine two result values from other processing circuits or other result selectors; that the comparator unit (COM) is connected with an output for a selected data value on a multiplexer (MUX1) and with a data output in the interface and further has a result output connected with a first AND gate (1) and an equality unit connected with a second AND gate (3), that the first D flip-flop is connected with an output for a selected document value on the multiplexer (MUX1) and has a reset output which via a reset line (5) is connected respectively with an input on the first AND gate (1), an input on the second AND gate (3), and an input on the latency unit (LAT) as well as with a document input in the interface, that the second AND gate (3) has an equality output in the interface, that the latency unit (LAT) is connected with the output on the first AND gate (1) and with a result input on the sequence control unit (SC), that the second D flip-flop (4) is connected with the reset output on the first D flip-flop (2) and respectively a flip-flop output and flip-flop input on the sequence control unit (SC) as well as with a flip-flop output in the interface, that the sequence control unit (SC) is connected with the output for a selected flip-flop value and the output for a selected result from a preceding processing circuit on the multiplexer (MUX1) and with a result input on a preceding processing circuit and result output in the interface, and that the result selector (RS) is connected with respectively a first result input, a first document input, a first equality input, a second result input, a second document input, and a second equality input in the interface and respectively with a result output, a document output and an equality output in the interface.

2. A processing circuit ($P_1$) according to claim 1, characterized in that the interface is defined by inputs for the configuring parameters and inputs and outputs for the operational parameters according to the following table, the first column of the table giving the denomination of the parameter, the second column the parameter type as respectively operational or configuring, the third column the parameter respectively as an input or an output parameter, the fourth column the width of the input or the output in bits, and the fifth column a closer definition of the parameter in question:

| Parameter | Parameter type | I/O | Width | Definition |
|---|---|---|---|---|
| d_s | Operational | In | 8 | Sequential data input |
| doc_s | Operational | In | 1 | Sequential document input |
| ff_s | Operational | In | 1 | Sequential flip-flop input |
| d_p | Operational | In | 8 | Parallel data input |
| doc_p | Operational | In | 1 | Parallel document input |
| ff_p | Operational | In | 1 | Parallel flip-flop input |
| d_i | Operational | Out | 8 | Output for selected data value |
| doc_i | Operational | Out | 1 | Output for selected document value |
| ff_i | Operational | Out | 1 | Output for selected flip-flop value |
| d_o | Operational | Out | 8 | Data output |
| doc_o | Operational | Out | 1 | Document output |
| ff_o | Operational | Out | 1 | Flip-flop output |
| res_im1_s | Operational | In | 1 | Sequential input for result from a preceding processing circuit |
| res_im1_p | Operational | In | 1 | Parallel input for result from a preceding processing circuit |
| res_im1_i | Operational | Out | | Output for selected result to a preceding processing circuit |
| res_ip1 | Operational | In | 1 | Input for resuit from a succeeding processing circuit |
| res_ip1_s | Operational | In | 1 | Sequential input for result from a succeeding processing circuit |
| res_ip1_p | Operational | In | 1 | Parallel input for result from a succeeding processing circuit |
| res_ip1_i | Operational | Out | 1 | Output for selected result to a succeeding processing circuit |
| doc | Operational | Out | 1 | Document output |
| res | Operational | Out | 1 | Result output |
| eq | Operational | Out | 1 | Equality output |
| doc1 | Operational | In | 1 | Document output 1 for result selector |
| res1 | Operational | In | 1 | Result input 1 for result selector |
| eq1 | Operational | In | 1 | Equality input 1 for result selector |
| doc2 | Operational | In | 1 | Document input 2 for result selector |
| res2 | Operational | In | 1 | Result input 2 for result selector |
| eq2 | Operational | In | 1 | Equality input 2 for result selector |
| doc_sel | Operational | Out | 1 | Document output from result selector |
| res_sel | Operational | Out | 1 | Result output from result selector |
| eq_sel | Operational | Out | 1 | Equality output from result selector |
| M | Configuring | In | 1 | Parameter input |
| A | Configuring | In | 8 | Parameter input for comparator unit |
| C | Configuring | In | 2 | Parameter input for comparator unit |
| L | Configuring | In | 2 | Parameter input for latency unit |
| S | Configuring | In | 1 | Parameter input for sequence control unit |
| D | Configuring | In | 1 | Parameter input for sequence control unit |
| MM | Configuring | In | | Parameter input for sequence control unit |
| RM | Configuring | In | 3 | Parameter input for result selector. |

3. A processing unit ($P_1$) according to claim 1, characterized in that the comparator unit (COM) comprises a first register (6) which in each case contains input data in the form of a data word x and respectively is connected with a data input and a data output, a second register (7) which contains a data word a which the data word x in the first register (6) is to be compareded with, as well as one or more logic gates and a multiplexer (MUX2) connected with the registers (6,7) for executing a comparison operation, an output on the multiplexer (MUX2) comprising the result output of the comparator unit.

4. A processing circuit ($P_1$) according to claim 3, characterized in that the interface of the comparator unit (COM) is defined by inputs for the configuring parameters and inputs and outputs for the operational parameter according to the following table, the first column of the table giving the denomination of the parameter, the second column the parameter type as respectively operational or configuring, the third column the parameter as respectively an input or an output parameter, the fourth column the width of the input or the output in bits, and the fifth column a closer definition of the parameter in question:

| Parameter | Parameter type | I/O | Width | Definition |
|---|---|---|---|---|
| d | Operational | In | 8 | Data input (data word x) |
| d_o | Operational | Out | 8 | Data output (data word x) |
| res | Operational | Out | 1 | Result output for comparison |
| eq | Operational | Out | 1 | Equality output |
| A | Configuring | In | 8 | Data input (data word a) |
| C | Configuring | In | 2 | Input for comparison operation. |

5. A processing circuit ($P_1$) according to claim 4, characterized in that the comparison operation is one of the operations $\leq$, $\geq$, =, and =, and given by the configuring parameter being input as binary 0 for $\leq$, binary 1 for $\geq$, binary 2 for $\neq$, og binary 3 for =.

6. A processing circuit ($P_1$) according to claim 1, characterized in that the latency unit (LAT) comprises a counter (8) which respectively via a first input is connected with the output of the second AND gate (3) and via a second input with the reset line (5), the counter (8) being connected with a latency register (9) which contains a configuring latency parameter, and has a output which is the result output of the latency unit.

7. A processing circuit ($P_1$) according to claim 6, characterized in that the interface of the latency unit (LAT) is defined by an input for a configuring latency parameter and inputs and outputs for the operational parameters according to the following table, the first column of the table giving the denomination of the parameter, the second column the parameter type as respectively operational or configuring, the third column the parameter as respectively an input or an output parameter, the fourth column the width of the input or output in bits, and the fifth column a closer definition of the parameter in question.

| Parameter | Parameter type | I/O | Width | Definition |
|---|---|---|---|---|
| res_ | Operational | In | 1 | Data input (original result) |
| res | Operational | Out | 1 | Data output (modified result) |
| _reset | Operational | In | 1 | Reset input, 0 gives reset |

-continued

| Parameter | Parameter type | I/O | Width | Definition |
|---|---|---|---|---|
| L | Configuring | In | W | Input for latency parameter |
| W | — | — | n/a | Latency width. |

8. A processing circuit ($P_1$) according to claim 7, characterized in that L=0 gives no latency, L=t gives latency t time units and $L=t=2^{W-1}$ gives infinite latency.

9. A processing circuit ($P_1$) according to claim 1, characterized in that the sequence control unit (SC) comprises a first AND gate (10) connected with a result input on a preceding processing circuit and a result output on the latency unit (LAT), a first OR gate (11) connected respectively with an output of the first AND gate (10) and an output on the second D flip-flop (4), a second AND gate (12) connected with the result output of the latency unit (LAT) and the result input on a succeeding processing circuit, a second OR gate (13) connected with the result input on a succeeding processing circuit and the output on the second D flip-flop (4), a third AND gate (14) connected with the result output on the latency unit (LAT) and with an output on the OR gate (13), and a multiplexer (MUX3) connected respectively with the result output of the latency unit (LAT), an output on each of the AND gates (10, 12, 14) and the first OR gate (11), the result input on a preceding processing circuit and the flip-flop output on a succeeding processing circuit, an output of the sequence control unit (SC) forming the result output of the processing circuit ($P_1$).

10. A processing circuit ($P_1$) according to claim 9, characterized in that the interface of the sequence control unit (SC) is defined by inputs for the configuring parameters and inputs and outputs for the operational parameters according to the following table, the first column of the table giving the denomination of the parameter, the second column the parameter type as respectively operational or configuring, the third column the parameter as respectively an input or output parameter, the fourth column the width of the input or the output in bits, and the fifth column a closer definition of the parameter in question.

| Parameter | Parameter type | I/O | Width | Definition |
|---|---|---|---|---|
| res_ | Operational | In | 1 | Result input (original result) |
| res_im1 | Operational | In | 1 | Result input from preceding unit |
| res_ip1 | Operational | In | 1 | Result input from succeeding unit |
| ff_in | Operational | In | 1 | Flip-flop input |
| ff_im1 | Operational | In | 1 | Flip-flop input from a preceding processing circuit |
| res | Operational | Out | 1 | Result output |
| ff_out | Operational | Out | 1 | Flip-flop output |
| S | Configuring | In | 1 | Parameter input for sequence control operation |
| D | Configuring | In | 1 | Parameter input for sequence control operation |
| MM | Configuring | In | 1 | Parameter input for sequence control operations. |

11. A processing circuit ($P_1$) according to claim 10, characterized in that the sequence control unit (SC) implements one or more of the following sequence control operations:
  allowing the comparator unit (COM) to output a comparison result dependent on the preceding or the succeeding unit outputting a comparison result,
  allowing a comparison with patterns where parts of the pattern are missing,
  allowing comparison with patterns where parts of the pattern are repeated.

12. A processing circuit ($P_1$) according to claim 11, characterized in that the configuring parameter S is input as binary 1 if a sequence control operation shall take place, that the configuring parameter D is input as binary 0 or binary 1 for respectively a forward sequence control and a backward sequence control, and that the configuring parameter MM is input as binary 1 if patterns with missing parts or repeating patterns are allowed for comparison.

13. A processing circuit ($P_1$) according to claim 1, characterized in that the result selector (RS) comprises a first AND gate (15) connected with the first equality input and the second equality input, a second AND gate (16) connected with the first result input and the second result input, a third AND gate (17) connected with the first result input and the second equality input, a NOT gate (18) connected with the second equality input, a fourth AND gate (19) connected with the second result input and the output on the NOT gate (18), a first OR gate (20) connected respectively with the first and the second equality input, a second OR gate (21) connected respectively with the first and the second equality input, a third OR gate (22) connected respectively with the output of the third and the forth AND gate (17;19), a multiplexer (MUX4) connected respectively with the first result input, the second result input, the first equality input, the second equality input, the output from respectively the first and second AND gate (15;16), and with the output from respectively the first, the second and third OR gate (20;21;22), a fifth AND gate (23) connected respectively with the first and second document input and with the document output in the interface, a sixth AND gate (24) connected respectively with the output of the fifth AND gate (23), a first output on the multiplexer (MUX4) and the result output in the interface, and a seventh AND gate (25) connected with respectively the fifth AND gate (23) and a second output on the multiplexer (MUX1) as well as the equality output in the interface.

14. A processing circuit ($P_1$) according to claim 13, characterized in that the interface of the result selector (RS) is defined by inputs for the configuring parameters and inputs and outputs for the operational parameters according to the following table, the first column of the table giving the denomination of the parameter, the second column the parameter type as respectively operational or configuring, the third column the parameter as respectively an input or output parameter, the fourth column the width of the input or the output in bits, and the fifth column a closer definition of the parameter in question:

| Parameter | Parameter type | I/O | Width | Definition |
|---|---|---|---|---|
| doc1 | Operational | In | 1 | Document input 1 for result selector |
| res1 | Operational | In | 1 | Result input 1 for result selector |
| eq1 | Operational | In | 1 | Equality input 1 for result selector |
| doc2 | Operational | In | 1 | Document input 2 for result selector |
| res2 | Operational | In | 1 | Result input 2 for result selector |

-continued

| Parameter | Parameter type | I/O | Width | Definition |
|---|---|---|---|---|
| eq2 | Operational | In | 1 | Equality input 2 for result selector |
| doc1 | Operational | Out | 1 | Document output from result selector |
| res | Operational | Out | 1 | Result output from result selector |
| eq | Operational | Out | 1 | Equality output from result selector |
| RM | Configuring | In | 3 | Parameter input for result selector. |

15. A processing circuit ($P_1$) according to claim 14, characterized in that the result selector (RS) implements one or more of the following operations:
   using only a first result (res1)
   using only a second result (res2)
   executing the operation boolean AND on the first and the second result
   executing the operation boolean OR on the first and the second result
   executing the operation $\leq$ over a set of processing circuits ($P_1$)
   executing the operation $\geq$ over a set of processing circuits ($P_1$).

16. A processing circuit ($P_1$) according to claim 15, characterized in that the configuring parameter RM for the result selector (RS) is entered as 3-bit binary values specific for each of the operations which the result selector implements.

17. A search processor circuit (PMC) comprising a multiprocessor unit $P_n$ with tree structure for recognition and comparison of complex patterns in high speed data streams, particularly for use in search engines for search and retrieval of data stored in structured or unstructured databases, wherein the multiprocessor unit $P_n$ comprises processing circuits $P_1$ according to claim 1, and wherein the multiprocessor unit $P_n$ forms a circuit realized as a binary or superbinary tree with n+1 levels $S_0, S_1, \ldots S_n$ and degree $k=2^m$, wherein m is a positive integer larger or equal to 1, and a superbinary tree defined by k>2, characterized in that the multiprocessor unit $P_n$ is provided on the level $S_n$ and forms a root node in the tree and comprises an interface $I_{P_n}$ and a logic unit E, that the nearest underlying level $S_{n-1}$ comprises $2^m$ circuits $P_{n-1}$ which are provided nested in the multiprocessor unit $P_n$ and form the child nodes thereof, each of the circuits $P_{n-i}$ having identical interfaces $I_{P_{n-i}}$ and comprising a corresponding logic unit E, that the multiprocessor unit $P_n$ on an underlying level $S_{n-q}$, $q \in \{1,2 \ldots,n-1\}$, generally comprises $2^{mq}$ circuits $P_{n-q}$, each with interface $I_{P_{n-q}}$, and corresponding logic units (E) and provided nested in the $2^{m(q-1)}$ circuits $P_{n-q+1}$ on the overlying level $S_{n-q+1}$, each circuit $P_{n-q+1}$ on this level comprising $2^m$ circuits $P_{n-q}$, that a zeroth level for $n-q=S_0$ defined for the multiprocessor unit $P_n$ for $q=n=S_0$ comprises from $2^{m(n-1)}$ to $2^{mn}$ kernel processors $P_0$ which form comparator units (COM) in the $2^{m(n-1)}$ processing circuits $P_n$ on the level $S_1$, that each of processing circuits $P_1$ comprises from one to $2^m$ comparator units (COM) and each has interfaces $I_{P_1}$ and corresponding logic units (E) that generally all circuits $P_1, P_2, \ldots P_n$ on the levels $S_1, S_2, \ldots S_n$ have identical interfaces I such that $I_{P_1}=I_{P_2}=\ldots I_{P_n}=I$, and that each logic unit (E) comprises a result selector (RS) or a look-up-table unit (LUT) for collecting the results of a search operation or a comparison operation executed be the processing circuits $P_1$ on the level $S_1$.

18. A search processor circuit (PMC) according to claim 17, characterized in that each processing circuit $P_1$ on the level $S_1$ comprises $2^m$ comparator units (COM), such that the multiprocessor unit $P_n$ forms an unreduced binary or superbinary tree, that a processing circuit $P_1$ maps a circuit $P_2$ on the overlying level with a factor $r=2^m$, and that generally a circuit $P_{n-c}$ on the level $S_{n-q}$ for $q \in \{1,2 \ldots,n-1\}$, maps a circuit $P_{n-q+1}$ on the overlying level $S_{n-q+1}$ recursively with the factor $r=2^m$, such that the binary or superbinary tree which configures the circuit $P_n$ in each case comprises a from the level $S_1$ on recursively generated binary or superbinary tree.

19. A search processor circuit (PMC) according to claim 17, characterized in that the interface $I_{P_n}$ of multiprocessor unit $P_n$ and the interfaces $I_{P_{n-q}}$ for each circuit $P_{n-q}$ which is included in the circuit $P_n$ on underlying levels $S_{n-q}$ are defined by inputs for the configuring parameters and inputs and outputs for the operational parameters according to the following table, the first column of the table giving the denomination of the parameter, the second column the parameter the type as respectively operational or configuring, the third column the parameter respectively as an input or an output parameter, the fourth column the width of the input or the output in bits, and the fifth column a closer, definition of the parameter in question:

| Parameter | Parameter type | I/O | Width | Definition |
|---|---|---|---|---|
| d_s | Operational | In | 8 | Sequential data input |
| doc_s | Operational | In | 1 | Sequential document input |
| ff_s | Operational | In | 1 | Sequential flip-flop input |
| d_p | Operational | In | 8 | Parallel data input |
| doc_p | Operational | In | 1 | Parallel document input |
| ff_p | Operational | In | 1 | Parallel flip-flop input |
| d_i | Operational | Out | 8 | Output for selected data value |
| doc_i | Operational | Out | 1 | Output for selected document input |
| ff_i | Operational | Out | 1 | Output for selected flip-flop value |
| d_o | Operational | Out | 8 | Data output |
| doc_o | Operational | Out | 1 | Document output |
| ff_o | Operational | Out | 1 | Flip-flop output |
| res_im1_s | Operational | In | 1 | Sequential input or result from a preceding processing unit |
| res_im1_p | Operational | In | 1 | Parallel input for result from a processing unit |
| res_im1_i | Operational | Out | 1 | Output for selected result from a preceding processing unit |
| res_ip1 | Operational | In | 1 | Result input from a succeeding processing unit |
| res_ip1_s | Operational | In | 1 | Sequential input for the result from a succeeding processing unit |
| res_ip1_p | Operational | In | 1 | Parallel input for the result from a succeeding processing unit |
| res_ip1_i | Operational | Out | 1 | Output for selected result from a succeeding processing unit |
| doc | Operational | Out | 1 | Document output |
| res | Operational | Out | 1 | Result output |
| eq | Operational | Out | 1 | Equality output |
| doc1 | Operational | In | 1 | Document input 1 for result selector |
| res1 | Operational | In | 1 | Result input 1 for result selector |
| eq1 | Operational | In | 1 | Equality input 1 for result selector |
| doc2 | Operational | In | 1 | Document input 2 for result selector |

| Parameter | Parameter type | I/O | Width | Definition |
|---|---|---|---|---|
| res2 | Operational | In | 1 | Result input 2 for result selector |
| eq2 | Operational | In | 1 | Equality input 2 for result selector |
| doc_sel | Operational | Out | 1 | Document input from result selector |
| res_sel | Operational | Out | 1 | Result output from result selector |
| eq_sel | Operational | Out | 1 | Equality output from result selector |
| M | Configuring | In | — | Parameter input |
| A | Configuring | In | — | Parameter input for comparator unit |
| C | Configuring | In | — | Parameter input for comparator unit |
| L | Configuring | In | — | Parameter input for latency unit |
| S | Configuring | In | — | Parameter input for sequence control unit |
| D | Configuring | In | — | Parameter input for sequence control unit |
| MM | Configuring | In | — | Parameter input for sequence control unit |
| RM | Configuring | In | — | Parameter input for result selector |
| LM1 | Configuring | In | 1 | Signal control |
| LM2 | Configuring | In | 1 | Look-up-table control |
| LS | Configuring | In | 1 | Parameter input for sequence control unit |
| LD | Configuring | In | 1 | Parameter input for sequence control unit |
| LM | Configuring | In | 1 | Parameter input for sequence control unit |
| LL | Configuring | In | W | Latency for multiprocessor |
| LLS | Configuring | In | — | Parameter input for look-up-table unit. |

20. A search processor circuit (PMC) according to claim 17, wherein the logic unit (E) comprises latency unit (LAT) and a sequence control unit (SC) as well as a look-up-table unit (LUT), characterized in that the logic unit (E) further comprises a first AND gate (26), a first multiplexer (MUX5), a second AND gate (27) and a second multiplexer (MUX6), that look-up-table unit (LUT) is connected with a result output on each processing circuit $P_n$ in the immediately underlying level, the first AND gate (26) with a document output on each of the said circuits $P_{n-1}$, the second AND gate (27) with the output of the first AND gate (26) and the output of the look-up-table unit (LUT), the first multiplexer (MUX5) with the output on the second AND gate (27) and a second result output on a last one of said circuits $P_{n-1}$, the latency unit (LAT) with the output on the first AND gate (26), the sequence control unit (SC) with an output on the latency unit (LAT), a result output and a flip-flop output on a first one of said circuits $P_{n-1}$, a result input on the logic unit E and a flip-flop output on the last one of said circuits $P_{n-1}$, and the second multiplexer (MUX6) with a flip-flop output on the sequence control unit (SC) and respectively with a first and a second flip-flop input on the logic unit (E) and further via respectively first and second flip-flop outputs with the first of one said circuits $P_{n-1}$.

21. A search processor circuit (PMC) according to claim 20, characterized in that the search processor circuit (PMC) comprises a document management unit (DOC) which via a data output is connected with respectively the sequential and the parallel data input on the multiprocessor unit $P_n$, and via a document output is connected with the sequential document input on the multiprocessor unit $P_n$.

22. A search processor circuit according to claim 20, characterized in that the search processor circuit (PMC) comprises $\frac{1}{2}k=2^{m-1}$ hit management units (HIT) provided connected with respective result outputs and document outputs in circuits $P_{n-1}$, each hit management unit (HIT) via a result input being connected with respective result outputs in the interface of the multiprocessor unit $P_n$.

* * * * *